United States Patent
Chien

(10) Patent No.: US 11,228,735 B2
(45) Date of Patent: Jan. 18, 2022

(54) LED OR LASER PROJECT LIGHT HAS MORE THAN 1 FUNCTIONS

(76) Inventor: Tseng-Lu Chien, Walnut, CA (US)

( * ) Notice: Subject to any disclaimer, the term of this patent is extended or adjusted under 35 U.S.C. 154(b) by 249 days.

(21) Appl. No.: 12/886,832

(22) Filed: Sep. 21, 2010

(65) Prior Publication Data

US 2011/0007496 A1  Jan. 13, 2011

Related U.S. Application Data

(63) Continuation of application No. 12/876,507, filed on Sep. 7, 2010, now Pat. No. 8,083,377, and a (Continued)

(51) Int. Cl.
| | |
|---|---|
| *H04N 7/18* | (2006.01) |
| *F21S 8/00* | (2006.01) |
| *F21S 9/02* | (2006.01) |
| *F21S 10/00* | (2006.01) |
| *F21V 21/08* | (2006.01) |

(Continued)

(52) U.S. Cl.
CPC .............. *H04N 7/181* (2013.01); *F21K 9/66* (2016.08); *F21S 4/28* (2016.01); *F21S 8/035* (2013.01); *F21S 8/038* (2013.01); *F21S 9/022* (2013.01); *F21S 10/002* (2013.01); *F21V 14/02* (2013.01); *F21V 21/08* (2013.01); *F21V 21/14* (2013.01); *F21V 23/04* (2013.01); *F21V 29/00* (2013.01); *F21V 33/0052* (2013.01); *G01S 3/7864* (2013.01); *H04N 5/2252* (2013.01); *H04N 5/23241* (2013.01); *F21K 9/235* (2016.08); *F21S 2/005* (2013.01); *F21V 9/08* (2013.01); *F21V 19/006* (2013.01); *F21V 21/22* (2013.01); *F21V 21/29* (2013.01); *F21V 21/30* (2013.01); *F21V 23/0442* (2013.01); *F21V 23/0492* (2013.01); *F21W 2121/00* (2013.01);

(Continued)

(58) Field of Classification Search
CPC ...... F21V 29/004; F21V 29/407; F21V 15/01; F21V 31/00; G03B 21/20; G03B 21/2033
USPC .................................................. 362/641, 642
See application file for complete search history.

(56) References Cited

U.S. PATENT DOCUMENTS

| | | | | |
|---|---|---|---|---|
| 3,143,035 A | * | 8/1964 | Morgan ............... | G03B 21/001 353/87 |
| 3,539,798 A | * | 11/1970 | Perry ..................... | G03B 21/20 353/43 |

(Continued)

*Primary Examiner* — Tsion Tumebo
(74) *Attorney, Agent, or Firm* — Bacon&Thomas, PLLC

(57) ABSTRACT

An LED or laser projection light has more than one function, which may include functions of a conventional all-purpose light device and additional projection light functions using different light sources to project a light beam, image, or digital data from a digital data storage means, as well as functions of a desk top light, floor light, garden light, emergency light, safety light, anti-burglar light, underwater light, street light, reading light, night light, light fixture, motion sensor light, power fail light, photo sensing light, dimmable light, spotlight, seasonal light, Christmas light and/or ornament, licensee products, cartoon character related products, promotion light, commercial light, sign, motion sensor light, blue tooth light, moving device light, car light, vehicle light, boat light, aircraft light, and or multi-function LED light or Laser, with rechargeable or non-rechargeable energy storage kits having preferred circuit means, switch means, sensor means, timer means, IC means, electric parts, and accessories.

20 Claims, 36 Drawing Sheets

Related U.S. Application Data continuation of application No. 12/806,711, filed on Aug. 19, 2010, now Pat. No. 8,074,541, and a continuation of application No. 12/806,284, filed on Aug. 9, 2010, now Pat. No. 8,662,702, and a continuation of application No. 12/806,285, filed on Aug. 9, 2010, now Pat. No. 8,428,934, and a continuation of application No. 12/771,003, filed on Apr. 30, 2010, now Pat. No. 8,408,736, and a continuation of application No. 12/711,456, filed on Feb. 24, 2010, now Pat. No. 8,083,376, and a continuation of application No. 12/710,461, filed on Feb. 23, 2010, now Pat. No. 8,303,158, and a continuation of application No. 12/710,918, filed on Feb. 23, 2010, now Pat. No. 8,277,087, and a continuation of application No. 12/624,621, filed on Nov. 24, 2009, now Pat. No. 8,303,150, and a continuation of application No. 12/622,000, filed on Nov. 19, 2009, now Pat. No. 8,434,927, and a continuation of application No. 12/622,100, filed on Nov. 19, 2009, now abandoned, and a continuation of application No. 12/566,322, filed on Sep. 24, 2009, now abandoned, and a continuation of application No. 12/545,992, filed on Aug. 24, 2009, now Pat. No. 8,164,984, and a continuation of application No. 12/527,629, filed on Aug. 18, 2009, now Pat. No. 8,273,448, and a continuation of application No. 12/527,631, filed on Aug. 18, 2009, now abandoned, and a continuation of application No. 12/527,628, filed on Aug. 18, 2009, now Pat. No. 8,119,723, and a continuation of application No. 12/502,661, filed on Jul. 14, 2009, now Pat. No. 8,342,732, and a continuation of application No. 12/318,471, filed on Dec. 30, 2008, now Pat. No. 8,002,456, and a continuation of application No. 12/318,473, filed on Dec. 30, 2008, now Pat. No. 7,832,918, and a continuation of application No. 12/318,470, filed on Dec. 30, 2008, now abandoned, and a continuation of application No. 12/292,580, filed on Nov. 21, 2008, now Pat. No. 8,305,846, and a continuation of application No. 12/292,153, filed on Nov. 12, 2008, now Pat. No. 7,871,192, and a continuation of application No. 12/232,505, filed on Sep. 18, 2008, now Pat. No. 7,832,917, and a continuation of application No. 12/232,035, filed on Sep. 10, 2008, now Pat. No. 7,824,185, and a continuation of application No. 12/149,963, filed on May 12, 2008, now Pat. No. 7,722,230, and a continuation of application No. 12/149,964, filed on May 12, 2008, now Pat. No. 7,901,115, and a continuation of application No. 12/073,889, filed on Mar. 11, 2008, now Pat. No. 8,827,511, and a continuation of application No. 12/073,095, filed on Feb. 29, 2008, now Pat. No. 7,726,869, and a continuation of application No. 12/007,076, filed on Jan. 7, 2008, now Pat. No. 7,726,841, and a continuation of application No. 12/003,809, filed on Jan. 2, 2008, now abandoned, and a continuation of application No. 12/003,691, filed on Dec. 31, 2007, now Pat. No. 7,726,839, and a continuation of application No. 11/806,711, filed on Jun. 4, 2007, now Pat. No. 7,618,150, and a continuation of application No. 11/806,285, filed on May 31, 2007, and a continuation of application No. 11/806,284, filed on May 31, 2007, now Pat. No. 7,632,004, and a continuation of application No. 11/566,322, filed on Dec. 4, 2006, now abandoned, and a continuation of application No. 11/527,628, filed on Sep. 27, 2006, now Pat. No. 7,611,253, and a continuation of application No. 11/527,631, filed on Sep. 27, 2006, now abandoned, and a continuation of application No. 11/527,629, filed on Sep. 27, 2006, now Pat. No. 8,545,090, and a continuation of application No. 11/498,881, filed on Aug. 4, 2006, now Pat. No. 7,568,829, and a continuation of application No. 11/498,874, filed on Aug. 4, 2006, now abandoned, and a continuation of application No. 11/255,981, filed on Oct. 24, 2005, now Pat. No. 7,455,444, and a continuation of application No. 11/184,771, filed on Jul. 20, 2005, now Pat. No. 7,677,745, and a continuation of application No. 11/152,063, filed on Jun. 15, 2005, now Pat. No. 7,651,365, and a continuation of application No. 11/094,156, filed on Mar. 31, 2005, now Pat. No. 7,318,653, and a continuation of application No. 11/094,215, filed on Mar. 31, 2005, now Pat. No. 7,909,477, and a continuation of application No. 11/094,155, filed on Mar. 31, 2005, now Pat. No. 7,810,985, and a continuation of application No. 11/092,742, filed on Mar. 30, 2005, now Pat. No. 7,997,785, and a continuation of application No. 11/092,741, filed on Mar. 30, 2005, now Pat. No. 7,232,251, and a continuation of application No. 10/954,189, filed on Oct. 1, 2004, now abandoned, and a continuation of application No. 10/902,123, filed on Jul. 30, 2004, now abandoned, and a continuation of application No. 10/883,719, filed on Jul. 6, 2004, now abandoned, and a continuation of application No. 10/883,747, filed on Jul. 6, 2004, now abandoned, and a continuation of application No. 10/341,519, filed on Jan. 14, 2003, now Pat. No. 6,945,663.

(51) Int. Cl.
| | | |
|---|---|---|
| F21V 21/14 | (2006.01) | |
| F21V 23/04 | (2006.01) | |
| F21K 9/66 | (2016.01) | |
| G01S 3/786 | (2006.01) | |
| H04N 5/225 | (2006.01) | |
| H04N 5/232 | (2006.01) | |
| F21V 9/08 | (2018.01) | |
| F21W 121/00 | (2006.01) | |
| F21V 14/02 | (2006.01) | |
| F21V 29/00 | (2015.01) | |
| F21S 4/28 | (2016.01) | |
| F21V 33/00 | (2006.01) | |
| F21V 21/22 | (2006.01) | |
| F21V 21/29 | (2006.01) | |
| F21V 21/30 | (2006.01) | |
| F21Y 115/15 | (2016.01) | |
| F21S 2/00 | (2016.01) | |
| F21Y 115/10 | (2016.01) | |
| F21K 9/235 | (2016.01) | |
| F21V 19/00 | (2006.01) | |

(52) U.S. Cl.
CPC ........ *F21Y 2115/10* (2016.08); *F21Y 2115/15* (2016.08); *Y02B 10/30* (2013.01); *Y10S 362/80* (2013.01)

(56) References Cited

U.S. PATENT DOCUMENTS 4,177,500 A * 12/1979 Nicholl et al. .......... 362/20
4,756,614 A *  7/1988 Kato ............... G03B 21/00
                                              353/110

(56) References Cited

U.S. PATENT DOCUMENTS

| | | | | |
|---|---|---|---|---|
| 5,218,388 A * | 6/1993 | Purdy | G03B 21/50 | 352/236 |
| 5,268,829 A * | 12/1993 | Lo | | 362/259 |
| 5,287,132 A * | 2/1994 | Suzuki | H04N 9/3141 | 348/E5.143 |
| 5,321,449 A * | 6/1994 | Coccoli | G03B 21/001 | 353/43 |
| 5,508,490 A * | 4/1996 | Klose | | 219/121.62 |
| 5,517,264 A * | 5/1996 | Sutton | F21S 8/035 | 353/119 |
| 5,535,230 A * | 7/1996 | Abe | F21K 9/69 | 250/504 R |
| 5,572,817 A * | 11/1996 | Chien | F21S 8/035 | 40/544 |
| 5,667,736 A * | 9/1997 | Chien | F21S 8/035 | 264/1.37 |
| 5,769,684 A * | 6/1998 | Lou | A63H 33/22 | 353/110 |
| 5,842,761 A * | 12/1998 | Futakami | G02F 1/133385 | 353/119 |
| 5,926,440 A * | 7/1999 | Chien | F21S 8/035 | 362/253 |
| 5,934,223 A * | 8/1999 | Ellery-Guy | A01K 15/025 | 119/702 |
| 5,978,051 A * | 11/1999 | Gohman | G02B 26/0875 | 348/766 |
| 6,010,228 A | 1/2000 | Blackman et al. | | 362/95 |
| 6,072,606 A * | 6/2000 | Huether et al. | | 359/15 |
| 6,199,999 B1 * | 3/2001 | Cotton, Jr. | A47C 7/725 | 297/217.6 |
| 6,350,042 B1 * | 2/2002 | Lai | F21V 17/02 | 353/62 |
| 6,351,077 B1 * | 2/2002 | Koyama | | 315/169.3 |
| 6,364,501 B1 * | 4/2002 | Tai | | 362/122 |
| 6,390,647 B1 * | 5/2002 | Shaefer | | 362/276 |
| 6,420,974 B1 * | 7/2002 | Baker et al. | | 340/666 |
| 6,478,453 B2 * | 11/2002 | Lammers | F21V 5/048 | 362/294 |
| 6,719,433 B1 * | 4/2004 | Belliveau | H04N 13/363 | 353/122 |
| 6,727,814 B2 * | 4/2004 | Saltzstein et al. | | 340/531 |
| 6,736,531 B2 * | 5/2004 | Wallach | | 362/414 |
| 6,965,205 B2 * | 11/2005 | Piepgras et al. | | 315/318 |
| 7,267,444 B2 | 9/2007 | Black, Jr. | | |
| 7,357,520 B2 * | 4/2008 | Vitantonio | F16M 11/10 | 353/119 |
| 7,390,092 B2 * | 6/2008 | Belliveau | H05B 47/18 | 353/30 |
| 8,089,691 B2 * | 1/2012 | Arbuckle | G02B 21/16 | 359/363 |
| 8,328,368 B2 * | 12/2012 | Luciano | G03B 21/10 | 353/79 |
| 8,545,028 B2 * | 10/2013 | Fischer | G03B 21/32 | 353/94 |
| 8,657,464 B2 * | 2/2014 | Lundberg | F21V 14/04 | 362/232 |
| 2002/0093296 A1 * | 7/2002 | Belliveau | H05B 47/155 | 315/294 |
| 2002/0101571 A1 * | 8/2002 | Panasewicz | F21V 21/0824 | 353/119 |
| 2003/0117090 A1 * | 6/2003 | Belliveau | G03B 21/2053 | 315/368.28 |
| 2004/0119951 A1 * | 6/2004 | Vitantonio | G03B 21/145 | 353/119 |
| 2005/0174777 A1 * | 8/2005 | Cooper | F21V 23/0471 | 362/276 |
| 2007/0242259 A1 * | 10/2007 | Kawakami | F21K 9/23 | 356/25 |
| 2008/0143966 A1 * | 6/2008 | Mastrosimone-Gese | A63H 33/22 | 353/15 |
| 2011/0062888 A1 * | 3/2011 | Bondy | H05B 45/3725 | 315/294 |
| 2011/0085327 A1 * | 4/2011 | Chen | F21S 6/001 | 362/235 |
| 2012/0320594 A1 * | 12/2012 | Chien | F21V 3/00 | 362/249.03 |

* cited by examiner

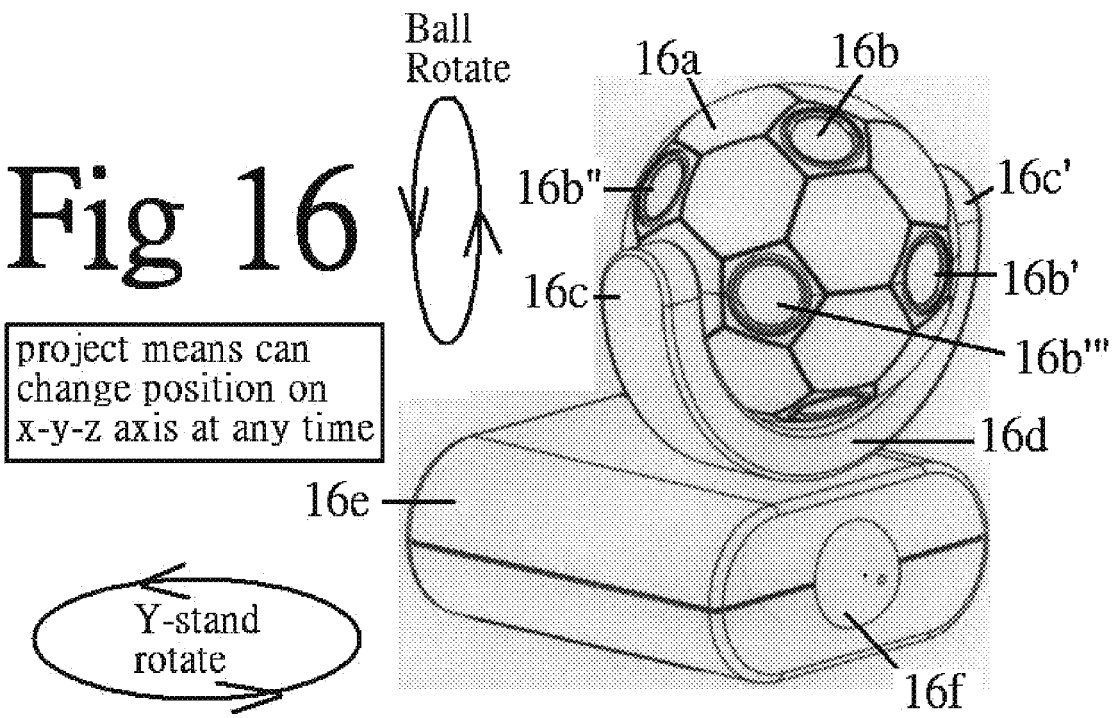
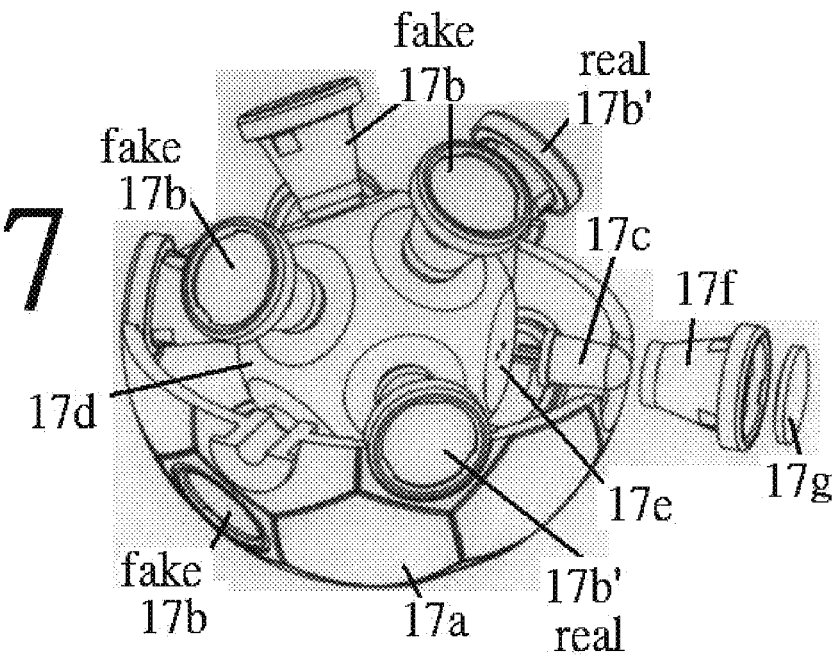

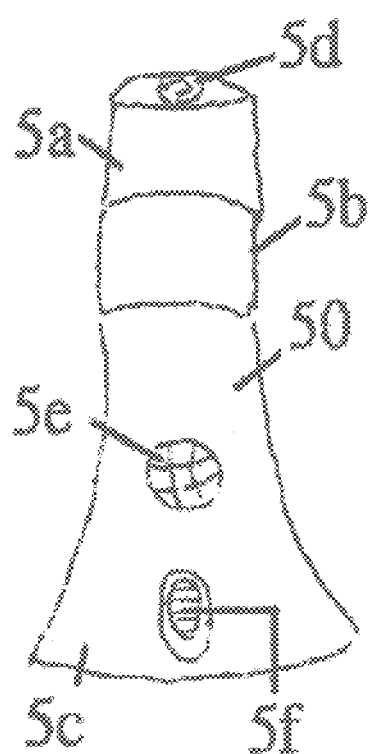
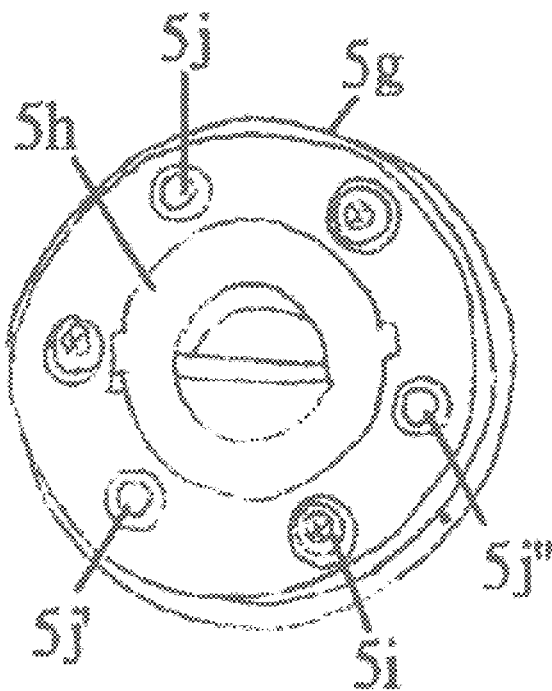
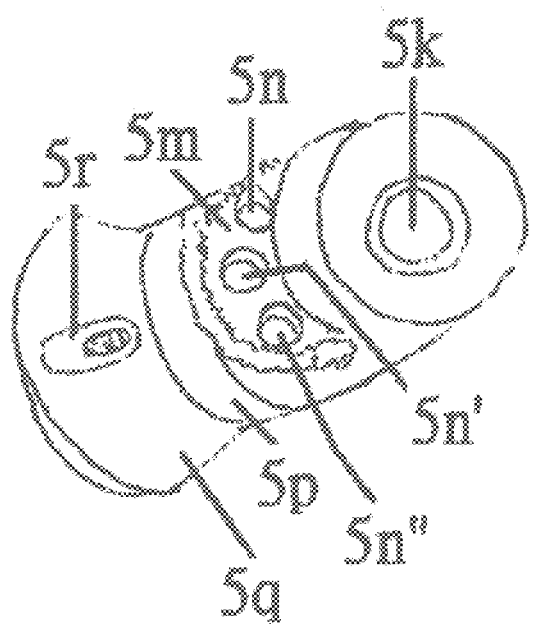
Fig 20

DC Battery pack ← Interchangeable ⇒ AC power sealed-unit

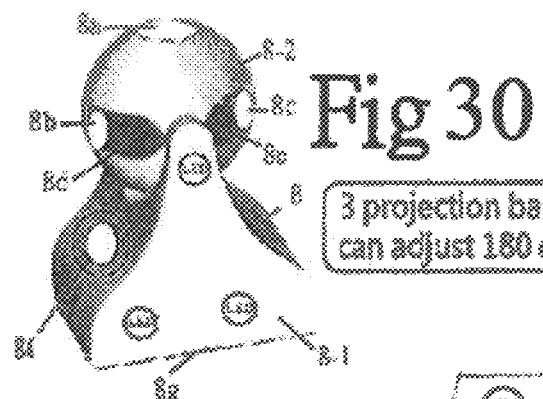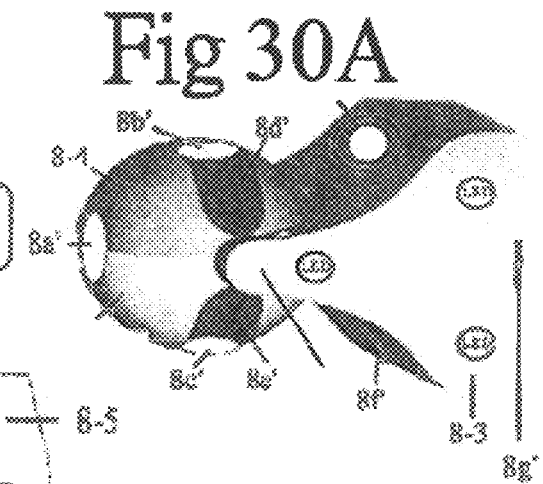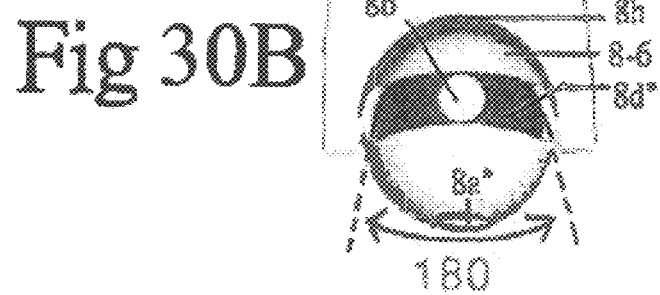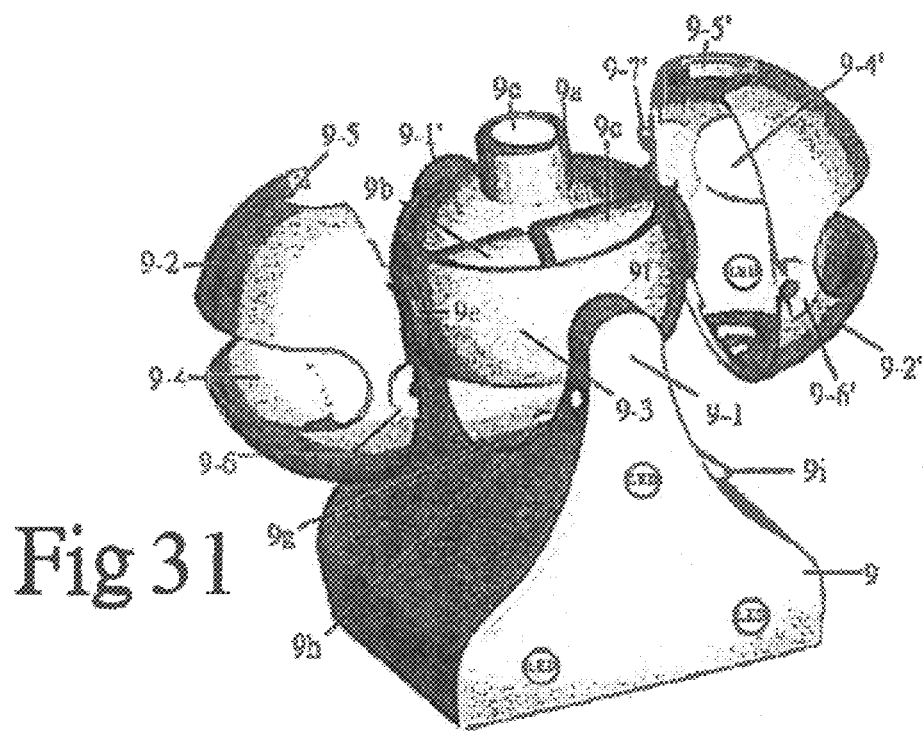

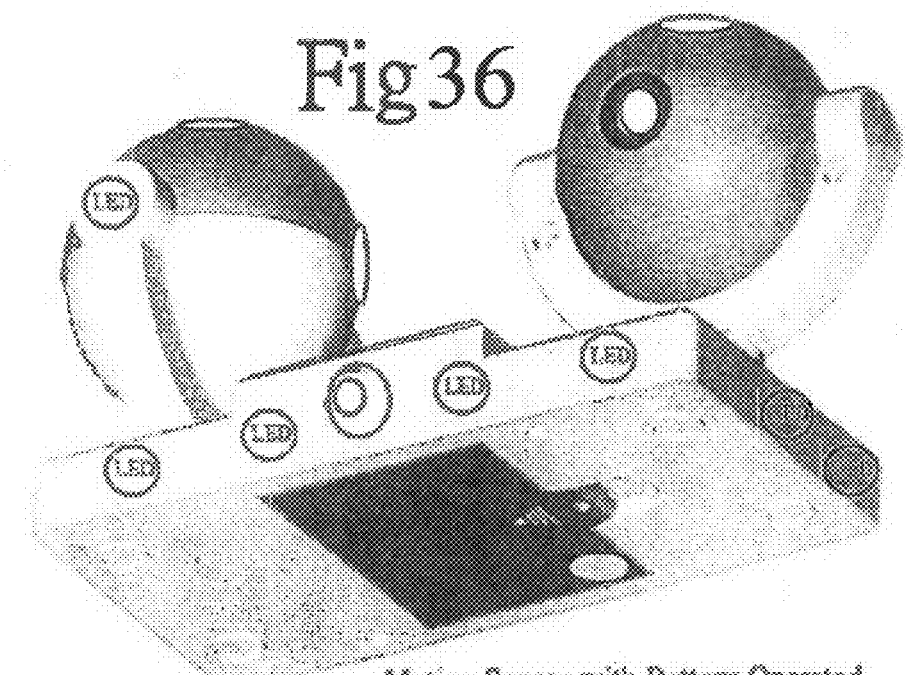
Motion Sensor with Battery Operated LED light Device has more than one project torch
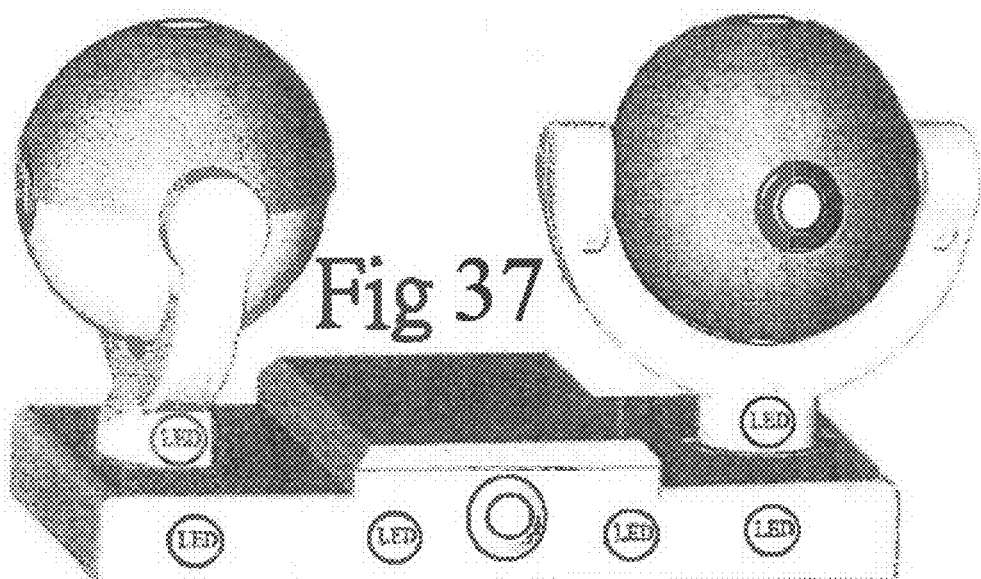
Power fail light with electric cord and plug with build-in Extra LEDs for night light and at least one project torch

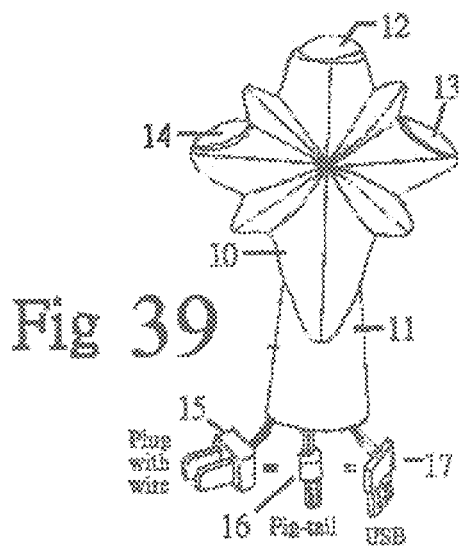
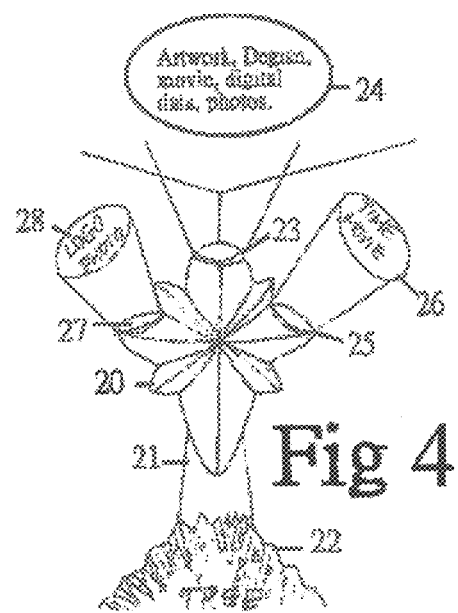
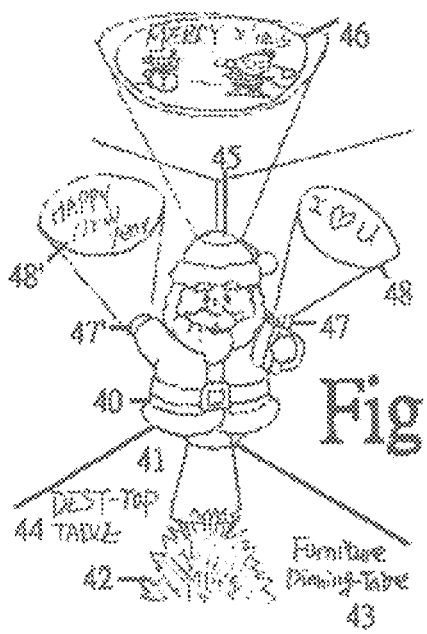
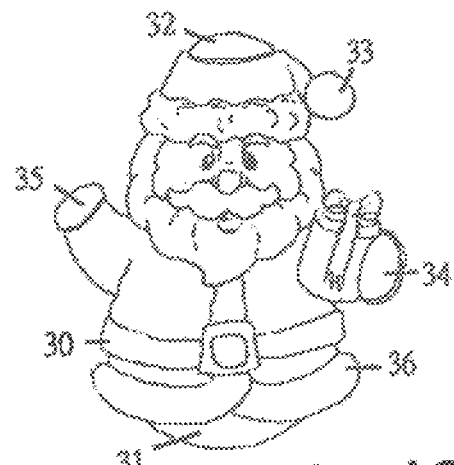

LED light set incorporate with preferred project-kit permernent-fix or Do-It-Yourself by user

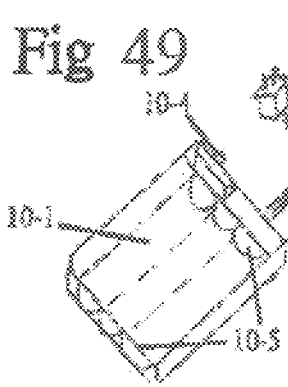
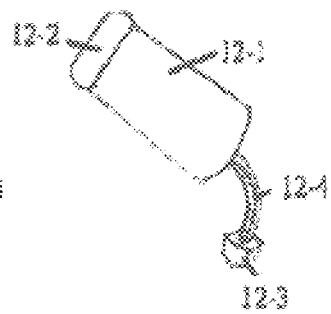
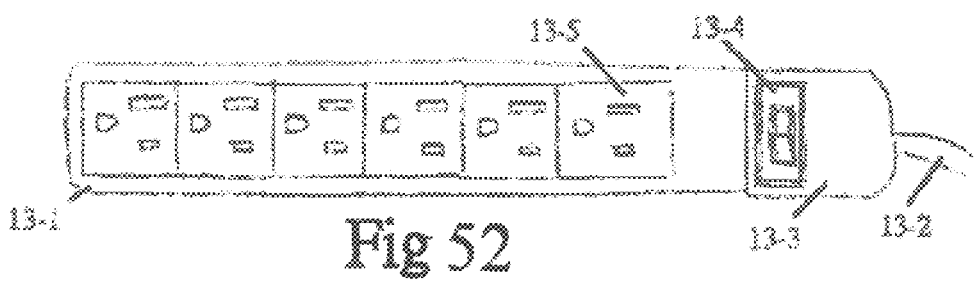
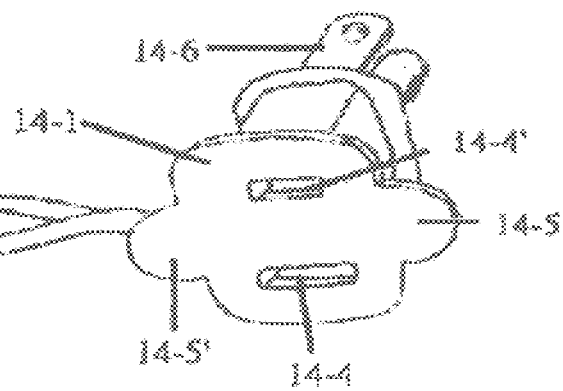
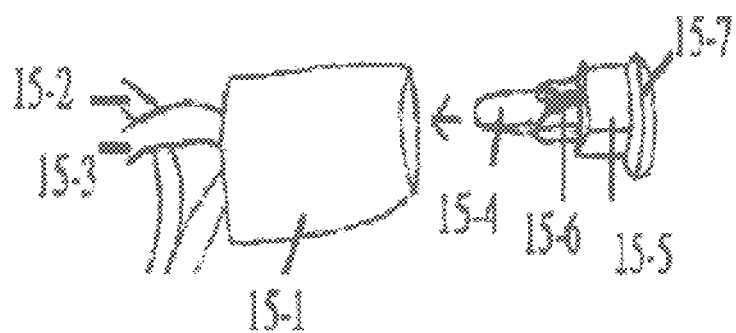

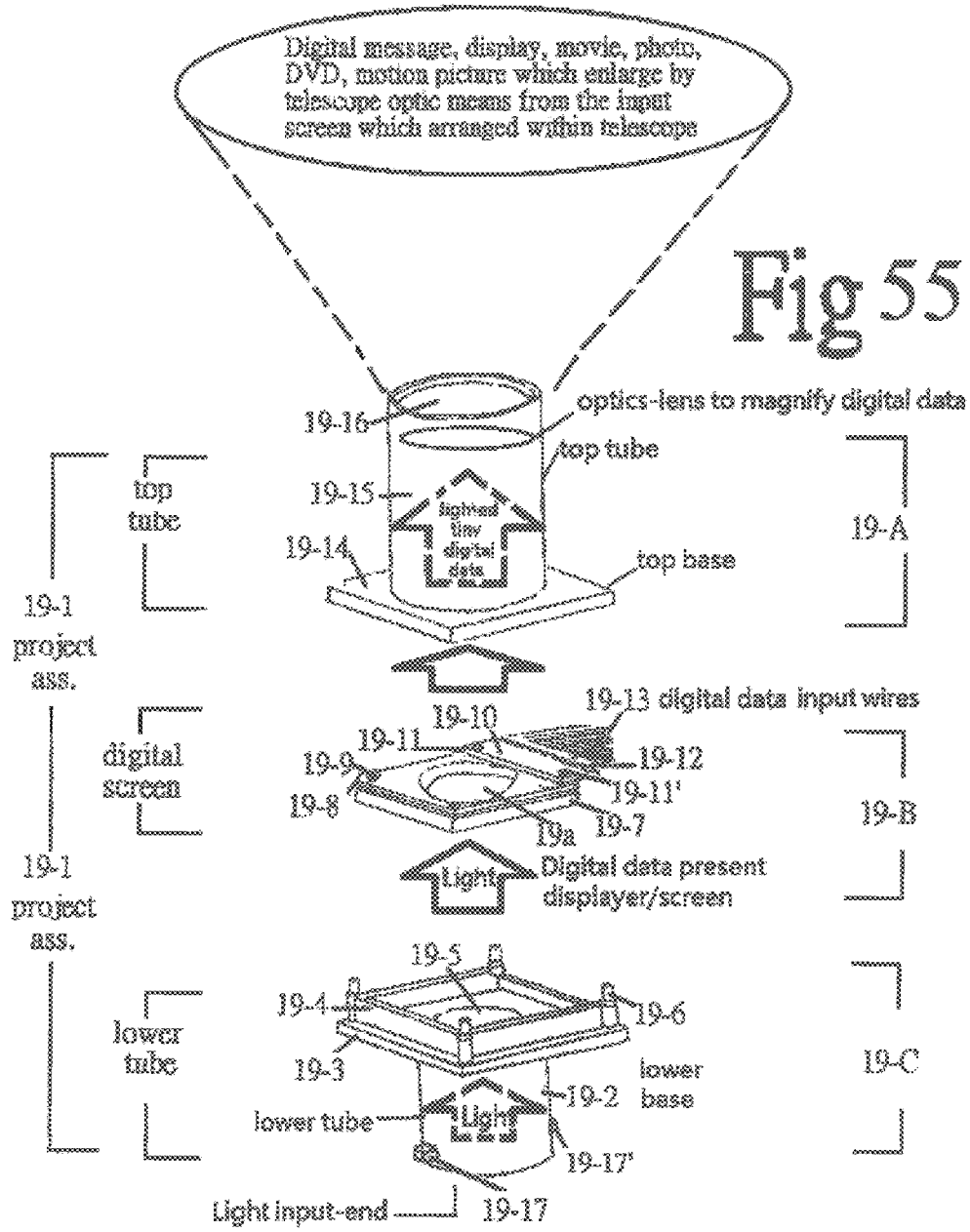

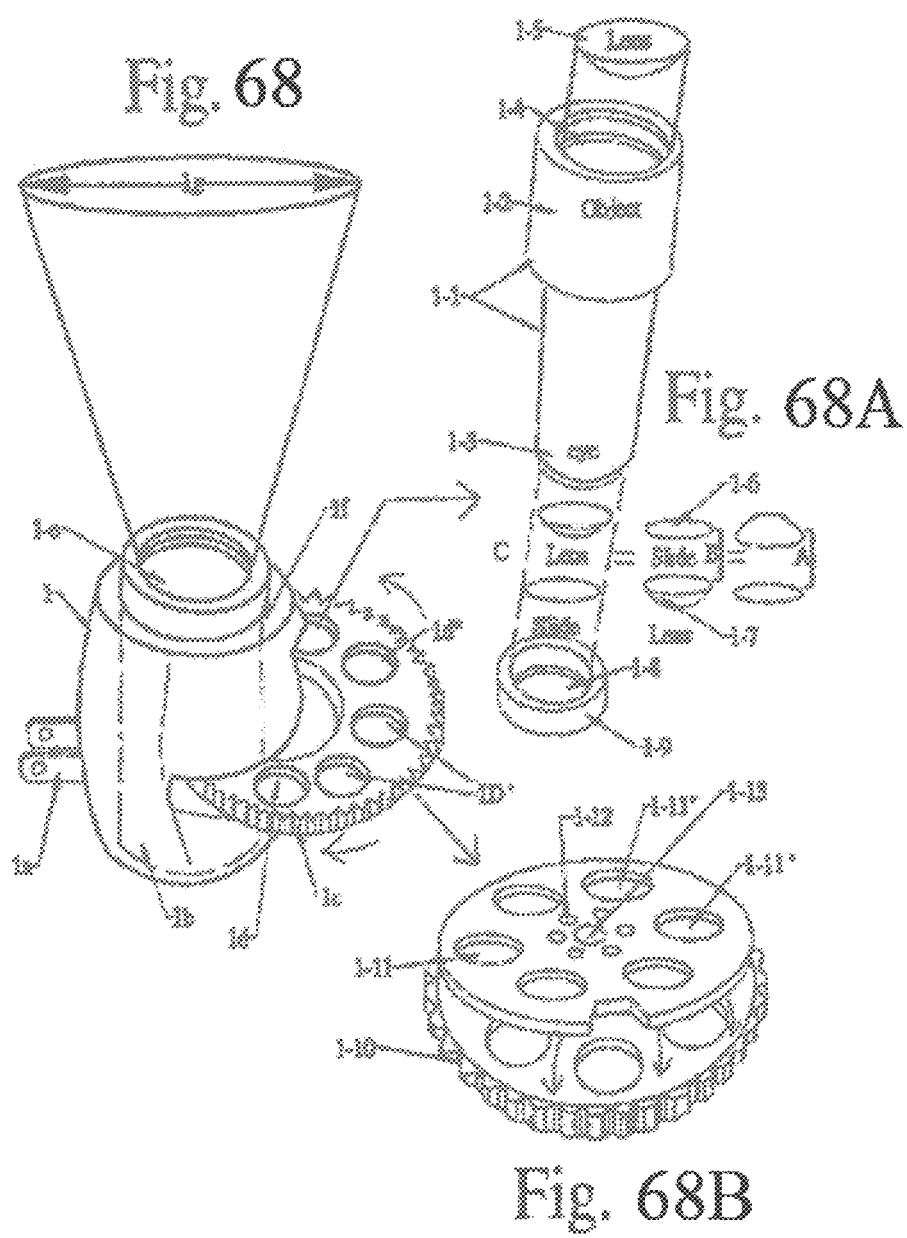

LED OR LASER PROJECT LIGHT HAS MORE THAN 1 FUNCTIONS

BACKGROUND OF THE INVENTION

This application has subject matter in common with the Inventor's U.S. patent application Ser. Nos. 12/624,621, 12/622,100, 12/318,471, 12/318,470, 12/318,473, 12/292,153, 12/232,505, 12/232,035, 12/149,963, 12/149,964, 12/073,095, 12/073,889, 12/007,076, 12/003,691, 12/003,809, 11/806,711, 11/806,285, 11/806,284, 11/566,322, 11/527,628, 11/527,629, 11/498,874, 12/545,992, 12/806,711, 12/806,285, 12/806,284, 12/566,322, 12/527,628, 12/527,629, 12/527,631, 12/502,661, 11/498,881, 11/255,981, 11/184,771, 11/152,063, 11/094,215, 11/092,742, 11/092,741, 11/094,156, 11/094,155, 10/954,189, 10/902,123, 10/883,719, 10/883,747, 10/341,519, 12/545,992, 12/292,580, 12/710,918, 12/622,000, 12/710,561, 12/711,456, 12/771,003, 12/876,507, and 12/887,700.

The above-listed are directed to LED lighting for outdoor or indoor applications that use optics theory to provide novel lighting effects and that are powered by alternating current (AC) or direct current (DC) supplied by electric wire and plug connections to an electrical outlet, a battery, a transformer, a solar cell, or any other power source. The optics theory may be used to create a plurality of LED light beams to provide illumination for close area(s), or to illuminate remote area(s) by projection means and may include any combination of additional features from the above-listed applications, such as the provision of more than one light source, more than one function, more than one optics means, more than one projection means, and/or super power saving circuitry and cost saving concepts. In addition to including features described in the above applications, the LED lighting arrangements of the current invention may further include a projection light which has a motion sensor safety device to shut down the laser beam when kids approach the laser projection light The current invention, like the LED light arrangements of some of the copending applications, ay include an LED projection light having more than one function, because a single projection light function is not good for people to use and wastes people's money if people buy an LED projection light only for one single function. For example, the laser projection light device as briefly discussed above may be incorporated with display-unit(s) made up of a hologram or grating or other skill to project splendid image patterns.

The current invention shares advantages of previously disclosed LED or laser projection lights and provides new advantages as follows:

(I) It generates no heat, does not require as big a space as a conventional C-7 incandescent bulb, and has a low power consumption so that batteries will last a long time, especially when a time delay means is added to control the power consumption.
(II) The LED light beams are narrow so that a smaller optics lens can be used to save a lot of cost, which is especially suitable for key chain laser light designs of the type powered by several button batteries.
(III) The narrow emission angle from the laser light source also more easily enables the laser beam to pass through a hologram, grating or other display-units to present splendid light patterns to viewers. The current invention introduces projection of a display-unit's digital data which may be stored inside digital memory means such as a memory card or memory stick of a digital camera, phone, computer, communication device, or other electronic device which has digital data storage means, so as to project not only a steady image but also a motion picture, movie, DVD, cartoon, digital photo, digital commercial material, digital photos with a continuously changeable display-unit, such digital data normally being shown on an LCD or TFT means which is very expensive for computer, consumer electric products, and communication devices because people view the images directly, whereas projection only requires a tiny LCD or TFT because projection can project the changeable data up to a hundred or thousand times larger on a desired surface to let people view a super large image and even a wall size image to let people view the image as long as the digital data have good pixels. The current invention can easily to use super high power LED or LED(s) or Laser unit(s) to provide good production effects, with a very simple circuit means having digital data reading capability to let the digital data show on the display-unit(s). The LED or Laser projection light can have all kinds of the most popular digital storage means' input slots, in which case the current invention can easily read all the digital data storage means and show all data in super big images. This concept is illustrated in FIGS. 5 and 5-1 with a preferred construction in 4.

Furthermore, the digital data can also be obtained wirelessly using a variety of networks or channels including WIFI, the Internet, WLAN, GPS, AGPS, and GPIS, with up-to-date messages, images, screens, data, information, drawings, and/or relative position transfer. It is very useful for people to view all of the wireless-field data present on the LCD or TFT screen and magnify it by the LED or laser projection light to a large image that allows all changeable updated digital data such as Google™ maps, the Cartoon Channel™, Internet TV, You Tube™ digital data, Facebook™, and all kind of Internet portal's digital data to be seen. The continuously changing updated digital data can be magnified from ten to hundred thousand times bigger to provide a super lower cost because the digital unit(s) only need a small size of LCD or TFT. A suitable small-size TFT can be selected from the marketplace. These include 1", 1.5", 1.8", and 2.4" TFTs with different pixels pixel specifications such as (96×64), (128×128), (320 RGB× 240) or any other specification for a small TFT. The variety of TFTs that may be selected include two preferred models: 1.67" (128 RGB×160) and 1.76" (176 RGB×160) because of their high resolution and small size. It will be appreciated that special custom made TFTs with small size and high pixel resolution will still fall within the current invention scope for the screen of the digital display-unit(s), as may OEL, OLED or other proposed or under-development display screen technologies.

(IV) The LED or Laser projection light of the current invention may also include additional functions disclosed in the above-listed applications, which are instead of or in addition to projection of images or digital data from digital data storage means, including functions of a desk top light, floor light, garden light, emergency light, safety light, anti-burglar light, under water light, street light, reading light, night light, light fixture, motion sensor light, power fail light, photo sensing light, dimmable light, spot light, seasonal light, Christmas light, promotion light, commercial light, sign, motion sensor light, blue tooth light, moving device, car light, vehicle light, boat light, aircraft light, multi-purpose LED or laser light with rechargeable or non-rechargeable energy storage kits and preferred circuit means, switch means, sensor means, timer means, IC means, electric parts and accessories.

(V) The current invention may also be in the form of a low-end LED or Laser projection light which can have just one display-unit for projecting a single image, or a plurality display-units, for example 6, 8, or "N" slides, films, or cartoon characters in a rotatable disc or round-shape to provide a continuous image display unit that automatically or manually changes the display-unit(s) to change the image by means of a motor and gear-set, push button, spring, and teeth, or any other skills, methods, and/or designs that can be used to make a low-end LED projection light. The laser projection light may further incorporate hologram means, grating means with tiny films made by plastic injection or stamping at very low cost for the low-end market.

(VI) Laser project light devices are considered by people to be very dangerous for kids because kids might stare directly at the optics means. The current invention uses one sensor means which is similar to the proximity sensor in a man's toilet, to activate a circuit and shut-off the laser beams and prevent kids from directly staring at the laser beam or LED beams. All of the optics means, optics lenses, and related accessories and parts of this embodiment may otherwise be similar to embodiments that do not include the extra sensor means.

Compare with the (43) US Prior Art as Below;

(1) U.S. Pat. No. 7,390,092=(Belliveau)=U.S. Ser. No. 10/290,660=Filed on Nov. 8, 2012

(Image project lighting device with visible and infra-Red image)

1-a: from Detail Description (Column Line 6)→the '092 Belliveau Teach

"An Apparatus 10 comprised of a central controller 150, a communication interface 138, and IPLE (image projection lighting device) 102, an IPLD 104, and an IPLD 106. The IPLEDs 102, 104, and 106 are electrically connected by communication lines 142, 144, and 146, respectively, to the communication interface 138. The communication interface 138 is electrically connected to the central controller 150 by communication line 136. The central controller 150 may be a dedicated control console or personal computer system.

The IPLDs, 102, 104 and 106 are shown for simple example, although many more IPLDs such as for examples thirty IPLDS each one like any one of 102, 104, and 106 could be use in a lighting system or apparatus, such as apparatus 10. The communication interface 138 may be a router or hub as known in the communications art."

Compare with current invention:

1-b: The current invention only one LED and image-forming piece (slide/film or digital image related displayer) and LED light-beam passing through the said image forming piece to formed lighted image and go through top refractive lens to spread out to big areas shown on indoor or outdoor surface→'932 has camera and central controller and interface those is not use for current invention.

1-c: The current invention has the Top for LED and image-forming piece and refractive lens is fit into upper housing-parts of the said LED light and the said AC-to-DC circuit and conductive prong or AC-plug-wire is fit within the lower housing-part to form one product.→Not same as '092 have many wires to connect with the said IPLDs even up to 30 units.

1-d: The current invention has the said AC-to-DC circuitry or circuit to supply DC current to LED light source→This is not existing on the said '092 text Conclusion→The '092 is nothing to do with current invention for any concept, (2) U.S. Pat. No. 6,199,999=(Cotton)=U.S. Ser. No. 09/203,056=Filed on Dec. 1, 1998

(Lighting system for Theater seating)

2-a: From Abstract description→The '999 teach "A lighting system for use in areas or low-level lighting, such as a planetarium, theater, museum, or auditorium, which improve visibility of objects without detracting from the overall desired low-level lighting."→So '999 is to install and fit within the back of seat which is not movable and connect by prong or AC-plug-wire and people can move to insert into any location outlet for illumination purpose.

Compare with current invention→

2-b: 1-b: The current invention only one LED and image-forming piece (slide/film or digital image related displayer) and LED light-beam passing through the said image forming piece to formed lighted image and go through top refractive lens to spread out to big areas shown on indoor or outdoor surface.→'999 has no such arrangement for crating the image to project far away surface.

2-c: The current invention has the Top for LED and image-forming piece and refractive lens is fit into upper housing-parts of the said LED light and the said AC-to-DC circuit and conductive prong or AC-plug-wire is fit within the lower housing-part to form one product and can plug into any location outlet or connect with AC power source by AC-plug-wire.→Not same as '999 have only built-in the seat related products which is fix there forever not movable and no prong or no AC-plug-wire to connected with outlet.

2-d: The current invention has the said AC-to-DC circuitry or circuit to supply DC current to LED light source→The '999 has no such circuit because 1988 has no any white LED or any brighter LED available at market to create the good projection such as '999 the light source 47, 9a, 9b, 27 and 36 is one of bulb.

2-e: The current invention product is freely move and can fit into any outlet

The said '999 which is install fit within the seat back as Column 3 Line 6 "Which the lighting system 8 is attached to the back 7, the lighting system 8 can also comprises a light source 9a which is depicted as being associated with the support 11, the cover 10 blocks light emitted upwardly from the light source 9a but permits light emitted downwardly toward the ground 6 to escape the light system."→The current invention is to project light to upward to ceiling or emit to far away walls or both . . . . So this is totally different application for products.

Conclusion→The '999 is nothing to do with current invention for any concept, (3) U.S. Pat. No. 5,517,264=(Sutton)=US Series NO. 281,016=Filed on Jul. 27, 1994

(Projector Night Light)

3-1: The '264 shape is television shaped night light (Abstract line 5 and line 7)→The current invention do not have display panel for side.

3-2: The '264 is the One of housing→The current invention has the two or more parts has upper and lower housing parts shown on S. 1, 2, 2-1, 2-2, 3, 4, 5, 5-1, 6, 7, 7-1, 7-2, 8, 9, 10, 10A to 10C, 11, 12, 12A, 13, 14, 15, 16, 17, 18, 19, 20, 21, 24, 26, 27, 28, 30, 30A, 30B, 31, 32, 33, 34A, 34B, 35, 36, 37, 38, 39, 40, 41, 42, 43, 44, 45, 47, 56, 57, 58, 59, 60, 61, 62, 63, 65, 67 and 68. And the refractive lens is installed on under the upper-area of housing-parts and on top-areas of lower positioned inner-tube or inner tube-assembly or housing-parts.

3-3: The '264 is radiation incandescent bulb is powered by AC power source with heat and will melt the top position film or slide→so, Sutton '264 is not practically and will catch fire→The current invention use non-heat, non-radiation LED light source.

3-4: The '264 without any circuit needed→The current invention has clear said AC-to-DC circuit to get DC current from this circuit and circuitry.

3-5: The '264 do not teach adjustable image angle, positon, orientation→The current invention had this feature so can project image to wall or change to ceiling or change to garage door or change to outdoor building.

The current optics-lens (Magnify or refractive lens). This install on the high portion of housing location or-and the said top-area of inner or lower positon tube or tube-set or housing. This is shown on current invention drawing FIGS. 56, 57, 58, 59 and other drawings Compare with '264 which all the lens is lower or recess than the TOP of the Tube or Housing. '264 drawing the big-Image will be limited because the tube or housing wall is HIGHER than magnify lens. This is what '264 DO NOT UNDERSTAND THE OPTICS AT ALL.

3-6. The current invention also teaches
→The current project LED light (Not limited to Night Light, it should be covered all indoor and outdoor project light with current invention simple optics-arrangement). The current invention teach some applications has movable or rotatable (As FIGS. 47, 56, 58, 60, 61, 65, 68, 68A, 68B to move adjust parts or housing or image-carries(s), optic-piece (s) to make the said housing or-and project-assembly or-and image-forming element or-and optics-lens to MOVED, ROTATED, ADJUSTABLE to make the enlarge image to change or moved to other location→This also '264 did not have any discussion at all.

3-8→Movable or rotatable or adjustable

The current invention has join-arms or bar or pole or ears or joint-kit to make the said movable or rotatable or adjustable function and (From FIG. 62 shown the current invention without the wires twisted together or damaged arrangement) . . . . Same As shown on the FIGS. 56, 57, 58, 59 . . . etc.→

Compare with '264 which has nothing can change the enlarge image or patterns or light-beam shown on locations because '264 do not have such constructions.

3-9: location for refractive optics-lens

The current invention the said refractive project optics-lens location is big difference with 2264 fact from current invention FIGS. 56, 57, 58, 59 show the Lens (4e) and (5e) both is on the front of tube or top of inner tube or tube-assembly . . . . It is so clear the optic-lens is NOT INSIDE THE TUBE.

These are major different which '264 have a lot of optics-lens is fit within or inside the tube which also lower than surrounding housing, so the light-beam will be limited to the tube inner diameter and light do not spread-out as the current invention . . . .

3-7: The '264 prior arts compare with the current invention for below other (7 features) vs '264

| Examiner already point out the difference: | | |
| --- | --- | --- |
| Parts: | Sutton '264 | Current Invention |
| 1. Light source | used Bulb which is radiation light source from inside filament and light beam spread out everywhere for 360 degree illumination | LED has limited light beam emit angle such as 30 degree. The current invention also teach 2 groups of LED can be (1) One project function and one for accent light function as FIGS. 3, 3-1, 3-2, 4, or (2) Two groups LEDs both is for project function for different arrangement for different project construction such as FIGS. 10, 10-1, 10-2, 10-3, 10-4, 11, 12, 12A, 16, 17, 18, 19, 24, 28, 29, 30, 31, 32, 33, 34, 35, 36, 37, 38 for different center, sides, surrounding movable project for more than one project applications. |
| 2. Circuit | work directly with AC current no need any circuit | Need AC-to-DC current to meet DC operated LED to work, as the description the circuit including IC or and wireless controller including IR/RF/Bluetooth/wi-fi/Z-way/Zig-bii to change the functions, selection, setting, adjustable or to control more than one LEDs for flashing, sequential on different time, cycle, duty cycle, brightness to get the moving effects so no need use the motor and gear-set. This is other features as current invention had and Sutton do not have this feature for IC control more than one LEDs color and brightness. |

-continued

Examiner already point out the difference:

| Parts: | Sutton '264 | Current Invention |
|---|---|---|
| (1) Heat & Parts | 264 use Bulb which is high temperatures light source, which almost get over 80 degree (C) and will accumulated since bulb is turn-on and start to accumulat. So, '264 bulb heat will need to use Non-Plastic material items (slide 412 and in-out lens 414/415) top of the bulb because all heat is flow to upper and '264 device is put all the parts on top, So, the heat will up to 80 or more higher. This means Top items (slide 412 and in-out lens 414/415) do not (1) Plastic injection Lens (2) Do not be Film or slide which made by plastic subtracts. This will cause the any plastic-object deforming of melt. So, this is reason why Bulb project never show at market. Salton FIG. 4 + 5 + 6 is not possible to has slide (412) put in-front of the Bulb because in-earth not existing such slide (412) can in front of bulb (market all Night light bulb glass around 3 inch VS. 1/4 of bulb glass-body). The 3/4 inch distance between Bulb to slide -->In earth no such technical can make out slide till today. | The current invention used LED because LED is cool light source. The current to project cartoon image which need use the plastic lens and film/slide which all made by plastic. Especially the full colorful cartoon image which need use film or slide so can project out the real image. There is no any replaceable film or slide from current technical and this is '264 do not do at all while use Bulb high-heat light source. ==>Solution: The current invention claim add the Plastic material for (a) image carrier (b) the lens is plastic injection piece to overcome the '264 |
| (2) Light source VS. light path | 264 use Bulb as light source which is radiation light cover 360 degree all over the inside of housing which the top of bulb light brightness is so limited so '264 has the top and side to illuminated the TOP and SIDE display, this is why '264 need a reflector (407) to try to get more light reflected to top but it will not all light into the slide carrier (412) and image (103). | The current invention use LED which has narrow angle for light emit direction so can make all LED light beam emit into tube or-and tube-like housing (corn or cylinder shape). Key at the almost all the light beam is emit into the plastic material image-carrier not like '264 only maybe 15% (top arc of bulb) emit into image carrier. The light path for current invention for projection very simple, LED light-beam passing through front image-forming-unit in any geometric shape or inside or alone of disc, disc with teeth, Gear-unit which is movable or rotatable, or rotating for disc or holder or disc-with-teeth, gear-unit by manual or motor-set as FIGS. 45, 56, 57, 58, 59, 60. Also, the Tray-assembly or tube-like-tray-assembly shown on FIGS. 4 and FIG. 55 show all different tube-like tray, tray, holder, disc and FIGS. 56, 57, 58, 59, 60 show disc-like, disc-with-teeth, gear-unit to load the slide, film, image carrier for rotating or moving by manual or motor-set by manual by automatically, by wireless controller. |
| (3) Light source vs product size | The C7 bulb glass size is around a cigarette light length 3-4 inch which is very long unit already + too hot so do not install any '264 claim (transparent film has image recorded) or image (103) because distance from '264 should be less then 3/4 inch. Because the Bulb is too hot, so all '264 top of housing may need use fiber or super expensive anti-heat plastic + big distance from bulb to arrange lens frame or non-plastic image-forming units. | The current invention used the LED light source which fit into front tube or fit-within the tube-like housing which all light beam is almost 100% inside because LED is fit into or emit into or fit within the tube or tube-like housing. Because it is cool light so do not have any damage the any |

-continued

| Parts: | Sutton '264 | Current Invention |
|---|---|---|
| | This is too big to cause the light device too much weight so prong of night light do not insert into outlet well and not-fall apart. | frame, parts, holder for image-forming unit or the said plastic-lens or plastic film or slide. V.S. '264 add the plastic material for the (a) holder or frame to hold image forming or film or slide (b) clear said the LED is fit-into or-and emit-to or-and fit-within the said tube or-and tube-like housing. |
| (4) Optics theory and concept and lens arrangement Big Difference | '264 has a (project system) different with current invention as below: (A) '264 has more than one lens (414) (415) for image input and image output lens which is different optics theory as the current invention including; (1) has the simple one refractive-project top optics-lens which has the refractive-theory which only need one piece and the MOST IMPORTANT (2) CURRENT INVENTION THE ONLY ONE top refractive project OPTIC-LENS is LOCATED ON TOP-AREA of the Light housing (FIG. 2 Detail description (0048) line 4 to Line 6 "The night light has a top body (2m) with an opening (2e) to allow the telescoping optic-means (2d) lens (2k) to be installed and project . . . " Same as FIG. 3 has opening (3c) on top-area of housing to be installed the optics-lens (3m) => which means magnify-lens is on housing top-area location or top-areas or the inner tube or inner-housing) => this make the Projected image can spread-out to wider areas like current invention can do. V.S. '264 to arrange Image-in (414) or image-out (415) (a) deep inside FIG. 6 (Furthermore image been block out by top frame), or (b) lower than the top surface FIG. 4 and FIG. 10 (image will limited size), so (c) '264 All image size out of the night light will be same size of the '264 claim's "same size of the project-system diameter", so NEVER CAN SPREAD OUT like the current-invention optic-lens ON TOP-areas SURFACE as FIG. 2 (2e) and FIG 3 (3d) and FIG. 4 (4e) and FIG. 5 (5e) shown on current invention ==> This is Totally different for the optics-arrangement and optics-result to get wider spread-out image on ceiling! NOT SAME AS '264 all the image in (414) or image-out (415) is deep inside or far-away from top-surface of the Night light | This is totally different design on the Optics. In spite of (1) the other Liu's LED night light or (2) Not majority light into Image-forming or image-carrier, or (3) no AC-to-DC circuit, or (4) High-heat to destroy the slide (text of '264) or transparent film (claim of '264) Both proof is the FILM or SLIDE made of plastic which equal the '264 is not workable concept --Invalid at all, or (5) Totally different optics-lens arrangement to get different image projected concept, construction, and result, or (6) One top project piece optics-lens on housing top-area or above inner tube or the inner-housing position VS. deep or below the top openings, or (7) cost different, assembly different, optic-theory difference, or (8) Big difference for optics-arrangement which is the most important for projection light which The Optics-design and arrangement is key to make the seasonal image to show out. ==> Basing on these (8) major difference for current fling for (UTILITY PATENT) which only need 1 or 2 different on concept, construction, circuit, design, Optics-lens number, or optics-theory, or optics-locations, or optics-result should get allowed. The current invention has FIG. 4 and 55 show all kind of prevent leakage light tray/holder/disc assembly and also see FIGS. 56, 57, 58, 59, 60 show the disc-with-teeth, or gear-unit drive by motor and its gear-set to make it move, rotating. This is not shown on Sutton concept or text. Furthermore the said slide, film or image-carrier in |

-continued

Examiner already point out the difference:

| Parts: | Sutton '264 | Current Invention |
|---|---|---|
| | | geometric-shape an install or hold by disc, disc-with-teeth, gear-unit as FIG. 56, 57, 58, 59 shown which can be in horizon or vertical arrangement as long as image-carrier is infront of LED or light-source. This is never shown on Sutton or other 20 US prior arts. |
| (5) Optics theory and concept and lens arrangement Big Difference | (d) The '264 lens is make all image go through the 1st image input lens (414) to make all light input to spread-out and go through the 2nd image out-lens which means spread-out wider image to into 2nd optic-lens and spread-out again. This will make image touched or make image is not clear enough. The current invention only used 1 piece of top refractive project optics-lens or outer-cover which is double curved so can make the clear image and simple construction and lower cost especially not MELT or DEFORMING than the '264 FIG. 4 and FIG. 5 for 2 optics-lens. Plug the 6 FIG. is more different for focus adjustment lens need to use 3 pcs or lens and it even more worse the image came out from slide (142) is deviated and part of light is BLOCKED by top (Frame or parts).This is ridiculous optic-design and also too costly than the current invention, (e) . . . More important '264 has 2 or more optics-lens on FIG.5 and FIG. 6 and FIG. 10 not install on top or above the housing, These are different optics construction and theory and arrangement with current invention for optics-result, cost, construction, concept, physics theory. Further move the '264 FIG. 6. So, this is why the '264 claim have to said image need go through the project-system. Not like current invention only 1 pcs of double-sides curved optics-lens is enough and better design. | The current optic-theory for current invention the said project-lens is located on top of the inner-tray assembly as FIG. 45 43, 54, 55, 56, 57, 58, 59, 60 also shown these FIGS. on parent filed case including (#FF-1) and (#TT-2010) or (#DD family drawing) show the disc or disc-with-teeth (gear-unit) rotating with built-in plurality of project-lens or image forming-unit slide or film. Also have claims show have extend-and-retract system like telescope unit for adjust the project-lens distance to the film, slide by manual or automatically as (#FF-1) claims. These are meet current invention for physics theory. |
| i (6) Rotating feature VS. '264 Fix project direction | 264 unit or design is for fixed project direction. The current invention has the ball or sphere or low-high dome shape outer-cover or optics-lens to load the "project LED + image-carrier or displayer + Top surface has refractive lens" inside. So, while force apply to the ball or sphere will also change the project direction. This is never been found by examiner for this unique "ROTATABLE OR ADJUSTABLE THE PROJECT ASSEMBLY OR PROJECTED IMAGE DIRECTION" & "The current invention need all construction for make the electric deliver to inside ball FIG. 4 and FIG. 5" & "The current invention has construction to make the ball movable or rotatable which need extend into main-body housing FIG. 4 & FIG. 5" same as show on current invention show the wires (4f) (4g) (4h) (4i) from Main-Body to passing through the JOINT-EARS and rotatable connector or contactors (4g) (4h) (4g') (4h') of ball and connect with inner LED's electric poles FIG. 4 and FIG. 5". These are shown on the current invention drawing. Which are totally different construction and totally different | Rotating features as FIGS. 45. 43, 54, 55, 56, 57, 58, 59, 60 also shown these FIGS .on parent filed case including (# FF-1) and (#TT-2010) or (# DD family drawing) show the disc or disc-with-teeth (gear-unit) rotating with built-in plurality of image-carrier or project-lens as claims. So, the slide or film or project-lens is rotating by motor and gear-set for desired directions and counter wise or/and anti-counter wise for one or more than one of the optics-lens or grating film to get desired light-effects. Sutton do not have such arrangement. Rotating can incorporate with manual or motor-set by manual or auto IC controller or RF remote controller. |

-continued

Examiner already point out the difference:

| Parts: | Sutton '264 | Current Invention |
|---|---|---|
| | arrangement and totally different result to make the movable or rotatable for the project image device than '264. The current all these movable or rotatable features so can project image to ceiling or wall. Not like '264 only to ceiling for project image. | |
| (7) Image carrier | The '264 claim on text do not have any details description only said (103) slide holder. At the Claim said "Transparent film has image recorded" which can prove it is "Plastic" and within that ¾ inch distance (Compare with Glass top of C7 Bulb which is 3 inch long, from drawing slide holder is within the ½ to ¾ inch) which prove the film will be deforming and melt or too hot cause the "record image" been vanish because it "film or slide" chemical very sensitive to the heat. This equal said '264 patent is not workable item while use C7 bulb which accumulated heat up to 80-100 degree Centigrade so it will melt every plastic or film even PC film. So, this is reason why the current invention is ONLY WAY to use LED cool light source . . . This is major issued offer evidence for '264 is not workable and not equivalent for LED light source. | The image carrier is in front of the LEDs. The image carrier or slide or film can be any geometric shape to allow LED light-beam emitting into to form the tiny lighted image. The image carrier made by plastic or plastic-project-lens with texture or marking or prism lens which also plastic, so bulb as Sutton will deform it or even catch fire. |
| (8) Movable or rotatable or adjustable parts or housing to change or more or adjust the enlarge image | From '264 details description or drawing show nothing for these "Movable or rotatable or adjustable parts or housing to change or more or adjust the enlarge image". (1) From Current invention FIG. 4 and FIG. 5 show very clear the wire-arrangement and Pole/ear for ball housing to make rotating along the 2 ears. (2) Also show the wire (4f) (4g) (4h) (4i) arrangement from base into rotating or movable ball housing, (3) Also shown the rotating contactor (4g) (4h) (4g) (4h') it will not tringle-together for wires while make a rotating or move of ball as FIG. 4 and FIG. 5. (4) Also from FIG. 2 and FIG 3 show to make the enlarge image to change or adjust or move by rotating, movable disc which can install plurality of image-forming or optics-lens. (5) The Abstract discussed the (Magnify optic-lens) and (Bigger image) which very clear the project image is from (SMALL --> Enlarge to Bigger image by Magnify optics-lens) . . . Which it installed on OPENING of TOP HOUSING . . . Not inside tube as '264!! (6) These are all the current invention disclosure and the said '264 never show there really features for projectable. | The current invention and parent filed case has shown Rotating features as FIGS. 45. 43, 54, 55, 56, 57, 58, 59, 60 also shown these FIGS. on parent filed case including (#FF-1) and (#TT-2010) or (#DD family drawing) and also inside parent filed case (#FF) (#HH) series claims said The holder, disc, disc with teeth, gear-set has plurality of the image-carrier, film, slide tit within so can rotating by manual or automatically with how motor-gear-set. Also, the holder, carrier, disc, disc-with-teeth (gear-unit) has built-in project-lens (refractive-lens) so can move or rotatable or show rotating to make desired moving light effects as claims of (#FF-1). |

(4) U.S. Pat. No. 5,535,230=(ABE)=US Series NO. 368,552=Filed on Jan. 3, 1995

(Illuminating light source device using semiconductor laser element)

4-1: The '230 Abe laser illuminating light which is use for a vibrating place or a portion where an electric lamp is hardly exchangeable for new one→This is totally not same as current laser project light for outdoor to present the desired lighted-image, lighted-pattern, light-beam for everyday or seasonal time where has no vibration or difficult replace.

4-2: The '230 laser semiconductor element mainly for outputting a laser beam of a particular wavelength in the range from infra-red ray to ultraviolet ray=>This is different with current invention to use simple Red, or Green or Blue laser light beam go through the grating-piece (Detail definition of grating-piece list on below Big text for definition) .→The current invention does not change any wavelength for input laser light-beam to output end. So, this is different.

4-3: '230 laser to change the wavelength from infra-Red range to Ultra-violet ray→The current invention is keep same wavelength laser input light-beam go through the said diffractive-piece in flat or coiled roll or folded or any geometric shape to allow the single high-wattage laser-beam split or divide into plurality desired shaped-image, shaped-patterns, shaped light-beams.

Conclusion: The totally different wavelength change by semiconductor as '230 compare with current invention for only make one laser light-beam go through the diffractive grating-piece is totally different physics theory and one is Apple one is Noodle . . . . Totally different and no any similar concept, construction, electric or physical at all.

(5) U.S. Pat. No. 5,926,440=(CHIEN)=U.S. Ser. No. 08/923,988=Filed Sep. 5, 1997

(Electro-luminescent night light and time piece)

5-a: The '440 is same inventor prior art for the "Electro-luminescent light source (EL)" The said EL is powered by AC (Alternative current) so no need any AC-to-DC circuitry or circuit to make the illumination.

The current invention has the different light source with the said LED light source that is powered by DC (Direct current) so need AC-to-DC circuitry or circuit to make the LED for illumination.

5-b: The '440 is one unit sealed inside one housing-part and all the EL light-beam is For back-light the front clock-arms or LCD displayer screen to show out time related message to people and also offer light for dark environment. There do not have any magnify or refractive lens to project image or pattern or both to outside the said EL time piece light unit.

The current invention has the upper housing parts has the project-assembly Including LED to emit light-beam to front image forming-piece to form the miniature lighted patterns or image or both to go through the front or top refractive-lens to magnify and project to outside wider areas including ceiling and the said far-away wall or floor or all areas for indoor or outdoor.

Conclusion7

→So, '4440 is totally different light source, different (1) current operated light source, (2) application, (3) different light-effects for back-light and far-away distance image or patterns or both projection (4) different construction for sealed-unit (5) housing can adjustable angle for lighted patterns or image or both (6) different housing number for one sealed-unit v.s. current invention for upper and lower housing-parts. So, the '440 co-inventor's prior art is totally different with current invention.

(6) US 2005-009-4388=(BOTTY)=U.S. Ser. No. 10/699,251=Filed Oct. 31, 2003

(Dual-Beam Lantern-flashlight)

6-1: Booty '388 teach one hand-held lantern have front end light (20) and rear bottom light (29) also act as a handle-bar (22) which also is a battery compartment.

The current invention is 6-1-a: AC powered light get the AC current form wall outlet if terminate the wall outlet power, the built-in night-light will lose power except the power-fail light can still work.

6-1-b: The said current invention get AC power but the inside use LED(s) as light source so need at least one AC-to-DC circuit to get DC current for inner DC powered LED(s) or IC or sensor or power fail circuit to have power for operation.

6-1-c: The '388 application do not have any image-forming, display-unit or image-carrier or may different optional other accessories including motor, gear, gear-set, film holder, tray, disc, disc with teeth, change focus, retract-and-extend similar telescope to change optics-lens position against the inner image-carrier, magnify refractive-lens, so this is total different the theory of optics.

So '388 Botty for dual-beam for DC powered is nothing to do with current invention.

(7) US 2009-0021946=(NOZAKI) U.S. Ser. No. 12/224,364=Filed Mar. 30, 2007

(Projection Device)

7-1: The '364 Nozaki mainly for a camera or digital video device which has the image-catching and image saving kits and the built-in LED(s) to project the image from the DC-powered camera or digital video through a very complicated optic-lens assembly (226), (228a) (228b) which has reflected and triangle-lens to get 90 degree light-beam to change direction from input-end to output-end. These complicated and super expensive optics-lens(s) or lens assembly is not same as the current invention for following difference.

7-2: The current invention have AC power source from outlet and have at least one of the AC-to-DC circuit to get the DC current for inner DC operated LED(s), IC, Circuit, sensor, detector, power fail sensor to make the desired multiple function for Plug-into outlets by prong for indoor application or by AC-Plug-wire for outdoor applications.

7-3: The current invention have refractive optics-lens in front of the image-forming-piece or image-carrier or film or slide and most important the LED light-beam emit out and always is go straight through to image-carrier which in-front of the LED.

7-4: The current invention the do not make the image have 90 degree turn direction as the said '364 lens (228a) 9228b).

Conclusion: This is totally different with current invention.

(8) U.S. Pat. No. 5,404,283=(YANTZ)=US Series No. 861,181=Filed date Mar. 31, 1992

(Outdoor framing projector)

8-1: From '283 column 7 line 65 "The optical system 144, which includes the lamp 142 and a reflector 138, a shutter support 148, a rear lens 150, an optical stop 152 and a front lens 154, occupies substantially the entire lateral area of the interior of the housing 12, because of the size of the elements required and the need for supports for the elements. Compare with the current invention different including:

8-2: '283 YANTZ teach a very expensive and complicated optic-lens system as above listed.=> The current invention had so such complicated optic-system as above list.

8-3: '283 teach a lot of text for recirculation cooling system cools a lamp with the warmed air flowing longitudinally back to front past top and side walls of the housing provided with cooling fans and a return air duct adjacent to the bottom wall drawing air from the prong of the housing back to the inlet of the fan. (Abstract).=> The current invention does not have such "Fan Recirculation System" at all.

8-4: '283 YANTZ shown on column 9 line 11, "As noted above, the lamp 142 is preferably either an incandescent lamp, such as a quartz lamp for example if the projector 10 is to be used in a dimming application or a metal halide high-intensity discharge lamp, which may be desired for long lift and opening economy.

An incandescent lamp, which is shown on the drawings and has been found suitable for use with the reflector specified is commercially available from GTE products Corp, OED Division of Westfield, in., under the commercial designation Sylvania EGG, 750 W. Quartz medium pre-focus. This is a 750 Watt lamp, it being understand that smaller or larger wattage may also be used.

→Compare with current invention for 0.25 Watt or Maximum is 1 to 3 Watt LEDs which no need any fan recirculation. Furthermore, the '283 use 750 Watt for totally different Quartz-Lamp that is totally different light source.

8-5: '283 use Quartz-Lamp for AC power and current invention use LED which is DC powered light source, so current invention need AC-to-DC circuit to get DC current for inner LED(s), IC, Sensor, Switch, Detector, Power fail failure system, motor for rotating the image-carrier or disc with teeth or disc have built-in plurality of the image-carrier or rotating the optics-lens or plurality of optics-lens fit within the disc or holder or rotatable disc-with-teeth or gear-sets.

→So, this is totally different circuit, electric, applications, sensor, trigger system and the rotating the said one or more optics-lens and image-carriers.

8-6" '283 need use reflector system to make light concentrate to front position.

→The current invention is no needed such reflector-system.

Conclusion: This is totally different any aspect.

(9) US prior art=U.S. Pat. No. 7,667,770 MAZZOCHETTE 9-a: '770 teach (Column 2 Line 41) "a retrofit recessed LED down light fixture (10) includes a housing can 12, base 14, generally annular trim 16 and mounting bracket 19, 20 interconnected" and (Column 2 line 64 to 67) "A sealed reflector cone 50 focuses and directs light from the LED array 48 out of the light fixture 10, a heat sink 52 is mounted within the housing can 12"

→The main application and construction is totally different with the current invention has the upper parts for project-assembly (LED+image forming piece+top refractive-lens) and lower housing-parts have at least one for AC-to-DC circuit with prong or AC-plug wire to connect with the anywhere preferred outlets.

Furthermore, the current invention lighted-image or lighted-pattern is emitted to upwardly to ceiling or emit to far-away wall surface or floor or all with adjustable angle kits.→Said '770 is fixed and only can emit light to one location. This also is not same as current invention.

Conclusion: →The '077 is nothing to do with the current invention.

(10) US prior art U.S. Pat. No. 8,657,464 LUNDBERG et al 10-a→(From Abstract) '464 is teach "methods and systems of emitting different light from a multiple mode light emitting device" by a plurality of $1^{st}$ and $2^{nd}$ LEDs in a $1^{st}$ or $2^{nd}$ ring arrangement" with rotatable for $2^{nd}$ LEDs →This is nothing to do with the current invention because the current invention only has one LED for lighted image or patterns or both projection and other LEDs is for the $2^{nd}$ function for night light which no need the said (a) ring arrangement and (b) the said LEDs inside for Night light or other color changing or color selection function without for rotating purpose. (c) The current invention for rotating or spin is for changing the image or-and patterns present location or direction not for rotating the said $2^{nd}$ or $1^{st}$ plurality number of the said $1^{st}$ or $2^{nd}$ LEDs.

10-b→'464 as shown on FIG. 7, the power source for the '464 is one of DC power as the diagram show (LED Power source 702) and also has the reflectors or lens rotating (106/108) which is not existing or current invention and (controller and actuator 502) These 3 major parts of '464 FIG. 7 is not existing and use for current invention at all.

→The current invention has no such 3 major parts of '464 described so '464 is nothing to do with the said lighted image or-and patterns projection which also do not has any magnify project refractive-lens.

Conclusion:

The current invention for (1) projection has only 1 LED and 1 image forming-piece and 1 top magnify refractive projection lens without '464 3 major parts at all so different construction and (2) The current invention use the AC-to-DC circuitry or circuits to get DC power for LEDs which is not same as '464 FIG. 7 show is DC batteries and (3) the current invention without the '464 FIG. 7 for lens (106) and reflector (108) and Motor (706) to make the said LED for rotating and get light concentrate to direction.

→So '464 is nothing to do with current invention.

(11) U.S. Pat. No. 8,089,691 ARBUCKLE 11-a: The '691 is for Desktop Microscope application. The '691 clear describe for the patterns shown on the object plane of the optics-microscope. (Abstract) Line 5 "A pattern mask is located within the illumination path for projecting one or a plurality of objects, structures, or patterns on a samples located at the object plane of the optical microscope"→The current invention for image forming-piece is one of Slide or Film or Digital data displayer that is not "One sample its structures or patterns" and the current invention lighted image or-and patterns is colorful from slide or film or digital displayer image related image which is not the black and white for "object samples".

11-b; The '691 is not a device to have lighted image or-and patterns use only refractive-magnify lens to far-away distance top ceiling or-and surrounding walls→From Abstract line 8 "The pattern mask may be use with structured illumination microscope (SIM) to project a MOVING STRIED OPTICAL GRID PATTERN OR RONCHI BULING ONTO THE SAMPLES at the OBJECT PANE in either fluorescence or reflected bright field imaging→so can prove the said (lighted patterns or image) is totally different.

11-c: The '691 light source (20) or (27) which is came from side-wall into the microscope device and image is present on 90 degree with the light-beam traveling as FIGS. 1, 2, 3. Furthermore the '691 light source (20) (27) not only is came from 90 degree side and need at reflector to change the light-beam into the object-mask so can make clear image of "Sample Object"→This is totally different with current invention that the LED light beam is straight to emit to image-forming-piece and go through the top or front magnify refractive project-lens all 3 major parts for current invention for project-assembly is in one straight-line without (1) Light source from 90 degree side direction, and (2) Need the reflector or mirror to reflect the light source (20) (27) to turn 90 degree into the microscope-tube, and (3) Also, the said '691 has no AC-to-DC current or circuit built-into the said microscope-tube or housing, and (4) The '691 light source has to go though many expensive optic-lens to make the light-beam strong enough to illumination the "Object Samples" the current invention no need such plurality of optics-lens and accessories (19) (59) (24) (60) (62) (64) (66) for get proper light-beam.

Conclusion: The '691 is totally different with current invention.

(12) US prior art—U.S. Pat. No. 7,286,101 HOSAKA 12-a: '101 teach one projector that has $1^{st}$ and $2^{nd}$ display images on opposing side of an image display screen+This is different with current invention that the LED project light has only one lighted image or-and patterns been project out to any outside surface.

12-b: The '101 has pre-designed display screen which is special made for the '101

→Projector and not same as current invention to project lighted-image or-and patterns to anywhere existing of indoor or outdoor surface including ceiling, walls, ground, fence, garage door, building, housing or garden or patio areas or any combination 12-c; From '101 Column 2 (Summary) Can see the '101 special made display screen is one of
- (12-c-1) has reflective parts or transmissive part (column Line 13 to 20), and
- (12-c-2) The image has "incident side" and back (Column line 16 to 26) which is more than one image and current invention without able to project front and back construction, and
- (12-c-3) '101 have to have the reflector (Column 2 line 17) to help to create image which current invention without any reflector or reflective parts for application, and
- (12-c-4) image screen is shown on the opposite side (hereinafter "back side" column 2 line 26), and
- (12-c-5) the display screen is special made and "has plurality of reflective and parts which formed as a narrow strip . . . ", this is totally different with current invention.

→Conclusion: The '101 is nothing to do with current invention.

(13) US prior art—U.S. Pat. No. 8,328,368 LUCIAMO 13-a: '368 teach the laser light source (56) incorporate with mirror (53) (50) to get the multiple reflected laser light beam. This is different light source (Laser VS. current LED).

13-b: '368 incorporated mirror(s) to create the multiple times reflection and also change the light traveling path from straight to $2^{nd}$ angle and to 3re angle to form the plurality of laser light beam-, This is nothing to do with the current invention for 1 single lighted image or-and pattern created by LED light beam go straight to the image-forming-piece and go straight again to the top or front magnify refractive project-lens to spread out to outside the LED light for indoor or outdoor ceiling, walls, fence, garage door, building, house without any reflective-piece and without multiple time reflection to change the single. The said laser light-beam is plurality number of the said laser light-beams.

Conclusion: '101 is nothing to with the current LED project light at all.

(14) US Prior Art (Lai)

The Lai 042

14-1: show the Cylinder body which has a complicated construction to make focus adjustment which compare with the current invention FIG. 1 to FIG. 9 can see the current invention especially the FIG. 2+3+4+5 show the LED light source which is 5 mm Diameter and length around 10 mm. which is totally different with '042 for the light source use.→construction is different at all.

14-2: Lai '042 the power source need to get from outside transformer (12) and through the cord (121) to connect with inner light means (Column 2 line 63 and Column 3 line 11 to line 14)→so this is not same for the current invention LED light source is connected with Built-in housing simple Bridge-circuit because LED only need 20ma current so no need any Big outside transformer (12 of '042) to supply the big current.→So, this is totally different electric arrangement with '042 for transformer and big cord (121) needed.

14-3: Lai '042 the lens (22) and photo (7) is fixed on the lens holder (25) and front case (221) which is a frame construction is not like current invention the (image-forming kit or slide or film and lens) is install a tube or housing which is sealed and prevent light to emit out because LED light beam is very limited light so do not leakage out-) The current invention all image-forming kits/slide/film and project lens is sealed inside the tube or housing . . . The '042 Lai is fixed on a hollow-frame and light can leakage to everywhere.

14-4: Lai '042 The all lens (22) and Photo (7) is sandwich for frame (221) (23) or the (25) (251) which are belong to frame parts with screw to built-up the construction.→Not like current invention for Tube or housing and inside has the installation-gap to install or arrange and not allow Limited LED light beam emit-out.

So these are totally different on (a-1) construction (a-2) electric and power source and circuit (a-3) light leakage and frame leakage light everywhere (a-4) Lens or photos is sand-which on many frame or extra piece so different with current invention for simple installation.

→Conclusion: The Lai is not any similar with current invention for size, construction, concept, circuit so not any similar with Ivan invention.

(15) US Prior art U.S. Pat. No. 5,321,449→

Teach an incandescent bulb Flashlight projection 15-1: The Incandescent flashlight no need to have Bridge-circuit to change the Home appliance electricity AC to the direct current (DC) at certain LED working voltage and current to make the light turn on.

So, the Circuit for Portable flashlight VS. Home use Indoor or outdoor light circuit is different.

→This is not said all light source (Incandescent bulb) and (LED) is same and all belong to light source.

**The Incandescent bulb to use current invention will burn out whole tiny unit because radiation heat and very hot than cold temperatures LED . . . This is not equivalent or replaceable at all.

15-2: The portable Flashlight projection. '449 construction

'449 has the different construction with the current invention for enlarge head (14) at one end which has straight tangential spaced to install the Reflector (28) because the bulb light is radiation spread out so need reflector to concentrate bulb light beam to front.→This is not same as LED light for narrow angle to emit light so no need such (Reflector 28)→This is other construction and light source difference.

15-3: The portable flashlight projection '449

The reflector (28) with integral socket (30) to install the bulb→The current invention the LED on the end of non-reflective tube. Different for '499 install on the reflector.

15-4: The '449 the power source (32) is carried within the housing (24) for illumination the light bulb (20).

→The current invention gets power from outlets which have unlimited power same as home electricity. Not limited power like battery.

15-5: '499 need a switch to manual to turn on and turn off the flashlight.

→The current invention the light is (Automatically) turn on or remote controller or (4) Moving sensors or (5) wireless signals including Zig-bee or wi-fi or Bluetooth or App software. Never need manual switch to turn on and turn off.

15-6: '499 projecting device 10. Includes a flexible holder (40) with a central socket located within the transverse slot (16) in the enlarged head (14)→which is not same as the Current invention Slide or film is install within a light non-leakage tube or housing . . . Not same as '499 to into s disc and disc need a holder (40) to hold it and allow to change slide.

From above (b-1 to b-6) for electric, for construction, for construction, for applications, for power source, and for light device is totally different with current invention.

(16) U.S. Pat. No. 7,001,027—Fujisawa et. Al 16-1: From FIG. 1: Column 4 line 25 "the light source lamp unit 10 that irradiated a light beam emitted by a light source lamp 11" and has an ellipsoidal reflector (212), a-sub-reflection mirror (13) and a parallelizing concave lens (14).

VS. current invention:
→current invention had no such complicated parts (11) (212) (14) to make lighted patterns or image project to outdoors including, fence, wall, building, house, or indoor ceiling, walls, floor and powered by AC or DC powered source.

→The current invention applied LED light source which is not belong to "irradiates light mean" device. LED light for current invention only had 30 degree emit direction so can 100% into tube without light-beam leakage out from tube, or tray, or holder wall even it is more than one piece of tubes, trays, holders are assembled together.

→irradiation light aligned by the eclipse reflector (212),so light parallelized by the parallelizing concave lens (14) and irradiated to the integrator illuminating optics system (20) . . . →The current invention do not have (212) (14) (20) at all.

→'027 has the first lens array (21) and second lens array (22), the current invention has so such (21) (22).

→'027 further PBS array (23) need an alternating of Polarization separating films and reflection mirror→this is totally different refraction optic-lens. The said polarization separating film is a Light-BEAM FILTER . . . Like sunglass to filter out the non-necessary light-beams. The current invention never can use this for colorful lighted patterns or image projection.

So, From the '027 which is totally different optics-construction, optics-theory, optics-elements, optics-lens, light-source(s) and purpose for applications.

(17) US 2002-015-2656 HUANG 17-a: The '656 is one of the Back-light application which the light source is the incandescent bulb (41) and the inner lampshade (30) and a magnifying outer lampshade (32) for the application is too costly→current invention use a limited angle for light-beam and not a radiation light-beam for incandescent bulb (41) so '656 can make 360 degree light passing through the surrounding wall. That is not same as current invention for limited angle have LED light-beam.

17-b: The '656 magnifying glass (32) fixedly mounted on the base (40) over the inner lampshade (30). The outside wall of the magnifying outer lamp shade (32) is not a smooth wall→The current invention had no any WALL have optics-properties furthermore the "Magnify", Also, No idea how the '656 can make for this function on a WALL.

17-c: From [0039] The outer lampshade (32) has a plurality of ribs (W) on the outside wall (34), producing a convex lens effects to magnify the apparent dimensions of the inner lampshade (30) So '656 magnify is by a RIBS on the Wall→The current invention for tens drawing no anyone to make optics-properties on the wall. Do not have any optics-treatment is RIBS ON WALL.

17-d: From '656 all image or sceen to be seen is on the lampshade (32) do not have any image shown on distance away on the ceiling, housing, garage door, or fence or front entrance door→So this totally different application than current invention.

→Conclusion: '656 is other technical for radiation light-source and different application and different construction so nothing to do with current invention.

(18) Re: US prior art—(2005-019-5598) DENES

From the definition for Grating optics-unit for laser light source, which is totally with the '598 for '598 denes diffusing-lens (29) in front of '598 denes 3 light source (43)

18-1: From "Column [0047] line 15→A light source 43 includes three light emitting diode (LED's) that are disposed on the printed circuit board 30 and are configured to project light through a front lens 27, a diffuser lens 29, and a back lens 28."→LED is not the single-wave length so do not project light as above grating-unit for laser (single wave-length light source).

18-2: From the above definition for grating optic-unit for laser light source, '589 Denes show on all text including [0088][0089][0090] [0091][0092][0093][0094] lens 27,28, 1614 and diffuser 10, 1601 can be different thickness or different treatment even has "A lit may also include one or more stick-on labels 95 (See FIG. 1) that may be attached to the lens or lens 27,28 to project a pattern of light from the device. Or as Column [0089] Page 10 Right Line 1" The lenses 27,28, 1614 may also be constructed with one or more shaped cutouts or windows 1634, through which the light may pass, so as to project image on a wall or other surface L1, L2 (See FIG. 18) . . . →The current invention for Laser is only created by "Grating-unit or grating assembly" which without (cutout, opening) or sticker to make lighted patterns. The current invention just needs pre-designed grating-unit with plurality of lines or arts within each mini-meter (nm). No need cutout, no opening, do not have any sticker to form the lighted patterns as '589 Denes.

18-3: From Above comparison:

18-3-a: The current invention is use single wave-length Laser which is not same as LED for non-single wave-length light source.

18-3-b: The current invention laser light source is non-radiation light source and Laser light beam is from laser light source location will emit to object surface for 100 feet away without spread out.

'589 DENES is radiation light source which from location and light beam spread out and more big distance the LED light beam spread more wider so could not emit to long distance.

So, '589 DENES LED light source is not good for outdoor application because '589 DENES use diffuser lens which increase the limited LED brightness LEDs light-beam spread out while light-beam touch the said diffuser lens . . . 10,1601 (Page 10 [column 0090] line 1), or (Page 3 [column 0045] Line 1 "The lens of the present invention may be use in any application where diffused or dispersed a.)

18-5 Basing on above listed (1-1) (1-2) (1-3) all the light source and optics-unit is totally different (a) theory and (b) construction and (c) light-beam traveling and (d) wave-length, (e) light travel distance, (f) lighted patterns forming construction, (g) outdoor lighted patterns shown on far distance capability. So, the '598 is totally different with current laser light with grating unit to make outdoor very bright laser lighted patterns or image.

(19) Re: US prior art (2005-=011-1212) SMITH now is U.S. Pat. No. 7,056,006

19-1: '212 Smith has light bulb (13) is AC power bulb basing on the FIG. 3 electric diagram and powered by the AC current (22) so that is not the LED or even laser light source (laser diode), both need DC power. From the '212 Smith FIG. 3 and text show the light-bulb (13) is incandescent→so this is totally different with current invention for Laser light source.

19-2: From '212 Smith FIG. 1 show the night light 910) has the opening to emit the incandescent bulb light beam to front disc (18) which has desired different front movable design→This is optics-theory for back-light arrangement. And only the multiple wave-length of the incandescent bulb can make the color changing such as [FIG. 4B] use the front disc (18b) has red, orange, yellow, green, blue, violet 6 color film or design to make the back-light light-bulb light-beam to passing and change color.

19-3: From Smith '212 is not a illegally items because the moving parts do not pass the safety standard test for drop & pulling testament.

19-4: Basing the different (a) light source (b) light source wave-length (c) back-light front design VS. laser grating film (d) light traveling distance for light-Bulb is very short maybe only 3 feet VS. laser light-beam over 100 feet (e) circuit need for AC for '212 Smith VS. Laser need at least one AC-to-DC circuit to get desired DC current, (f) light-bulb image only less than 3 feet VS. 100 feet or more laser lighted patterns or image . . . . So '212 Smith is out-of-date device.

→Conclusion:

The said Smith '212 is not any relation with current laser light with grating optics-unit to make out the lighted patterns or image or contour shape project to desired place.

(20) Re: =US Series NO. 281,016=Filed on Jul. 27, 1994 Sutton 4-1: The '264 shape is television shaped night light (Abstract line 5 and line 7)→The current invention (add limitation for cylinder or tubular shape).→The current invention DO NOT have (display panel for side).

4-2: The '264 is the One of housing→The current invention has the two or more parts has upper and lower housing parts. The refractive lens is install on under the upper housing-parts and top of lower positioned tube or tube-assembly or housing→Claim been add the limitation very clear.

4-3: The '264 is radiation incandescent bulb is powered by AC power source with heat and will melt the top postion film or slide→so, Sutton '264 is not practically and will catch fire→The current invention use non-heat, non-radiation LED light source.

4-3: The '264 without any circuit needed→The current invention has clear said AC-to-DC circuit to get DC current from this circuit and circuitry.

4-4: The '264 do not teach adjustable image angle, positon, orientation→current invention had this features so can project image to wall or change to ceiling or change to garage door or change to outdoor building.

4-5: My opti-lens (Magnify or refractive lens)——→This on the Highest location or-and ABOVE the said Tube or tube-set or housing . . . ==>This is shown on Ivan Drawing FIG. 4 and FIG. 5. Those never mentioned for all (Project LED light all my earlier argument)→But this is right for all my products.

Compare with Saltoon which all the lens is lower or recess than the TOP of the Tube or Housing.

Saltoon drawing the Big-Image only will be limited because the tube or housing wall is HIGHER than magnify lens.==>This is what Saltoon DO NOT UNDERSTAND THE OPTICS AT ALL.

(21) Re: US Prior U.S. Pat. No. 7,390,092=Belliveau 1-a: From Detail description (Column line 6)→The '092 Belliveau teach" an Apparatus 10 comprised of a central controller 150, a communication interface 138, and IPLE (image projection lighting device) 102, an IPLD 104, and an IPLD 106. The IPLEDs 102, 104, and 106 are electrically connect by communication lines 142, 144, and 146, respectively, to the communication interface 138. The communication interface 138 is electrically connected to the central controller 150 by communication line 136. The central controller 150 may be a dedicated control console or personal computer system.

The IPLDs, 102, 104 and 106 are shown for simplication although many more IPLDs such as for examples thirty IPLDS each one like any one of 102, 104, and 106 could be use in a lighting system or apparatus, such as apparatus 10. The communication interface 138 may be a router or hub as known in the communications art."

Compare with current invention:

1-b: The current invention only one LED and image-forming piece (slide/film or digital image related displayer) and LED light-beam passing through the said image forming piece to formed lighted image and go through top refractive lens to spread out to big areas shown on indoor or outdoor surface→'932 has camera and central controller and interface those is not use for current invention.

1-c: The current invention has the Top for LED and image-forming piece and refractive lens is fit into upper housing-parts of the said LED light and the said AC-to-DC circuit and conductive prong or AC-plug-wire is fit within the lower housing-part to form one product.→Not same as '092 have many wires to connect with the said IPLDs even up to 30 units.

1-d: The current invention has the said AC-to-DC circuitry or circuit to supply DC current to LED light source→This is not existing on the said '092 text Conclusion→The '092 is nothing to do with current invention for any concept, (22): US Prior art U.S. Pat. No. 6,199,999 Cotton 2-a: From Abstract description→The '999 teach "A lighting system for use in areas or low-level lighting, such as a planetarium, theater, museum, or auditorium, which improve visibility of objects without detracting from the overall desired low-level lighting."→So '999 is to install and fit within the back of seat which is not movable and connect by prong or AC-plug-wire and people can move to insert into any location outlet for illumination purpose.

Compare with current invention→

2-b: 1-b: The current invention only one LED and image-forming piece (slide/film or digital image related displayer) and LED light-beam passing through the said image forming piece to formed lighted image and go through top refractive lens to spread out to big areas shown on indoor or outdoor surface.→'999 has no such arrangement for crating the image to project far away surface.

2-c: The current invention has the Top for LED and image-forming piece and refractive lens is fit into upper housing-parts of the said LED light and the said AC-to-DC circuit and conductive prong or AC-plug-wire is fit within the lower housing-part to form one product and can plug into any location outlet or connect with AC power source by AC-plug-wire.→Not same as '999 have only built-in the seat related products which is fix there forever not movable and no prong or no AC-plug-wire to connected with outlet.

2-d: The current invention has the said AC-to-DC circuitry or circuit to supply

DC current to LED light source→The '999 has no such circuit because 1988 has no any white LED or any brighter LED available at market to create the good projection such as '999 the light source 47, 9a, 9b, 27 and 36 is one of bulb.

2-e: The current invention product is freely move and can fit into any outlet

The said '999 which is install fit within the seat back as
Column 3 Line 6 "Which the lighting system 8 is attached to the back 7, the lighting system 8 can also comprises a light source 9a which is depicted as being associated with the support 11, the cover 10 blocks light emitted upwardly from the light source 9a but permits light emitted downwardly toward the ground 6 to escape the light system."→The current invention is to project light to upward to ceiling or emit to far away walls or both . . . So this is totally different application for products.

Conclusion→The '999 is nothing to do with current invention for any concept,

(23) Re: US prior art=U.S. Pat. No. 7,667,770 Mazzochette 3-a: '770 teach (Column 2 Line 41) "a retrofit recessed LED down light fixture (10) includes a housing can 12, base 14, generally annular trim 16 and mounting bracket 19, 20 interconnected" and (Column 2 line 64 to 67) "A sealed reflector cone 50 focuses and directs light from the LED array 48 out of the light fixture 10, a heat sink 52 is mounted within the housing can 12"

The main application and construction is totally different with the current invention has the upper parts for project-assembly (LED+image forming piece+top refractive-lens) and lower housing-parts have at least one for AC-to-DC circuit with prong or AC-plug wire to connect with the anywhere preferred outlets.

Furthermore, the current invention lighted-image or lighted-pattern is emit to upwardly to ceiling or emit to far-away wall surface or floor or all with adjustable angle kits.→The said '770 is fixed and only can emit light to one locations. This also not same as current invention.

Conclusion:

The '077 is nothing to do with the current invention.

(24) Re: U.S. Pat. No. 5,926,440 Chien; Tseng-Lu.

4-a: The '440 is same inventor prior art for the "Electroluminescent light source (EL)" The said EL is powered by AC (Alternative current) so no need any AC-to-DC circuitry or circuit to make the illumination.

The current invention have the different light source with the said LED light source that is powered by DC (Direct current) so need AC-to-DC circuitry or circuit to make the LED for illumination.

4-b: The '440 is one unit sealed inside one housing-part and all the EL light-beam is for back-light the front clock-arms or LCD displayer screen to show out time related message to people and also offer light for dark environment. There is no any magnify or refractive-lens to project image or pattern or both to outside the said EL time piece light unit.

The current invention has the upper housing parts has the project-assembly including LED to emit light-beam to front image forming-piece to form the miniature lighted patterns or image or both to go through the front or top refractive-lens to magnify and project to outside wider areas including ceiling and the said far-away wall or floor or all areas for indoor or outdoor.

Conclusion7

'440 is totally different light source, different (1) current operated light source, (2) application, (3) different light-effects for back-light and far-away distance image or patterns or both projection (4) different construction for sealed-unit (5) housing can adjustable angle for lighted patterns or image or both (5) different housing number for one sealed-unit v.s. current invention for upper and lower housing-parts.

So, the '440 co-inventor's prior art is totally different with current invention.

(25) Re: US prior art U.S. Pat. No. 8,657,464 Lundberg et al 5-a→(From Abstract) '464 is teach "methods and systems of emitting different light from a multiple mode light emitting device" by a plurality of $1^{st}$ and $2^{nd}$ LEDs in a $1^{st}$ or $2^{nd}$ ring arrangement" with rotatable for $2^{nd}$LEDs.

This is nothing to do with the current invention because the current invention only has one LED for lighted image or patterns or both projection and other LEDs is for the 2nd function for night light which no need the said (a) ring arrangement and (b) the said LEDs inside for Night light or other color changing or color selection function without for rotating purpose. (c) The current invention for rotating or spin is for changing the image or-and patterns present location or direction not for rotating the said $2^{nd}$ or $1^{st}$ plurality number of the said $1^{st}$ or $2^{nd}$ LEDs.

5-b→'464 as shown on FIG. 7, the power source for the '464 is one of DC power as the diagram show (LED Power source 702) and also has the reflectors or lens rotating (106/108) which is not existing or current invention and (controller and actuator 502).

These 3 major parts of '464 FIG. 7 is not existing and use for current invention at all.

The current invention has no such 3 major parts of '464 described so '464 is nothing to do with the said lighted image or-and patterns projection which also has no any magnify project refractive-lens.

Conclusion:

The current invention for (1) projection has only 1 LED and 1 image forming-piece and 1 top magnify refractive projection lens without '464 3 major parts at all so different construction and (2) The current invention use the AC-to-DC circuitry or circuits to get DC power for LEDs which is not same as '464 FIG. 7 show is DC batteries and (3) the current invention without the '464 FIG. 7 for lens (106) and reflector (108) and Motor (706) to make the said LED for rotating and get light concentrate to direction.

So '464 is nothing to do with current invention.

(26) Re: U.S. Pat. No. 8,089,691 Arbuckle 6-a: The '691 is for Desktop Microcope application, The '691 clear describe for the patterns shown on the object plane of the optis-microscope. (Abstract) Line 5 "A pattern mask is located within the illumination path for projecting one or a plurality of objects, structures, or patterns on a samples located at the object plane of the optical microscope"→The current invention for image forming-piece is one of Slide or Film or Digital data displayer that is not "One sample its structures or patterns" and the current invention lighted image or-and patterns is colorful from slide or film or digital displayer image related image which is not the black and white for "object samples".

6-b; The '691 is not a device to have lighted image or-and patterns use only refractive-magnify lens to far-away distance top ceiling or-and surrounding walls→From Abstract line 8 "The pattern mask may be use with structured illumination microscope (SIM) to project a MOVING STRIED OPTICAL GRID PATTERN OR RONCHI BULING ONTO THE SAMPLES at the OBJECT PANE in either fluorescence or reflected brightfield imageing→so can prove the said (lighted patterns or image) is totally different.

6-c: The '691 light source (20) or (27) which is came from side-wall into the microscope device and image is present on 90 degree with the light-beam traveling as FIGS. 1, 2, 3. Furthermore the '691 light source (20) (27) not only is came from 90 degree side and need at reflector to change the light-beam into the object-mask so can make clear iamge of "Sample Object"→This is totally different with current invention that the LED light beam is straight to emit to image-forming-piece and go through the top or front magnify refractive project-lens all 3 major parts for current invention for project-assembly is in one straight-line without
(1) light source from 90 degree side direction, and
(2) need the reflector or mirror to reflecte the light source (20) (27) to turn 90 degree into the microscope-tube, and
(3) Also, the said '691 has no AC-to-DC current or circuit built-into the said microscope-tube or housing, and
(4) The '691 light source has to go though many expensive optic-lens to make the light-beam strong enough to illumination the "Object Samples" the current invention no need such plurality of optics-lens and accessories (19) (59) (24) (60) (62) (64) (66) for get proper light-beam.

Conclusion:
The '691 is totally different with current invention.
(27) Re: US prior art—U.S. Pat. No. 7,286,101 Hosaka 7-a: '101 teach one projector that has $1^{st}$ and $2^{nd}$ display images on opposing side of an image display screen→This is different with current invention that the LED project light has only one lighted image or-and patterns been project out to any outside surface.

7-b: The '101 has pre-designed display screen which is special made for the '101. Projector and not same as current invention to project lighted-image or-and patterns to anywhere existing of indoor or outdoor surface including ceiling, walls, ground, fence, garage door, building, housing or garden or patio areas or any combination.

7-c: From '101 Column 2 (Summary) Can see the '101 special made display screen is one of (7-c-1) has reflective parts or transmissive part (column Line 13 to 20), and (7-c-2) The image has "incident side" and back (Column line 16 to 26) which is more than one image and current invention without able to project front and back construction, and (7-c-3) '101 have to have the reflector (Column 2 line 17) to help to create image which current invention without any reflector or reflective parts for application, and (7-c-4) image screen is shown on the opposite side (hereinafter "back side"—column 2 line 26), and (7-c-5) the display screen is special made and "has plurality of reflective and transmissive parts which formed as a narrow strips", this is totally different with current invention.

Conclusion:
The '101 is nothing to do with current invention.
(28) Re: US prior art—U.S. Pat. No. 8,328,368 Luciamo 8-a: '368 teach the laser light source (56) incorporate with mirror (53) (50) to get the multiple reflected laser light beam==>This is different light source (Laser v.s. current LED).

8-b: '368 incorporated mirror(s) to create the multiple times reflection and also change the light traveling path from straight to $2^{nd}$ angle and to 3re angle to form the plurality of laser light beam→This is nothing to do with the current invention for 1 single lighted image or-and pattern created by LED light beam go straight to the image-forming-piece and go straight again to the top or front magnify refractive project-lens to spread out to outside the LED light for indoor or outdoor ceiling, walls, fence, garage door, building, house without any reflective-piece and without multiple time reflection to change the single the said laser light-beam to plurality number of the said laser light-beams.

Conclusion:
'101 is nothing to with the current LED project light at all.
(29) Re: U.S. Pat. No. 4,438,446 (U.S. application. Ser. No. 11/485,661 filed on Jul. 13, 2006) MCCANN 2-1a: The '446 disclosure one LED light has prong (10) and supply power to inner rechargeable battery (12) and battery have wiring (14) to supply power to the projector (25) and lens (30) to project image on wall.

VS current invention→The current invention 2-1-a-a: Do not have any rechargeable battery, current invention has built-in AC to DC circuit (46) to get DC→So, power system and circuit system is totally Different with '446.

2-1-a-b: The '446 is project image on wall only not able to ceiling as the comment for US prior art Sutton U.S. Pat. No. 5,517,246 for different principle in. '446 Only project to wall and it also can be a night light while cover is closed.

VS current invention→The current invention shown on elected FIG. 4 and Fig. only show is for simple project light functions and same as Sutton '246 same function to shown image on desire indoor and outdoor surface and power by different conductive-means to get AC power source including FIG. 4 show AC-plug wire or FIG. 5 shown by prongs but has no built-in rechargeable battery.

As current invention publication document [0018] has all details comparison for US prior art Sutton U.S. Pat. No. 5,517,246, and '246 which is power by incandescent bulb and film on top of the bulb it will melt and catch fire in minutes, so '246 is one product will let every house, home get-fired for filed-report to ruin every family. This means is Patent is one of none-practice at all.

2-1-a-c: The '446 filed on 2006 lack

The '446 teach the image from projector (15) to show on wall (17) this is identically same as US prior art BLACK U.S. Pat. No. 7,267,444 and current invention have very details discussion on Public document [0019]. The '446 is identically totally copy with the BLACK U.S. Pat. No. 7,267,444 both project image on the outlet-wall, which have Big Head and short legs because the project within so short distance from night light to outlet-wall will be a big problem. While the cover (15) is vertical to floor, the image will be almost same size of cover (15) 1:1 . . . While tilt the cover (15) to over 135 degree as image (17) it will loss the radio for a image (Big head and short leg) as Black '444. Anyway, '446 is 100% copy '444.

VS. current invention, the project image is to non-outlet surface to other wall or ceiling or tdoor building, house, fence, garage door, entrance door and surface shown image is vertical to the light beam travel . . . Not the surface is tilt with light beam traveling.

So, '446 is not same as current invention!
(30) Re: Prior art U.S. Pat. No. 6,431,719 Lau et al.

3-1-a: '719 is one dynamically output different patterns of differently colored light in response to drive signals and shown on the lens (40) which is built-in the said LED light not away from the LED light for any inch.

VS. the current invention→The current invention show the full colorful image or patterns or light-beam is feet away on indoor or outdoor surface(s) including ceiling, walls, fence, garage door, entrance door, floor and all these location is vertical to light-beam traveling feet away distance.

3-2-b: '719 all discussion for how to make dynamically or moving colorful color patterns shown on lens (40) or out from lens (40) from light-housing and decrease the light brightness basing PHYSICS law is [reduce brightness for 9 square times of distance]] VS the current invention for {project=PHYSICS theory} which means the light beam is not seen surround the LED light or said is NO-Light illumination surround the LED light. And, the said [lighted image or lighted patterns or light-beam very clear and sharp image/patterns] Not shown any areas surround the light BUT SHOWN ON FEET away or REMOTE-AREAS.

This is definition for PHYSIC.

3-2-c: '719 lack of any optics-lens to [Project out] lighted patterns or image or light-beam, So, can see light is start from light housing and rapidly reduce basing on distance. VS current invention (1) no light can see surround the light, and (2) all lighted patterns, image, light brightness only show REMOTE-away areas.

So, Nothing to do with current invention for (Traditional Glow light) VS (Project light)

3-3-d: '719 all circuit (50) and switch (S1) (S2) those all belong to make light functions which is available for LEDs for years before the 2002 such as lighted show since 1992 or other toys so this is not any new for LED light.

3-3-e: '719 did not discuss any optics-arrangement, also lack of project-lens which can enlarge the film or slide or other image-forming-element tiny colorful image, patterns to big size and to shown on FEET away show on garden door, entrance door . . . etc.

3-3-f: '719 mainly discuss for colorful LED and colorful light present at single lens (40). VS current invention project the image-forming-element which is a slide or film those carried colorful image, patterns to remote area if the light source become colorful and go through the (full colorful image or pattern inside the slide or film). All the film and slide inside image will become totally wrong. Such as slide or film has peoples if apply '719 Red or Green or Blue color, then, the all slide or film inside people will become RED MAN, GREEN MAN, or BLUE MAN . . . The sea maybe become (RED SEA). The MONTAIN become RED MOUNTAIN, so the '719 is never can apply to project Slide or film carried image or patterns.

→So, '719 is not related to any image, patterns shown ONLY feet away from light housing.

Also, '719 device also lack of more than one of optical-lens to eliminate the brighter spot-light out from LEDs, so it is very ugly light performance. This is reason there had a lot of Later filed patents still have colorful changing color but ONLY apply the different optics-arrangements, still have many many later filed night light is allowed and issued patents.

Even any combination for '426 Mccane and '719 Lau for any parts combination still do not get the current invention including:

a. Lighted image or patterns→Show on feet away from light unit.
b. The image keep the same radio from top to bottom→'426 image is 1:1 so small or Big image but Big-head and short-legs because '426 is copy 100% of Black '444 idea.
c. Both lack of any image-forming-element including film, slide to form the tiny image and lighted by lower LEDs light beam to go through the top or front project-lens not only enlarge size but also spread out to wider view angle shown on feet-away or remote areas surface such as garage door, entrance door and unit can be one of (1) AC powered, (2) AC-to-DC transformer (3) prong AC powered (4) AC-plug-wire powered.
d. Both images are not shown on vertical light-beam traveling surface. '719 is on flat lens without any lighted image or lighted patterns, only color light. Said '426 is shown on same wall of outlet where the light is installed so the image show on the wall lost the correct ratio for Big-head and short-legs because it is worst then BLACk who know need the more optics-lens-assembly to adjust the ratio-issue. So '426 is copy but bad copy and create worse project image than '444.

All above discussion and evidence is show on current invention [Background] Column [0004] to [0017] for 12 features and [Background] Column [0017] to [0025] had comparison for each and all combination prior-arts to show difference and 12 features which big improvement than all prior-arts.

So, the current invention is unique with at least 12 features for indoor and outdoor applications for project lighted image, patterns, light-beams.

Which should not limited for elected FIGS. 4 and 5 . . . . Because all these discussions shown on BACKGROUND!!

(31) Re: US 2001-007-527 Lammers et. Al—

20-1: '527 have the out-of-date LED made on old time 2001. So, the LED brightness is very low as column [0034] line 5 to line 14] only 10 lm up to 35 lm. Also, the old-date LED has no narrow LED so the '527 need incorporate the collimating element (14) for its LED light-source (3) for each FIG. 2A, 2B, 3A, 3B.

20-2: '527 further have the optics-system (40) which has focusing-lens (15) for focusing the collimated light beam which came from collimating-lens (14) on the image-forming surface. From column [0036 line 1 to 6] and FIG. 2A, 2B shown. The reason why needed the optics-system (40) for LED light-source (3) because the old-time do not have narrow-angle emitting LED light.

20-3: '527 from FIG. 2A LED (3) and optics-system (4) which is for optics theory is diffusor function and all the light emit to front/top and sides to reflected by base (14) to make parallel light-beam emit out from the optic-system. From FIG. 3A has show very details light-beam travel path. Same as FIG. 3B, the prism-lens collect all directions LED light-beam and go through the curved front-surface and make all light-beam become parallel to emit to front image-forming surface (6).

20-4: '527 the LED diameter VS inner diameter of elongate tube or housing the radio is 1:8, this is totally different with the current invention because on earlier date low-brightness LED only 5 lm and '527 want to project a big image so enlarge the diameter to try to get larger image or patterns. VS current invention see drawing FIG. 4 LED (4d) diameter VS. inner tube or housings-tube almost 1:1 and the current invention used 2008 LED which through the top refractive lens can measured the lumens is over 35-50 depend on which wattage of LED is preferred.→From LED diameter VS the inner-housing diameter from 1:8 VS 1:1 is totally different optic-arrangement and theory. '527 is use diffusor one cone (FIG. 3A) or prism lens (FIG. 3B) to make the small diameter LED light-source to enlarge to 8 times bigger parallel light-beam arrangement, This means the brightness emit out from LED will become ⅛ brightness. It is very clear the '597 original illumination is 5 lm divide by 8 means the light emit into image-forming surface (6) each point will be only ⅝ lm. This is way too dim for project good, brighter image and it also will reduce brightness from colorful slide and film.

Compare with current invention, the LED output and all light-beam is emit front or emit-to narrow diameter wall and go through multiple reflected and get into front refractive project-lens which is keep the 100% of output LED light-source which can be measured for up tO 35 to 50 lumens.

This is big difference for optics-arrangement.

20-5; '597 use only one LED with optics-system [Column ABSTRACT line 8 to line 10] "Preferably, the luminaire comprises only one LED (s) which during operation, has a luminous flux of at least 5 lm.". VS current invention Public date [0004] apply more than one LEDs Ser. No. 11/255,981 (More than one LEDs) and column [0014] [0015] all said the "a plurality of slides that serve as an optic-means to create an image at a desired position while allow the image to be changed" in front of SUPER BRIGHT LED.

So, current invention apply is super brightness LED behind of plurality of changeable position of plurality of image-forming-piece inside a rotatable disc or holder as FIGS. 1, 1A, 1B, 2, 4 shown.

Compare with current invention→

20-6: The current invention incorporate with the inner-tube or housing-parts to make majority LED light-beam to front position of image-forming-piece for inner-tube or housing-parts and go through the front-area of tube or front-area of housing-parts project-lens to make refraction of the tiny lighted-image to wider areas with bigger size and clear image.

20-7: '597 do not have any construction to change the slide or film VS current invention many important features on publication data including;

20-7-a: publication [0007] also have a different construction which enables a person to change the slides by a roller or push button or other mechanical means. This will enable night light to exhibit a plurality of different images that can be selected to project on the desired locations.

20-7 b: Publication [0008] may utilize an optic-means having adjust-means to adjust the optic-means at any time and change the position of image to any desired location by a tilt, rotating, or swivel mechanism, or adjustment-facilitating other construction.→This means plurality of optics-lens or image-forming-piece can be change position by rotating, or tilt or swivel devices . . . where plurality of optics-lens or slide or film may fit within the movable disc, holder, tray as FIG. 1, 1A, 1B, 2, 3, 5A, 5B, 5C, 5D, 5E, 5F, 5G shown all details drawing and text.

2-7C: Publication [0013] current invention has more than one LEDs and more than one optics-lens as co-inventor parent filed case which all not possible for the '597.

2-7D: '597 need supporter (20) and flexible-leg (21) for application→which is not same as current invention (a) have prong [FIG. 9] or (b) AC-plug-wire [FIG. 4] to plug into outlet from wall or extension cord, or have DC power from battery or outside AC-to-DC circuit built-in interchangeable power source or transformer without supporter (20) and flexible-legs (21) just put the project light on the surface [FIG. 4] such as table or ground top→This major different for product categories is not same as the current invention.

2-7E: [0017] current invention has outside housing is one of (Sealed unit) which has preferred prong or AC-Plug-wires, circuit, trigger means, LED or LED connector, the components being sealed within the (sealed unit) which may is (transformer). And (sealed unit" to pass all relevant home appliance safety standards required for certification.

'597 do not have this "Interchangeable power source" which can change with the (prong power unit). [0018] line 9 to line 12, The "sealed-unit" of FIGS. 3,4 like that of FIGS. 2 and 3, can be replaced by a "battery pack" to change from an "AC powered by prong or AC-plug-wire" night light to a battery or DC operated night light by battery or sealed-unit in form of AC-to-DC transformer.→Those features is not possible for the '597 model can do. Also, current invention listed (Sealed unit) as [0032] [0033] [0034] [0035], so very clear the co-pending parent filed cases had all above discussed features which is never work for '597 concept.

2-7F; [0018] as FIGS. 4 and 5 illustrate LED project night light, which includes adjustments to change the project direction by rotation.

And [0019] details of mechanical means which can change the slide by push-button.

And [0026] night light has alternative construction including different tilt, swivel, rotating, projection-position change means, focus-adjustable means, and/or slide change features still fall within the scope of the current invention.

These adjustable, rotatable, tilt-able adjust device INSIDE the LED project light is not happen and discussed of '597 device.

→Basing on above discussed all different for (1) Optic Theory (2) Construction '597 have support (20) and flexible-legs (21) current invention no need these (3) LED need reflector and diffusor to make the light emit to 8 times bigger inner tube VS current invention LED light-beam is within almost 1:1 diameter of LED VS inner tube diameter, so optics arrangement is diffent at all. '597 is diffusion LED light to wider inner tube, current invention as FIG. 4 and FIG. 7 both is almost 1:1 so can get all light not reduce brightness from LED to top project-lens. Not like '597 is only keep ⅛ brightness because it diffusing to 8 times bigger space.

(4) '597 no any construction or rotatable/replaceable/detachable disc or holder or tray can rotate so can change the plurality of inner optics-lens or slides or films to change position by manual or automatic or motor/gear-sets to change the slide, film, optic project-lens to get different or dynamite or moving or changeable image, patterns, light-beam effects.

(5) '597 did not show multiple color LEDs VS current invention FIG. 7 show the multiple LED with electrode-poles (77a) (77b) (77c) (77d) even the said LED diameter VS inner tube diameter is 1:1 still can offer multiple color light effects while the LED project light incorporate with control circuit or said IC circuit and trigger means.

(6) '597 diameter of LED VS inner tube is more than 1:8 which will loose the LED 100% brightness emit into front image-forming surface (6) only become ⅛ brightness FIGS. 2A, 2B, 3A, 3B that is bad brightness only ⅛ of LED output brightness, VS. current invention is 1:1 to get 100% brightness go through front slide or films or one of plurality of slides/films of rotatable/replaceable/detachable disc, holder, tray, carrier which is totally different than current invention FIG. 4 and FIG. 7.

(7) '597 LAMMER is more similar with the [Prior art Lammers 2001-0005-727='727 compare with 2002-0101-571='571 PANASEWICZ]

However, the both big difference with current invention for 7-1: Lack of Multiple color LED because both construction can not have more than one of LEDs light source because had the reflector to collect the side-light-beams which need accurate calculation. The light-beam have to collected for both prior arts.

7-2: Lack of IC or circuitry to make color changing, color selection, functions changing, sequential or chasing or changeable colors effects because both (7-2-1) no send light source can install (7-2-2) no IC discussed inside both text at all.

7-3: Both '727 and '571 both need base or support (20) and flexible foot (21) to install the light. The current invention no need such parts. Just put the project light on the ground or garden or desktop or plug-in wall out.

So, These are big difference too.!

Further, The different including following details (a) The Current invention no need any collimating-lens (14) or focusing-lens (15) both form the said '527 optics-system (4)→The current invention apply the desired light-emitting-angle LED so can let all or majority LED light-beam emit into the inner-tube or inner-housing of project-light.

(b) The current invention LED project light has AC-to-DC circuit to get DC current to the LEDs with pre-determined circuit and desired sensor(s) to plug into AC out device not like '527 on abstract last statement "the invention is a compact, light-weight, low-energy and lower maintenance luminaire". The current invention is not for compact because had prongs or AC-wire so not a carrying item.

(c) The '527 apply out-of-date LED technical such as column [0010] line 13 for "color wheel" and line 19 for "A suitable combination of LEDs also enable white light to be obtainerd"——→This is different with current invention for apply the image-forming-piece preferred is slide or film or printed or painting piece and the LED light emit is white light so can created the colorful lighted image no need the '527 for "Color wheel" or "suitable combination different colors LEDs to get white color"→This means the technical for '527 is out-of-date. The current invention used the 2005 update white LED with sufficient brightness on after date for the current invention so the parent of current invention filed on 2008 since the white LED had sufficient brightness LED-light-beam go through colorful slide or film so can project the full colorful image for façade of building, housing, interior housing ceiling, walls. Or outdoor garden, fence . . . etc.

Conclusion: '527 is not same for (i) The current invention has pre-determined circuit and the control-circuit (or IC) or electric circuit not like '527 said the control electronics may be suitable outside the housing Column [0029] last sentence.

(ii) The optics-theory of '527 with collimating-lens (14) and focus-lens (15) to form the optics-assembly (4) to get parallel light-beams to front image-forming-piece.

(iii) the current invention apply the update white LED so emit the white LED light-beam to glow the colorful film, slide without need for suitable-combination to get white color light-beam as '527 technical available on 2001.

(iv) The current invention have details construction for movable, replaceable, detachable disk or holder or tray for plurality of slide, film, optics-lens fit within to make changeable image/patterns which '527 do not have.

(v) The current invention have details construction for geometric housing which is movable or rotatable including ball or sphere or elongate, or cylinder shape housing and easily to change the project-directions which '527 do not have.

Final Conclusion: The lighting most important at the Optics-Arrangement and construction because it will have totally different (a) brightness (b) colors (c) steady, fixed, changeable, dynamite, motion, moving light effects, (d) changeable disc or tray or holder which has built-in plurality of slides, films, optic-lens, project-lens. (f) power sources, (g) how to get power source(s), (h) multiple (h) color or only single color→compare with '597 that is totally different with above discussed from both text and figures.

(32) Re: US 2003-020-6415 LEVINE

1: '415 teach a a light modulating component formed from an optically trasmissive material and having a diffractive construction; and the light source being positioned such that, in use, light therefrom passes through the light modulating component to thereby illuminate a light receiving surface to produce an optical illumination effect, and Suitable optically transmissive materials for the composition of the crystal 2 include glass, lead crystal and polycarbonate. The modulating component 2 may be formed from an amorphous lump of light transmissive material, but is preferably formed with an outside surface comprising planar facets.

→so this is "amorphous lump of light transmissive material, but is preferably formed with an outside surface comprising planar facets." VS. current invention 1-1; Image forming unit: is one of film, slide, printed piece, digital data display which is flat or coiled to cylinder in front of LED(s).

1-2: The image forming unit is fit within inner tube or inner tube-assembly or inner of housing in front of LED.

1-3: The '415 outside surface comprising planar facets-) This means is not a flat piece and it is a LUMP or multiple outside surface(s) unit as FIG. 2 show.

1-4: The '415 [0013] A second light modulating component (4) may be provided for modulating the light either before or after it passed through the first light modulating component (Crystal which is Lump of plannar facets that is many small surface). This second light modulating component may be a diffraction grating, or may be a textured glass or acrylic, or could include both.

VS. current invention, The diffraction grating is not workable for LED light source and current invention only have flat or coiled-flat-piece of printed film or slide or film in front of LED, No need $2^{nd}$ any "Diffraction grating" or "textures glass" as $2^{nd}$ light modulating components to spoil the image or patterns carried on image-forming-unit(s).

1-5: '415 light source [0010] The light source may include at least one of the following group: gas discharge laser, diode laser and coloured LED. VS current invention (a) current invention do not have laser or diode laser. Also, the current invention image-forming-unit is one of film or slide or printed piece which already have desired arts or design or photos carried on, if use '415 colorful LED the photos may skin will changed to colorful such as Red, Green, Blue become alien or monster. So, The 3 of the '415 light source is not workable for current invention.

Basing on the above (1-1) to (1-5) '415 is totally different for (a) light source (2) Image-forming-unit (3) top project-lens with current invention of major 3 project-system of current image or pattern project light. It also, the '415 is not for outdoor application because lack of the AC-wires or External AC-to-DC transformer or lack of environment protection kits for totally different application.

Also, '415 for indoor applications also totally different basic 3 project-parts (1) LED (2) image-forming-unit (3) project lens and also totally different for COLORFUL LED for the front slide, film, printed-piece which is flat or coiled arrangement in front of LED.

(33) Re: US 2008-006-2681 BELLIVEAU (Same as Above listed No. 1 &21)

VS. Current invention for Economic Image and pattern projection device for outdoor application has most economic parts as inventor publication text can see totally different with '092 expensive for stage or concert applications:

Current invention details of construction as below:

Conclusion→The '092 is nothing to do with current invention for any concept,

(33) '092 system is way too complicated and too costly VS current invention description discussed for features as publication text as below;

line 7 text→This is the basic model and most economical cost for the LED project light which only has
 (1) 1pc LED (10e')
 (2) 1 tube (10d') which inner diameter just allow LED body (10e') can fit within
 (3) Tiny display-unit (slide) just can fit within the tube (10 d') inner diameter
 (4) One smallest magnify optic-lens (under housing top opening) which just cover the tube (10 d') inner diameter so it is the smallest and the lowest cost.

The function for this simple and most preferred embodiment has the features (a) The LED (10e') light beam is emit to the top display-unit (slide) and emit to the top magnify optics-lens in perpendicular or vertical or 90 degree so the bigger-size of image will not has the image ratio or deviation to lose the display-unit (slide) tiny-image ratio and tiny-image. This is very important improvement than US Prior art Mr. Black to try to make image parallel to the LED light beam traveling direction which too easily to lose correct ratio for any image such as people it will have big head and short leg.

(b) The tube is designed to fit just allow the narrow LED light beam maybe only 15 degree viewing angle to emit into the smallest tube inner-diameter, so this will make the related expensive display-unit (slide) and top magnify optic-lens both become smaller. Both the slide and magnify optics-lens more bigger-size will cost multiple times cost. So this is current invention other features to let people enjoy nice bigger-size projection image but use the lowest cost to has.

(c) The current invention created the bigger-size image which up to tens to hundred thousand time than the tiny-size display-unit within the smallest tube-diameter

(34) Re: US 20007-003-5705 HURD

(34) '705 system is way too complicated and too costly VS current invention description discussed for features as publication text as below;

line 7 text→This is the basic model and most economical cost for the LED project light which only has
 (1) 1pc LED (10e')
 (2) 1 tube (10d') which inner diameter just allow LED body (10 e') can fit within
 (3) Tiny display-unit (slide) just can fit within the tube (10 d') inner diameter
 (4) One smallest magnify optic-lens (under housing top opening) which just cover the tube (10 d') inner diameter so it is the smallest and the lowest cost.

The function for this simple and most preferred embodiment has the features (a) The LED (10 e') light beam is emit to the top display-unit (slide) and emit to the top magnify optics-lens in perpendicular or vertical or 90 degree so the bigger-size of image will not has the image ratio or deviation to lose the display-unit (slide) tiny-image ratio and tiny-image. This is very important improvement than US Prior art Mr. Black to try to make image parallel to the LED light beam traveling direction which too easily to lose correct ratio for any image such as people it will have big head and short leg.

(b) The tube is designed to fit just allow the narrow LED light beam maybe only 15 degree viewing angle to emit into the smallest tube inner-diameter, so this will make the related expensive display-unit (slide) and top magnify optic-lens both become smaller. Both the slide and magnify optics-lens more bigger-size will cost multiple times cost. So this is current invention other features to let people enjoy nice bigger-size projection image but use the lowest cost to has.

(c) The current invention created the bigger-size image which up to tens to hundred thousand time than the tiny-size display-unit within the smallest tube-diameter Conclusion: '705 expensive image project device is for office or professional use like Zerox or Sharp or other office equipment maker specification(s), that is nothing to do with the current for lowest and economical image or light pattern project light for indoor or outdoor applications.

(35) Re: Prior Art U.S. Pat. No. 7,264,377 COOPER 2-1: '377 is power by [a power cord] as FIG. 1 (126), FIG. 2A (226), FIG. 2B (226), FIG. 3 (126), FIG. 4 (426), FIG. 5 (126). All is power cord so the (1) basic application, and (2) how to get AC power from wall, and (3) '377 is one of (sensor activated story lamp), and (4) '377 mainly is sensor activate the audio system with one or more speakers, and (5) '377 have to one or more sensor to trigger the IC and audio and speaker system. These are toto different with current invention.

2-2: The '377 present the image or deign on the sensor story lamp its housing, not show the image or patterns or design far away including walls and ceilings or floor or other house surface with magnify-lens (optics-projection lens(es)). So the image, pattern, arts '377 shown on the its own housing, current invention show far-away outside home or other surface(s) which is not on the light itself own housing.==>This more simple the '377 is a glow image/pattern/art design light, Not present the image/pattern/art design at remote or far-away or feet always from the its own housing. So, this is totally different for (glow light or back light) VS (project light that is PROJECT or PRSENT image/pattern/art on feet away surface).

2-3: '377 is sensor activated story lamp so has the $1^{st}$ important for audio, sound, story, music so sensor $1^{st}$ trigger IC and audio system including storage or pre-cording IC to send out preferred sound, music. Nothing to do with light-source.

2-4: '377 lack of any housing parts can movable to change the (glow or back light) to change position or viewing angle. The current invention can rotate, tilt, swivel the one of parts (Tulip or ball shape) housing or (Y-frame) in x-or-y axis or z-axis so can change the feet away lighted image/pattern/art change form one surface to others surface while people want to do so.

2-5: '377 connect with AC power cord to get the AC power and current invention is use prong to get AC power source or incorporate with DC battery so can change installation at desired time, so the basic skill to get AC or DC power is different with current invention.

2-6: '377 has 1$^{st}$ function is sensor activated story lamp having audio system including IC to control the audio digital data and go through play system or IC and deliver sound or music or melody or pre-storage audio digital data. This is not existing for current invention. '377 use sensor to activate the audio-system. Current invention sensor is photo sensor or other sensor but is activate for LED light-source to get visual effects, not audio effect which mean for Eyes VS. Ears applications. Eye VS Ears is totally different of people one is to see, one is for hear.

2-7: '377 emphasize on background and details description always and only want one device for [have intermediate interaction function and that is for EARs to HEAR]. This is not existing on the current invention only for lighting functions foe people EYES TO SEE!

Generally, the '377 cooper is nothing to do with current invention on any aspect or above discussion.

**Anyway, All additional functions, I put very clear (None Audio device) or very clear for (Time related) or (Night light) or (Power fail light) . . . . No any related to '377 for (Audio related items) !!

(36) Re: U.S. Pat. No. 6,894,434 KOSOFF

1. '434 is a control unit associated with the night light (12) and associated lamp (14) (14a) (14b) (142) (144) for dimmable for pre-selected time period. The night light (12, 60) has building in control unit (18) and built-in connect-box (21) to control the fade-out or dimmer for associated lamp (14). The night light (12) need to linkable with associated lamp (14) (14a) (14b) (142) (144) so can make preferred dimmer functions with count-down timer with counter-timer slide switch or counter-down timer LCD display (80) with 4 time-period selection switch (82) (84) (86) (88).

VS current invention major difference:

a. '434 is control system and has wire (20) to connect with outlet VS current invention for AC-wire or AC-to-DC transformer to connect with LED project light is for ONLY OUTDOOR application. Hence, 434 is not same as current invention for power source and totally different to (night light with timer to count-down for associated lights). Current invention for outdoor seasonal light string or garden light is no such countdown timer separated to connect with outlets.

b. '434 is control system built-in or separated to link night light and associated lamp (14) (14a) (14b) (142) (144). The current invention each outdoor garden project light without any linkable other light design, without any control box (18) or connect-box (21). For indoor use is for battery operated DC power source so no any of '434 parts related to AC-wire (20) connect box (21) control unit (18).

c. '434 lack of inner tube, inner tube-assembly, inner housing to install the image-forming-unit(s) or project-lens or moving device including motor & gear sets, so it totally do not have any "Image or patterns projection" function for remote areas for outdoor application and indoor applications.

So, '434 is not same as current invention for parts, concept, idea, design, electric parts, project at least 3 basic parts including LED+image-forming-unit(s)+project lens further for inner tube, inner tube-assembly to accurate install these 3 major parts to make image or pattern projection. Further, the current invention has more than one other functions including (1) moving device or motor & gear set for make moving or rotating image or patterns for outdoor application. (2) indoor image or patterns projection with time projection, time display on the light body, time related alarm, audio functions, built-in night light or accent light or wakeup light or sleep light function(s), power failure, motion sensor all kind of LED light functions available built-inside the LED image or pattern projection light housing for multiple functions LED image or pattern projection light.

(37) Re: Prior US 2002-0101-571 PANASEWICZ ET. AL 2-1: '571 page 2 [0019] line 14 "Light source (14) preferred an electric lamp and is treaded into engagement with the end of housing (12) opposite lens tube (16)' and page 2 [0019] line 19 to line 21" vents or louvers (32) are desirably provide in housing (12) and in light source (14) to facilitate connective cooling of lamp (30) during use.

And FIG. 5 show light-source.

Can see the electic-lamp shape and size on drawing and text which (a) have high heat occurred while the electric-lamp during use, so it is not a LED light source.

It also can verify from preferred embodiment FIG. 5 (14) and FIG. 6 (64) and FIG. 7 (64) all the light source belong to 12V DC Halogen bulb and need a base show on the FIG. 5 (30) with 2 pins to install on the base and base is threated engagement with end of housing (12).

So, the light source is different with current invention for the light source so all construction and size of housing and heat-ventilation vent or louver needed for '571.

2-2: '571 having (1) light source is electric-lamp (30) belong to 12 Volt DC 2 pins halogen bulb and it has high heat occurred during use so need the vent (32) but at same time light-beam is leakage out from the ventilation-tube (not shown number), and light beam emit to (2) image-medium support-assembly (26) has image-medium (28) but again the electric-lamp (30) light beam is leakage out because support-assembly (26) is not proper arrangement with the electric-lamp (30) as current invention emphasized for no LED light beam leakage out, and light beam emit to (3) Lens tube (16) which has install the bi-convex lens (18) which is not same as current invention basing on the different electric-lamp (30) and LEDs (current invention use single convex-lens) because the '571 electric-lamp (30) belong to radiation-light source and light emit out to all direction so need use one of convex-lens surface to collect all direction light into lens, however, this kind of bi-convex lens create image has big problem VS The current invention LED light-beam is narrow emitting angle and light beam travel within the inner housing or inner tube already change to parallel light-beam so only need flat-surface in order to create the same radio of the image or patterns carried by image-forming-element (see Sep. 21, 2010 original filed drawing last page FIG. 1A Lens for (A) (B) (C). So, this is big difference for project-lens because use different '571 radiation electric-lamp halogen with 2 pins (30) VS current invention for narrow-emit-angle LED (current invention).

(4) '571 the lens inside the lens-tube (16 threated into housing engagement with housing (12) this is different with current invention construction as co-inventor with slide-teeth to make quickly move the project-lens which is raised curved and only short curved-linear section. So, the focus adjustment is different.

So, the '571 has big difference with current invention for outdoor garden light for 1. Different light source electric-lamp (30) 1-1:shown on FIG. 5 {have 2 pins and shape for Halogen 12V DC bulb for radiation light source with reflector} and 1-2: [0019 page 2] line 14 {light source (14) preferred an electric-lamp (30) and is threaded engagement with back housing (12)}→VS current LED narrow-emit angle light source and is cool light LED no heat will occurred during use.

2. Different light source '571 use 2-1:{halogen bulb electric bulb (30)}, and 2-2: [0019 page 2] line 19 to 21 {vent or louvers (32) are desirably provide in housing (12) and in light source (14) to facilitated convective cooling of lamp (30) during use} had high-heat occurred as text describe so need vents or louvers to get rid of heat, however, also leakage all light beam out from vent or louver as FIG. 5 drawing have opening-inner coil-piece (no marking #) VS current invention clear said Light beam from LED to slide/film to front optics-lens is tightly assembled and no light can leakage out→so the construction is totally different !

3. Different for project lens '571

3-1: [0019] line 6 {Bi-Convex lens (18)} and current invention use single convex lens, the difference basing on different radiational electric-lamp (30) need this bi-convex lens VS current invention is narrow-emit angle LED which can use single-convex lens as original filed drawing last page FIG. 1A lens (A) (B) (C) and Lens (1-5) (1-7) with design arrangement.

4. Different for the replaceable, detachable, movable disc or holder (original filed drawing last page FIG. 1 (1c) and FIG. 1B (1-10) show all current invention with teeth to let people to move or change one of preferred slide or film fit within, or let motor and gear sets to make the gear-shape teeth to match motor's gear-sets to change the slide/film from one to others. VS '571

4-1:[0022] line 15 {image wheel (80) further comprise central hole that engaged shaft (76) so that wheel (80) rotated through image-window (88) when motor is energized} which only have center holes to drive the image-wheel (80). So not same as current invention on text and FIGS.

5. Different for adjustable focus '571

5-1: The current invention use simple and quickly raised curved lines to match the lens-assembly to quickly move up and down VS '571 [0019 page 2] line 11 {lens tube (16) hays trhreated into housing engagement with housing (12) such manner that focal length between image-medium (28) and lens (18) can be adjustable}.→So, current invention has update and big improvement than '571 for quickly to move lens-assembly up and down not like '571 Fig shown plurality of thread need to rotating forever.

6. Different arrangement to prevent light beam leakage out from LED→slide/film→Lens.

6-1: '571 is leakage a lot of light beam from inner-coil opening piece and vent or louver (32)

VS current invention emphasize this is very important.

7. Different for more than one project images emit out from project light 7-1: '571 [0023 line 23] {A multi-faceted reflective element such as mirrorball (108) is preferably supported on an axle 110 can be rotaged by electric motor to slowly turn mirror ball 108.} and [0023 page 3] line 1 to line 7 {said polarity project image is created by project light emit image to multi-faceted mirror ball to simultaneously direct the projected image against many viewing surface.}

VS current invention has more than one project-assemblies to project (1) fixed image, or (2) moving image, or both fixed and (3) moving image surround the fixed image.

So, the '571 is totally different with concept, idea, design, construction, light source, movable and changeable, replaceable, detachable disk or holder to hold plurality of slide(s), film(s), optics-lens(s) by manual or by motor from center-shape holes or from edge-teeth or gear-sets, different focus adjustment by simple curve-line raised to match lens-assembly ditch or groove, different design for no-light leakage out while light beam travel from LED to slide/films to lens as above details discussion→So, conclusion the '571 is a halogen bulb project light which had over-hear, harm people by over-heat body, Power consumption too big, leakage a big amount light from vents or louvers, complicated parts which is not necessary while apply cool LED light source, bulk unit basing on 2 pins halogen 12 Volt (Low voltage light as Malibu light power system, Not workable for LED light source), strange to project plurality fixed or moving or both images or pattern than current clear and sharp focus multiple projected-image for indoor or outdoor to present to ceiling, wall, fence, building, house, garage door, entrance door, floor, garden etc.

(38) Re: U.S. Pat. No. 5,404,283=(Yantz)=US Series No. 861,181=Filed date Mar. 31, 1992 (Outdoor framing projector)

8-1: From '283 column 7 line 65 "The optical system 144, which includes the lamp 142 and a reflector 138, a shutter support 148, a rear lens 150, an optical stop 152 and a front lens 154, occupies substranfially the entire lateral area of the interior of the housing 12, because of the size of the elements required and the need for supports for the elements. Compare with the current invention different including:

8-2: '283 Yantz teach a very expensive and complicated optic-lens system as above listed.==>The current invention had so such complicated optic-system as above list.

8-3: '283 teach a lot of text for recirculation cooling system cools a lamp sith the warmed air flowing longitudinally back to front past top and side walls of the housing provided with cooling fans and a return air duct adjacent to the bottom wall drawing air from the rong of the housing back to the inlet of the fan. (Abstract).==> The current invention do not have such "Fan Recirculation System" at all.

8-4: '283 Yantz shown on column 9 line 11, "As noted above, the Imap 142 is preferably either an incandescent lamp, such as a quartz lamp for example if the projector 10 is to be used in a dimming application or a metal halide high-intensity discharge lamp, which may be desired for long lift and opening economy.

An incandescent lamp, which is shown on the drawings and has been found suitable for use with the reflector specified is commercially available from GTE products Corp., OED Division of Westfield, in., under the commercial designation Sylvania EGG, 750 W. Quartz medium prefocus. This is a 750 Watt lamp, it being understand that smaller or larger wattage may also be used.

→Compare with current invention for 0.25 Watt or Maximum is 1 to 3 Watt LEDs which no need any fan recirculation. Furthermore, the '283 use 750 Watt for totally different Quartz-Lamp that is totally different light source.

8-5: '283 use Quartz-Lamp for AC power and current invention use LED which is DC powered light source, so current invention need AC-to-DC circuit to get DC current for inner LED(s), IC, Sensor, Switch, Detector, Power fail failure system, motor for rotating the image-carrier or disc with teeth or disc have built-in plurality of the image-carrier or rotating the optics-lens or plurality of optics-lens fit within the disc or holder or rotatable disc-with-teeth or gear-sets.

→So this is totally different circuit, electric, applications, sensor, trigger system and the rotating the said one or more optics-lens and image-carriers.

8-6" '283 need use reflector system to make light concentrate to front position.

→The current invention is no needed such reflector-system.

Conclusion: This is totally different any aspect.

(39) Re: Prior U.S. Pat. No. 5,218,388 PURDY 1-1: '388 is motion picture film projector monitoring equipment and more particulary to a monito which is characterized as having a cue sensor, a film presence sensor and a film motion sensor that collectively provide input signals to a control circuit which in turn produces output signals for use in automating a movie theater.

VS. current invention:
a. Current invention has no such a lot of sensor and film with many sections
b. Current invention is for project light only project (a) fixed on position slide or film image or patterns without changing, or (b) movable or rotatable slide or film while manual change film or slide or while use motor to rotate the film, slide, rolled printed piece repeat again and again and it is cycle once and once again.
c. Current invention for home device to project to indoor or outdoor surface including fence, wall, garage door, entrance door, ceiling, garden, floor, ceiling not for theater for selling ticket for amusement purpose and have hours projection and none of the image or pattern presently repeat and repeat again and again.
d. The theater application for movie project by a hundred or thousand films or slides each is different image or patterns. Also, '388 has a lot of sensor film presence sensor (74), film motion sensor (76) time delay circuit (80) speed sensing/time delay circuit (81) relay driver (82) a cue expansion circuit (85) plluse stretcher (88) pluse stetcher (79) controlling relays (84) all these is not necessary for home use for indoor or outdoor project light as current invention.

So, '388 is different on concept, applications, parts, idea so totally different with current invention.

(40) Re: US 2005-009-4388=(Botty)=US 10-699,251=Filed Oct. 31, 2003 (Dual-Beam Lantern-flashlight)

6-1: Booty '388 teach one hand-held lantern have front end light (20) and rear bottom light (29) also act as a handle-bar (22) which also is a battery compartment.

The current invention is 6-1-a: AC powered light get the AC current form wall outlet if terminate the wall outlet power, the built-in nightlight will lost power except the power-fail light can still work.

6-1-b: The said current invention get AC power but the inside use LED(s) as light source so need at least one AC-to-DC circuit to get DC current for inner DC powered LED(s) or IC or sensor or power fail circuit to have power for operation.

6-1-c: The '388 application do not have any image-forming, display-unit or image-carrier or may different optional other accessories including motor, gear, gear-set, film holder, tray, disc, disc with teeth, change focus, retract-and-extend similar telescope to change optics-lens position against the inner image-carrier, magnify refractive-lens, so this is total different the theory of optics.

So '388 Botty for dual-beam for DC powered is nothing to do with current invention.

(41) Re: The Prior art 5,321,449 Cocoli et al.
→Teach a incandescent bulb Flashlight projection b-1: The Incandescent flash light no need to have Bridge-circuit to change the Home appliance electricity AC to the direct current (DC) at certain LED working voltage and current to make the light turn on.

So the Circuit for Portable flashlight v.s. Home use Indoor or outdoor light circuit is different.

This is not said all light source (Incandescent bulb) and (LED) is same and all belong to Light source.

**The Incandescent bulb to use current invention will brun out whole tiny unit because radiation heat and very hot than cold temperatures LED . . . . This is not equivalent or replaceable at all.

b-2: The portable Flashlight projection. '449 construction '449 has the different construction with the current invention for enlarge head (14) at one end which has Straight tangential spaced to install the Reflector (28) because the bulb light is radiation spread out so need reflector to concentrate bulb light beam to front.→This is not same as LED light for narrow angle to emit Light so no need such (Reflector 28)→This is other construction and light source difference.

b-3: The portable flashlight projection '449, The reflector (28) with integral socket (30) to install the bulb→The current invention the LED on the end of non-reflective tube. Different for '499 install on the reflector.

b-4: The '449, The power source (32) is crried within the housing (24) for illumiatnion the light bulb (20).

The current invention get power from outlets which have unlimited power same as home electricicy. Not limited power like battery.

b-5: '499 need a switch to manual to turn on and turn off the flashlight.

The current invention the light is (Automatically)_turn on or turn off by automatically by (1) photo sensor or (2) motion sensor or (3) remote controller or (4) Moving sensors or (5) wireless signals including Zeg-bee or wi-fi or Bluetooth or App software. Never need manual switch to turn on and turn off.

b-6: '499 projecting device 10. Includes a flexible holder (40) with a central socket located witin the transverse slot (16) in the enlarged head (14)→which is not same as the Current invention Slide or film is install within a light non-leakage able tube our housing. Not same as '499 to into s disc and disc need a holder (40) to hold it and allow to change slide.

From above (b-1 to b-6) for electric, for construction, for construction, for applications, for power source, for light device is totally different with current invention.

(42) Re: U.S. Pat. No. 8,113,698 WU

B-1-1: '698 show a lift and turn direction LED head (208) related to the base (210)

For regular LED bulb to emit light only.

VS. Current invention.

B-1-1-1: Current invention is a image, patterns project light.

Current invention has tube or telescope as

A-1: From Nov. 10, 2016 Original filed case, [Back ground] Point 4 line 2 show extension tube, telescope tube.

A-2: From [Brief] FIG. 11A, 11B, 11C→Line 3 to 6 show (telescope or tubular means)

A-3: From [Detail description] Feature 9 line 1 (LED tube means)

A-4: From FIG. 11A to 11C, line 3 show telescope means, tubular means, extend means.

to make all project 3 major parts (LED, film/slide, project-lens) to install to make projection.

A-5: Current invention also has extendable and retractable tube or tube-assembly which design for overcome the block-items for wireless signal or prevent heat affect the heat-sensitive parts.

'698 has no any image or pattern projection just for LED illumination.

'698 has no any extendable tube or tubular assembly install the wireless receiver or heat-sensitive parts inside extend tube or tube-assembly Conclusion: '698 WU is different with current invention for all aspects.

(43) Re: U.S. Pat. No. 9,081,269 CONTI

B-2-1: '269 Bulb is to receive all the wireless multiple medium text(s) to go though its interface (204) and let the wireless adjustable system (206) to adjust the said project-assembly (205) to project the wireless multiple medium.

Medium text. VS current invention

B-2-1a: The current invention projection is made by project-assembly which on has 3 major project assembly (LED→Film/Slid→Project-lens) to project image or patterns and this LED is for the project purpose only.

B-2-1b: The current invention the project-system housing can be rotating and change project image/pattern location to anywhere by touch the housing. The '269 do not have this 360 degree in x-y-z axis to change projection angle or orientation.

B-2-1c: The current invention has extend tube or tubular or telescope to overcome any Block-items for wireless signals receiving or overcome heat for heat-sensitive Parts.

B-2-1d: The current invention do not receive any multiple-media text from near-by location for audio or video text. The current invention just project the image by simple 3 major parts for pre-selected film or slide.

B-2-1e: The current invention do not transmitting any wireless multimedia text to other device.

B-2-1f: The current invention do not link with server or wireless transmitting or receive or play the multiple-media text.

→Conclusion: '269 is totally different with current invention for project selected film or slide image or patterns+ Other LEDs light for bulb illumination.

B-2-2: '269 The Bulb itself has built-in backup battery and perform as FIG. 3 for 4 different application. Mainly the design is very unique which the Bulb base (103) and Bulb itself (100) is detachable so can use for different applications. VS current invention has no such construction and no such backup battery.

Even combine the '269 COTI and '698 still can not make any similar with current invention for those lack for the (1) Both lack→project by tube or tube-assembly has fixed LED, film/slide, project lens to project pre-selection film or slide as current invention.

(2) Both lack→extendable tube or telescope to overcome block-items for electric signal delivery and move the heat-sensitive parts away from LED light-source(s) as current invention.

(3) Both Lack→IR and RF only for receiver ON/OFF/COLOR changing signale. This is very important want to receive ON/OFF LED light by IR or RF remote controller transmitted electric signals.

(4) Both lack→360 degree rotating the locations to have desired image or patterns projection.

(5) Both lack→Multiple or more than one light-beam, image, patterns projects at same time as current invention.

(6) Both Lack→LED bulb has projection and illumination both existing and present the illumination and projection on different distance and areas.

→Conclusion: The combination both '269 and '698 is not even same as aspect with current invention.

The seven major improvements described above may also use the following features (A) to (M):

A. The LED light device of the invention may include features of the LED light device described in co-pending U.S. Patent Application Ser. No. 11/806,284, in which LED elements are incorporated with an optics medium to diffuse the light emitted by the LEDs and provide an area light illumination suitable for a night light.

B. The LED light device of the invention may include features of the multiple light source LED light device described in co-pending U.S. Patent Appl. Ser. No. 11/255,981, in which first and second LED elements are arranged in a matrix to face in one or multiple directions, and to have different positions, orientations, or locations, with some of the LED(s) acting as a night light and other LED(s) acting as an emergency light.

C. The LED light device of the invention may also use features of the multiple LED light source light device described in U.S. Patent Appl. Ser. No. 11/255,981, in which the first and second LED elements each includes a plurality of LEDs that face in more than one direction or are situated at different locations, positions, and/or orientations to illuminate multiple areas.

D. The LED light device may include at least one mechanical or electric switch having at least one function selected from on/off, auto, timer, time delay, flashing, partial on, partial off, partial flash, partial chasing, partial random, partial fade-in and fade-out, on and off duration for each blinking function, power saving selection, blinking function selection, persistence of vision, blinking of one LED or multiple LEDs, on and off percentage of each blinking cycle, power saving setting or selection, LED or LEDs group reset selection, or any LED light functions for a plurality of LEDs available from the marketplace.

E. The LED light device of the invention may also utilize features of the light device described in U.S. Patent Appl. Ser. No. 11/806,285, in which the LED means can be any type of LED specification with single color or multiple colors, and all said LEDs can change color, or the number of illuminated LEDs can be changed, to provide different light functions by means of a controller, switch, and/or sensor means.

F. The LED light device of the present invention may also use features of the multiple function LED light described in U.S. Patent Appl. Ser. No. 11/806,285, in which the LED means can incorporate other functions including, by way of example, an electrical outlet, air freshener, motion sensor, beacon light, warning light, chasing lights, flashlight, bug repelling device, mosquito repelled device, mouse repelling device, sonic repelling device, projection device, and/or persistence of vision device with blinking LED(s).

G. The LED light device of the present invention may also use features of the multiple light source LED light device described in U.S. Patent Appl. Ser. No. 11/255,981, which includes an LED or LEDs for indicating battery status such as low battery capacity, full capacity, or half capacity with preferred colors to indicate the status of the batteries, or to show the device on duty status.

H. The LED light device of the present invention may also feature of the LED device with special effects described in U.S. Patent Appl. Ser. No. 12/710,561, in which the LED(s) blink at a rate that is faster than the human eye's response time of $1/24$ to $1/16$ second to cause the illusion of continuous illumination and reduce power consumption.

I. The LED light device of the present invention may also use the feature of the LED light device of U.S. Patent Appl. Ser. No. 12/710,561, in which the said blinking frequency is quicker than the human eye's scan speed of within ⅛s second, i.e., faster than 48 Hz, of the on/off percentage of each blinking cycle is adjusted accordingly, to provide a power saving setting or selection.

J. The LED light device of the invention may have a battery with a voltage higher than the LED trigger voltage, or a voltage lower than the LED trigger voltage while incorporating a voltage boosting electrical circuit to raise the battery voltage up to the LED trigger voltage.

K. The LED light device of the invention may use a control means to cause the LED or LEDs to turn-on and turn-off for a certain percentage of each cycle, as described above, in order to utilize the persistence of vision to save power.

L. The LED light device of the invention may also include circuitry for achieving the cost saving feature described above in which the total batteries' voltage is less than the LED(s)' trigger voltage to cause the LED(s) to turn on and turn off according to predetermined functions, effects, color, and/or brightness.

M: The LED light of the invention may utilize interchangeable 120V AC and battery power sources as described in U.S. patent application Ser. Nos. 12/232,505, 12/292,153, 12/318,473, 12/318,470, 12/318,471, 12/622,000, 12/624,621, 12/710,561, 12/710,918, 12/711,456, 12/771,003, and 12/876,507.

N: The LED light device of the present invention may also be included in projection kits selected from the following:
  (1) projection kits that can change position in any of three dimensions,
  (2) projection kits that do not change position,
  (3) projection kits that can be added, or moved-out, or change position along all axes in three-dimensional space,
  (4) projection kits that are rotatable,
  (5) projection kits that can tilt,
  (6) projection kits having adjustable focus,
  (7) projection kits with changeable display-units,
  (8) projection kits that can incorporate an LCD or TFT display-unit to show moving and changeable digital data images,
  (9) projection kits that can incorporate digital memory or data storage means to display a plurality of images stored inside the digital memory or digital storage means,
  (10) projection kits having a desired number of projections means to offer more than one projection image or light beams from a single LED projection light
  (11) projection kits having tubular means for housing an optics means, optics lens assembly, convex lens, concave lens, display-units, slide, film, LCD display, TFT display, image presentation means, transparent material, and/or translucent means to provide desired image or light beam performance.
  (12) project kits having tubular means including a plurality of pieces arranged to install one or more of an LCD display, TFT display, film, slide, paper, transparent material, translucent material, photo display, and disc pack for a display unit to present a desired image or light beam to a viewer.
  (13) projection kits with a laser projection light that incorporates a hologram, grating, or other optics display-units to present splendid light patterns with adjustable means to change the pattern with a steady or moving image, and having a kids' safety sensor to shut down the laser beam when people approach the laser projection light.
  (14) projection kits with projection display-units to display digital data received from any wireless network or system, such as WIFI, the Internet, WLAN, GPS, AGPS, GPIS or any other wireless network or medium to provide an up-to-date message, image, screen, data, information, drawing, and/or relative position transfer.

In the case of wireless digital data display, it is very useful for people to view all wireless-field data present on the LCD or TFT screen and magnify by means of an LED or Laser projection light so that the changeable or updated digital data can more easily be seen. The data might be, for example, a Google map, the cartoon channel, Internet TV, You Tube digital data, Facebook, or all kinds of Internet stations' digital data. This can also apply to wired digital data connections with magnification of the continuously changing or updated digital data ranging anywhere from ten to one hundred thousand times bigger image at super lower cost because the digital-unit(s) need only be a small size LCD or TFT.

The small size TFT can be selected from available 1", 1.5", 1.8", or 2.4" screen sizes with resolutions of (96×64), (128×128), (320 RGB×240) pixels, or any other specifications of a small TFT. Two preferred TFT models include 1.67" (128 RGB×160) and 1.76" (176 RGB×160) models because of their good pixel resolution and small size. It will be appreciated that special custom-made TFTs with small size and high resolution could also be used for the LED or Laser projection light of the current invention and that the Digital Display-Unit(s) may involve new technologies such as OEL or OLED.

BRIEF DESCRIPTION OF THE DRAWINGS

FIGS. 3, 3-1, and 3-2 show a second preferred embodiment of the current invention, in the form of an LED or laser projection light having more than one function and including a plurality of slides within a rotatable disc to change the slides and offer a plurality of different images for projection to desired areas, one of the functions being that of a night light powered by batteries, an adaptor, a transformer, or an input from a solar power, wind power, or chemical power source, USB power device, power storage device, USB Power bank. project light to project the motion picture, changeable digital data, changeable LCD or TFT display-unit data, changeable digital data storage inside digital memory card or memory stick, cartoon, changeable photos, time (designed IC with changeable time signal), date, wireless transmitting environment data. The changeable image can get while make change of following things including any combination from (1) a moving device, (2) motor & gear-set assembly, (3) animation device, (4) electric parts & accessories to change the display-unit which including (a) slide, (b) film, (c) digital data on LCD display, (d) digital data on digital storage means, (e) digital data on digital memory means by automatically or manually changing-means to change the image. (0 digital data come from wireless fields. The said all means or device are powered by battery or 120 Volt power source, indoor power source, outdoor power source, capacitor, or other energy storage components. This embodiment not only has LED project light but also night light+weather station+movie projection+Digital data projection+cartoon projection+motion picture projection.

FIGS. 4, 5, and 5-1 show a third preferred embodiment of the current invention, in the form of an LED or laser projection light for projecting a motion picture, changeable digital data, changeable LCD or TFT display-unit data, changeable digital data stored inside a digital memory card or memory stick, a cartoon, changeable photos, and/or time, date, and environment data.

FIGS. 6, 7, 7-1, 7-2 show a fourth preferred embodiment of the current invention, in the form of an LED or Laser projection light to project light beams with adjustable focus and second function kits for a night light powered by a battery or 120V power source, indoor power source, outdoor power source, capacitor, or other energy storage components. The LED or Laser projection light projects super high brightness light beams from a super high-power LED or LEDs which may be selected from a 1 watt to 100 Watt LED or LEDs or other laser unit(s) available from the marketplace. Suitable adjustable focus mechanisms or an add/remove/change projection means are disclosed for example in co-pending U.S. patent application Ser. Nos. 12/876,507, 12/771,003, 12/711,456, 12/646,621, 12/622,000.

FIGS. 8, 9, 10, 10A-10C, 11, 12, 12A, 13, 14, 15, 16, 17, 18, 19, 20, 21, 22A-22F, 23, 24, 25, 26, 27, 28, 29, 30, 30A-30B, 31, 32, 33, 34A, 34B, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 68A, and 68B show concepts, methods, ideas, acknowledgments, constructions, and theory disclosed in the above-listed co-pending or commonly-owned applications and applicable to projection means or projection kits with a lot of features may also be utilized in connection with the preferred embodiments, without departing from the scope of the invention.

DETAILED DESCRIPTION OF THE PREFERRED EMBODIMENTS

Preferred embodiments of the invention include an LED or Laser projection light having more than one function provides both a narrow light beam emitting direction and a concentrated light beam that enables the light beam to easily pass through the display-kit and project a desired image or light beams on desired areas, the LED or Laser projection light including at least one LED or laser projection light having a geometric shape and construction that enables at least one LED unit or laser unit to project a light beam through a display-unit containing an image, time, date, weather, temperature, humility, motion picture, photos, digital data, wireless digital data, cartoon, digital memory data, digital file storage data, hologram means, grating means, or other light-affecting means to predetermined areas with a desired color, brightness, size, light intensity, clearance, and/or resolution.

The LED or laser projection light may be implemented using one more second-function kits to enable the projection light to also serve as a desk top light, floor light, garden light, emergency light, safety light, anti-burglar light, underwater light, street light, reading light, night light, light fixture, motion sensor light, power fail light, photo sensing light, dimmable light, spot light, seasonal light, Christmas light or ornament, licensee products, cartoon character related products, promotion light, commercial light, sign, motion sensor light, Bluetooth light, moving device, car light, vehicle light, boat light, aircraft light, and/or multi-purpose LED light or laser with rechargeable or non-rechargeable energy storage kits having preferred circuit means, switch means, sensor means, timer means, IC means, electric parts and accessories as necessary to meet functional requirements.

The power source for the preferred LED light, LED unit(s), or laser unit(s) may be selected from the group including a 120V AC current, batteries, adaptors, a USB power source, a transformer, a generator, a solar cell, wind power, or a chemical power source and related circuitry to cause the said LED or LED(s) to turn on and off according to a predetermined function, brightness, color, timing, period of time, duty, cycle, and/or duration.

The LED light, LED units, or laser units may incorporate additional desired electric parts and accessories selected from a power saving IC, cost saving circuit, integrated circuit (I.C.), sensor, switch, contact means, conductive means, and other electric components to cause the LED, LED unit(s), or laser unit(s) to provide a predetermined performance. The above-mentioned second-function kits may use the same or a different power source than the projection light, and may add, in addition to the listed functions, any kind of conventional LED light or laser device function available from the marketplace.

Figure 1:
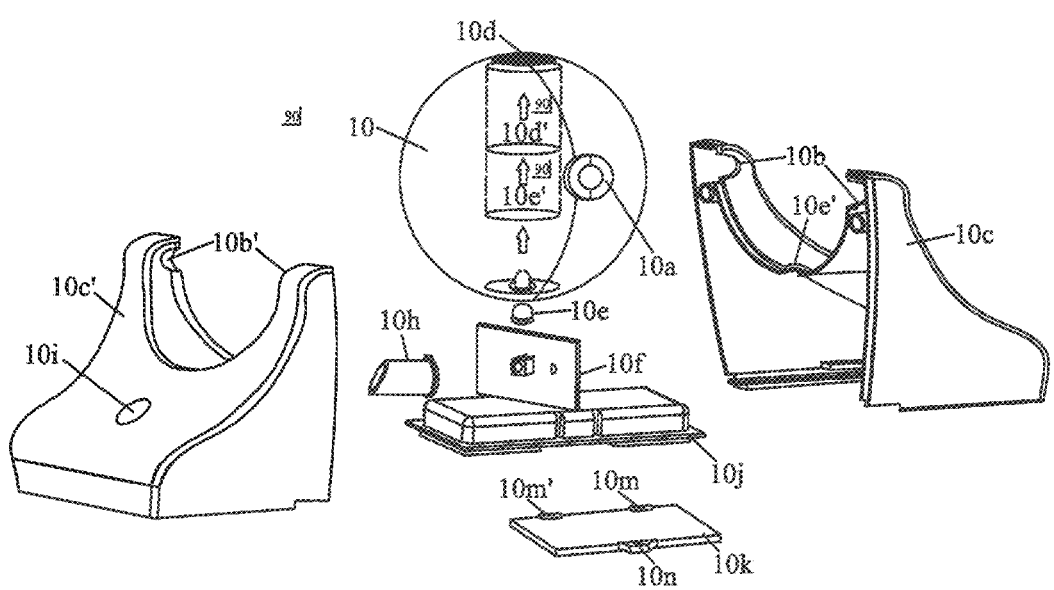
FIGS. 1, 2, 2-1, and 2-2 show a first preferred embodiment of the current invention, in the form of an LED or laser projection light having more than one function for a battery powered device and single projection kits and built-in night light.
Figure 2:
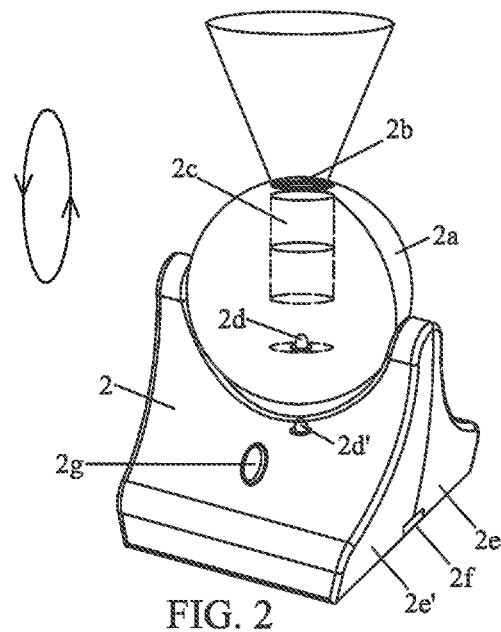
Figures 1, 2:
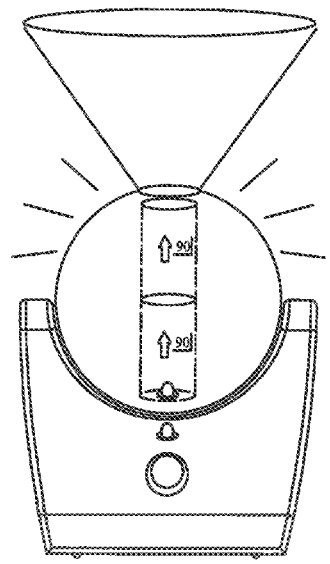
Figure 2:
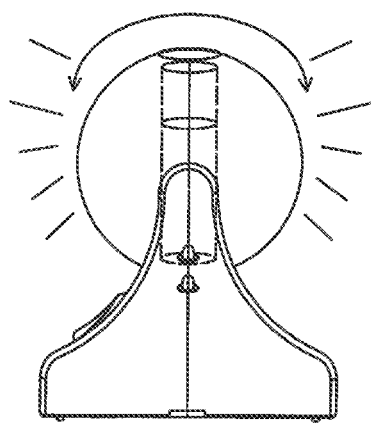

FIGS. 1, 2, 2-1, and 2-2 show a first preferred embodiment of the current invention, in the form of an LED or Laser projection light having more than one function as mentioned above, the light being a battery powered device. As shown in FIG. 1 the LED or laser projection light has tube-assembly (10e') is arranged within a ball shaped housing (10) and in which a tubular assembly (10e') has inner image forming-unit (10d') and LED(s) or Laser unit(s) (10e) are insert into the one of the tube-assembly (10e') which the light beam are arranged to emit light beams to inner display-unit(s) (10d') to project a desire image or light beam onto preferred area(s) with pre-determined brightness, colors, size, sharpness, and/or clearance of the image or light beam.

The ball (10) has two ears (10a) that fit into the two holders (10b) of right and left housing halves (10c) (10c') in order to enable the ball (10) to rotate 360 degrees about one axis. The light unit can thus project an image or light beam to any location because the unit is powered by batteries or other power source so the unit can easily be moved to any position and the ball rotated to precisely position the image or light beam at any desired position. This is the basic model and most economical cost for the LED project light which only has (1) 1pc LED (10e)
(2) 1 tube assembly (10e') which inner diameter just allow LED body (10e) can fit within
(3) Tiny display-unit (slide) (10d') just can fit within the one of tube assembly (10e') inner diameter.
(4) One smallest magnify project-lens (10d) (Fit-into housing top opening) which just cover top of the tube assembly (10e') inner diameter so it is the smallest and lowest cost.

The function for this simple and most preferred embodiment has the features (a) The LED (10e) light beam is emit to the top display-unit (slide) (10d') and emit to the top magnify project-lens (10d) (Fit-into housing top opening) in perpendicular or vertical or 90 degree so the bigger-size of image will not has the image ratio or deviation to lose from the display-unit (slide) tiny-image ratio and tiny-image. This is very important improvement than US Prior art Mr. Black to try to make image parallel to the LED light beam traveling direction which too easily to lose correct ratio for any image s SALTOON such as people it will have big head and short leg. It also overcome the US prior art SALTOON for the project-lens fit within the tube-assembly not on the top of housing opening or above top of the inner-housing top tube assembly, so SALTOON image will be same as the limited by the taller tube or side housing parts to block-out and do not spread out to wider area than the current invention.

(b) The tube is designed to fit just allow the narrow LED light beam maybe only 15 degree viewing angle to emit into the smallest tube inner-diameter, so this will make the related expensive display-unit (slide) and top magnify project-lens (10d) (Fit-into housing top opening) both become smaller. Both the slide and magnify project-lens (10d) (Fit-into housing top opening) bigger size will cost multiple times cost. So, this is current invention other features to let people enjoy nice bigger-size projection image but use the lowest cost to has.

(c) The current invention created the bigger-size image which up to tens to hundred thousand time than the tiny-size display-unit (10d') within the smallest tube-diameter and only use the physics refraction theory of (Object-Lens & focus) to get clear and bigger-size slide's image shown on the ceiling or opposite walls indoor or outdoor which remote-away from the said LED project light location and the current invention has no complicated reflection+diffusion or any other optics theory for current invention to waste money and may get bad image.

The current invention also may has optional added second-function kit of the first preferred embodiment provides a night-time use light which has at least a second LED (10e) on a circuit board (10f) with switch (10g) to control the LEDs or laser unit(s) (10e) (10e') to turn-on or turn-off according to a pre-determined function, duration, time delay, cycle, and/or performance. The switch (10h) may be pushed to turn-on the LEDs or Laser unit(s) (10e) (10e') and has a built-in timer (not shown) that continuously turns on the LEDs or Laser unit(s) (10e) (10e') for a 10 to 60 minute period and turns off after the time period. This will save a lot of power consumption and prevent people from forgetting to turn off the LED or Laser projection light. The circuit (100 of the current invention is powered by batteries or other transformer-set or USB-set or AC Plug-wired (not shown) within a battery compartment (10j) with a screw-fastened battery cover (10k) which has two insert ends (10m) (10m') and a screw end (10n) to cover the inner batteries (not shown). An alternative power source may use rechargeable batteries which have been charged by another energy source such as a transformer, adaptor, solar module, wind power, chemical power, or generator via necessary electric parts and accessories, such as wires, male-jack and receiving-port, a AC-Plug with or without wire harness, and/or storage to cause the other energy source to supply power to the rechargeable batteries, capacitor, or any energy storage parts and accessories inside the LED or laser projection light. Any alternative method, skill, arrangement, construction, or function may also fall within the current invention scope.

FIGS. 2, 2-1, and 2-2 area assembled views of the LED or laser projection light (2) of FIG. 1, with tubular assembly (2c) and LED or laser unit(s) (2d) inside the 360 degree rotatable ball (2a) installed on a base housing (2e) (2e') having switch to control the LEDs or laser unit(s) (2d) as a projection light and LEDs or laser unit(s) (2d') of a second-function kit as a night time use light. This is an example of how the current invention provides the LED or laser projection light with more than one function.

Figure 3:
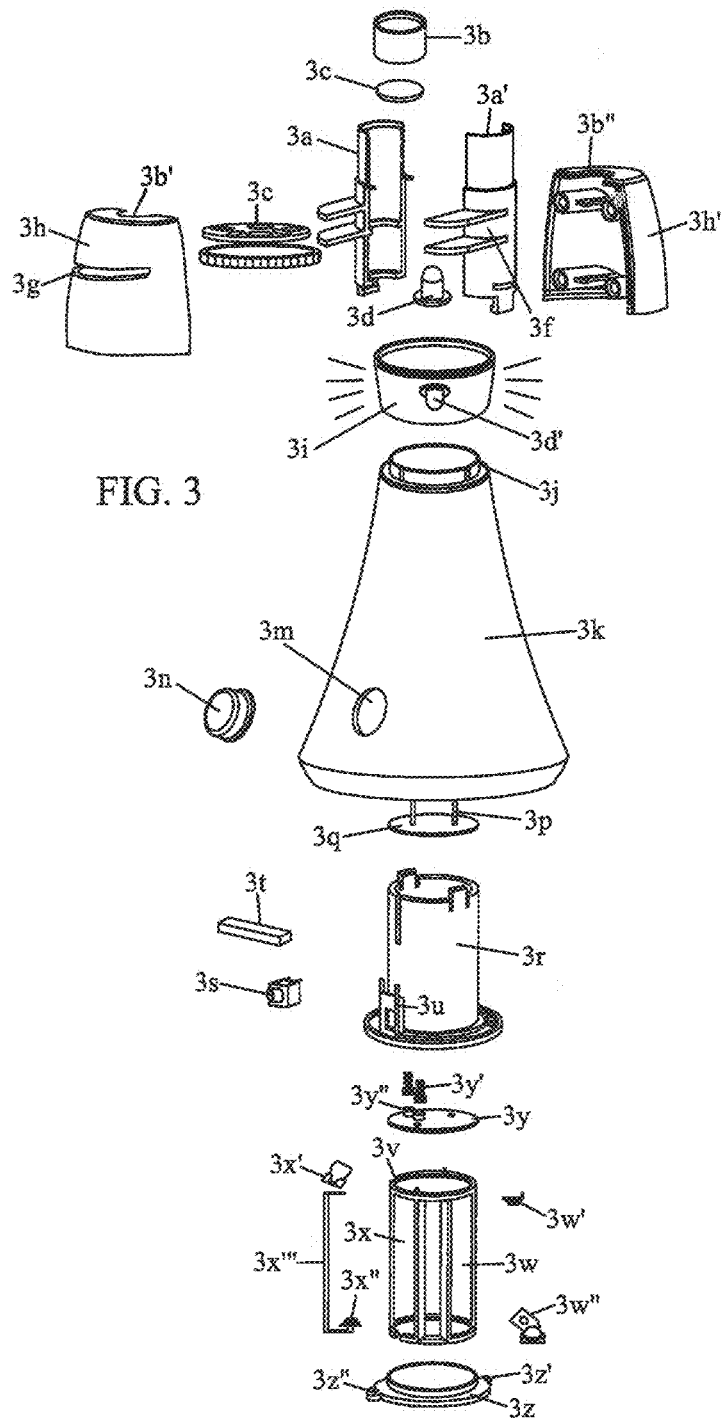
Figures 1, 2, 3:
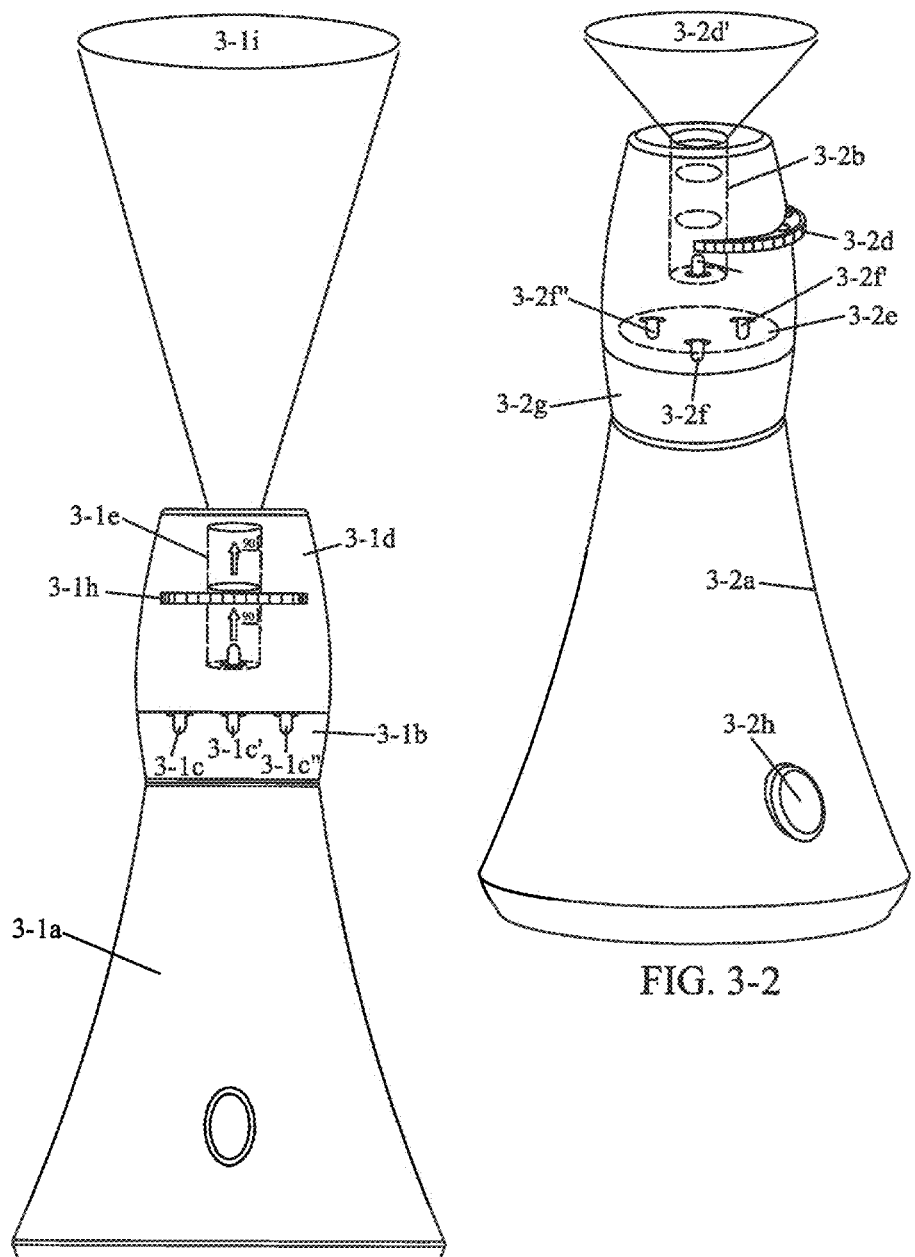

FIGS. 3, 3-1, and 3-2 show a second preferred embodiment of the current invention for all kind of application while the housing change to desired geometric shape, in the form of an LED or laser projection light having more than one function, and which has a plurality of slides within a rotatable disc to change the slides and offer a plurality of different images for projection to desired areas. The second-function kit for this embodiment is a night time use light which has a variety of LEDs or laser unit(s) to supply sufficient light to a lower portion of the LED or laser projection light, and which is powered by batteries or an adaptor, transformer, or inputs from a solar power, wind power, or chemical power source.

As shown in FIG. 3, the LED or laser projection light includes tubes assembly (3a)(3b) has parts and accessories to cause light beams from LED (3d) to pass through the display-unit (3e) and project lens (3c) to project the desired image or light beams to a desired location. The display-unit(s) (3e) of this embodiment have a plurality of slides (3e) in a donut-design to fit within the rotatable disc so that one of the slides or film (3e) is positioned to project a selected one image on the desired location. The donut can load a desired number of slides, films, stencils, logos, art, photos, or digital data thereon and the LED or laser projection light to have a changeable image performance using a single LED or laser projection light. The projection-assembly or-and tube-assembly of FIG. 3 are assembled with right and left housings (3h) (3h') and the tubular-assembly (3a) (3a') means fitting within the two cut-out areas of housing-parts (3b') (3b"). The disc has a portion that passes through the opening (3g) of the project-assembly body (3h) to allow people to rotate the disc and change the display-units (3e) to change the image to another image. The LED or laser projection light (3d) of this embodiment arrange to insert into at least one of tube-assembly parts, and this embodiment because consider space limitation so preferred to extend into the lens (3i) which has its LED or laser unit(s) (3d) as a light source for projection and also has $2^{nd}$ LED or laser light source (3d') to cause this lens (3i) to serve as night time use light for the second-function kit.

The lens sits on the base (3k), which has an opening to install a switch (3m) or sensor to control the inner circuit (3q). The inner circuit (3q) sits on the top of the inner channel (3r) which has a compartment (3u) to install switch (3s) and holder (3t). The inner channel (3r) has a battery contact plate (3y) which has a base (3y") to allow installation of elastic conductive-kits (3y') to top location circuit (3q) to cause the LEDs or laser unit(s) to turn on and turn off according to a pre-determined performance. The contact plate (3y) has conductive (3w) (3w''') (3x') (3x'') (3x''') that fit within the battery compartment (3u) to deliver electricity from the batteries (not shown) to the conductive (3w) (3w''') (3x') (3x'') (3x''') and the contact plate (3y) to connect to circuit (3q) under control of the switch and illuminate the LEDs or laser unit(s) (3d) (3d').

The LED or laser light of this preferred embodiment has a plurality of changeable slides, films, photos, stencils, grating-piece and/or display-units to allow the LED or laser projection light to project a plurality of different images to desired areas and has optional a second function kit that forms a night time use light to allow inner LEDs or laser unit(s) to emit light from a project lens to provide an LED or laser projection light having more than one function. The second function kit is not limited to a night time use light or to any particular kind of light source but rather may have any kind of light device function, including functions of a second or multiple projection lights with different light sources to project light beams, images, or digital data from digital data storage, as well as functions of a desk top light, floor light, garden light, emergency light, safety light, anti-burglar light, underwater light, street light, reading light, night light, light fixture, motion sensor light, power fail light, photo sensing light, dimmable light, spot light, seasonal light, Christmas light and/or ornament, licensed product, cartoon character related product, promotion light, commercial light, sign, motion sensor light, blue tooth light, moving device, car light, vehicle light, boat light, aircraft light, and/or multiple purpose LED or laser light, the light device including rechargeable or non-rechargeable energy storage kits with preferred circuit, switch, sensor, timer, IC, electric parts and accessories to provide perfect functionality as required by the marketplace. All such alternative methods, skill, arrangements, constructions, and functions may still fall within the current invention scope.

As shown in FIG. 3-1, the LED or laser projection light powered by batteries or other equivalent function energy source as above discussed not only can project a plurality of different images on a predetermined area but also may provide a super bright night time use light with LEDs or laser unit(s) (3-1c) (3-1c') (3-1c") for super brightness to cause the light to be emitted down to the base area for a night time or dark time light. FIG. 3-2 shows a focus-adjustable LED or laser projection light that can project the image shown on a close area with desired clearance, sharpness and brightness to provide a splendid projection or laser image presentation. The focus adjustment by move the lens extend or retract back by quickly tread-kits as FIG. 12 (SS=9f) or FIG. 11 (ss-8e) or FIG. 10 longer tread arrangement.

Figure 4:
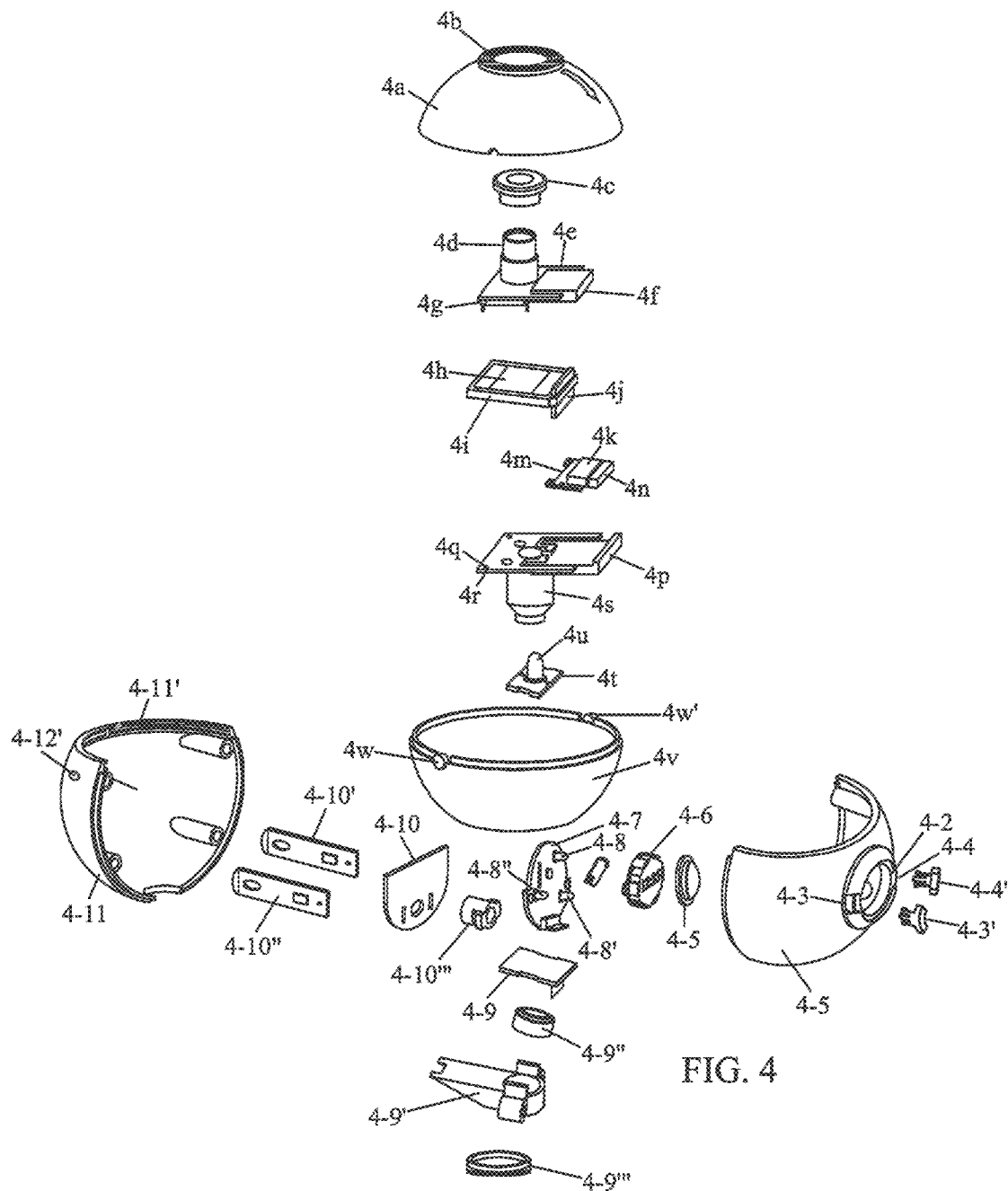
Figure 5:
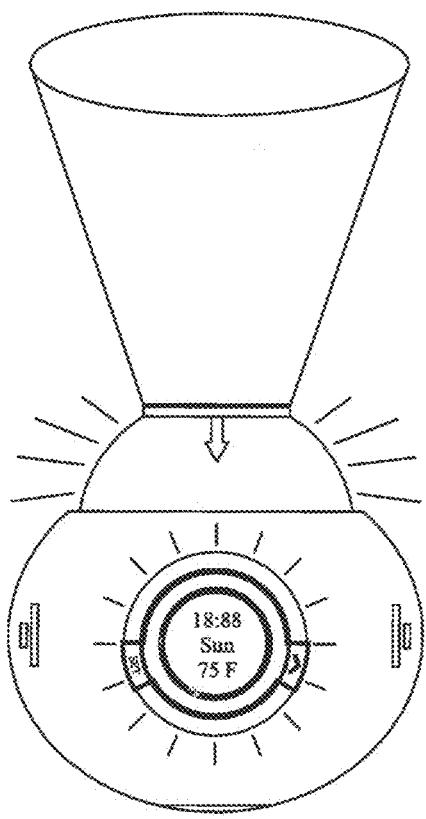
Figure 1:
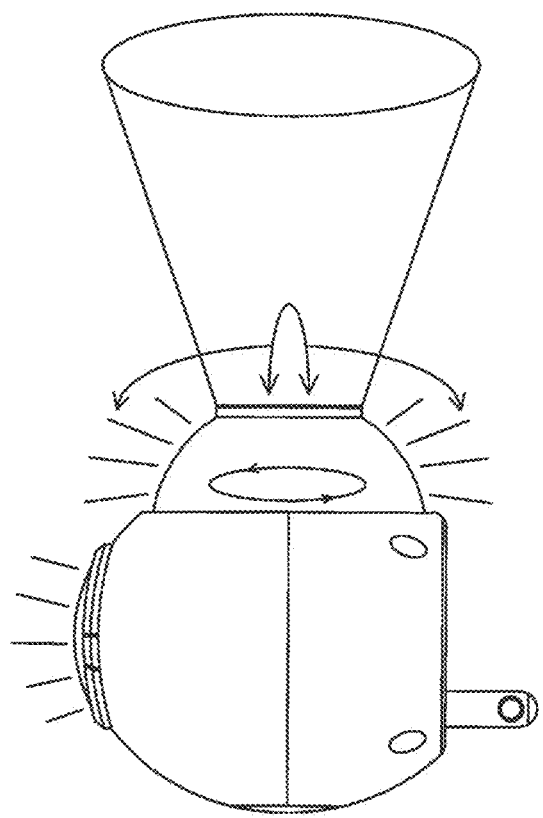

FIGS. 4, 5, and 5-1 show a third preferred embodiment of a LED or Laser projection light arranged to project a motion picture, changeable digital data, changeable LCD or TFT display-unit data, changeable digital data stored inside a digital memory card or memory stick, cartoon, changeable photos, time, date, and/or environment data. Changing of the image can be accomplished by any combination of automatic or manual changing kits including (1) a moving device, (2) a motor and gear-set assembly, (3) an animation device, (4) electric parts and accessories to change the display-unit, the display-unit including (a) a slide, (b) a film, (c) digital data on an LCD TFT screen display, (d) digital data on digital storage means, and/or (e) digital data on digital memory by automatically or manually changing means. The kits or device may be powered by a battery or 120V power source, indoor power source, outdoor power source, capacitor, or other energy storage components. This embodiment not only has an LED projection light but also a nighttime use light, weather station, movie projection, digital data projection, and/or cartoon projection.

FIG. 4 shows an updatable projection which can project digital display-unit(s) (4h) in the form of very tiny LCD or TFT screens fit-into one of tube-assembly or holder or tray (4i) (4j) which has wall surrounded and assembled with top other tube-parts (4f) also has wall surrounded to prevent the light beam emit out or leakage from the lower light source (4u) which fit-on the small PCB (4t) to the display-unit (4h) and go through the top project-lens (not shown) inside adjustable-focus-unit (4c) which is located on above and top of highest inner-housing tube of tube-assembly or fit-into top-opening of top-of-housing.

From FIG. 4 the said Laser or-and LED light device which has more than one tubes or holders or frames of tube-assembly that show the digital data on an LCD or TFT similar to the screen of a conventional cellular phone screen, DVD screen, MP4 screen, digital camera screen, digital video camera display, and/or computer screen such as the screen of an iPhone™, iPad etc. Such screens must have a relatively large size or have high visibility in order to enable people to clearly see the displayed images, which is costly. The current invention does not require display-units of large size or high visibility because the image will be magnified from ten to hundreds or thousand times. Hence, the cost is very low for this miniature size of screen. But it will be appreciated that the digital data has to have a certain clarity and sharpness or high pixel resolution so that the image can be projected to a large size and still have good clarity and sharpness.

The digital display-unit (4h) sits on a tray (4i) to enable the display-unit to be well protected from any impact and drop that might otherwise cause damage and also has wall (4i) surrounded display-unit (4h) and wall (4i) is assembled with top tube (4d)-with-base (4e) to prevent from light-beam leakage out from display-unit (4h) to out of the tube-with-base of tube-assembly. The tray of display-unit (4h) has wall (4i) has at least one side to arrange the plurality of the electric contact and related parts and accessories (4j) (4k) (4n) (4m) and connect with lower tube-with-base (4s) own wall (4p) to fit the conductive-piece which delivery electric-signals from the data-source such as pin-sets, conductive wires, conductive ribbons, resilient conductive means, conductive rubbers, conductive paper, conductive film, or any multiple piece electric contact to allow the digital data to be delivered from the digital storage means to the digital display-units.

The parts and accessories, such as pole (4g), hole (4q), holder (4n)(4j), board (4p), lower plate (4r), and top plate (40 are all designed to hold the digital display-units (4h) and deliver the electric signal from digital storage such as a memory card, memory stick, or other memory storage electric device to the digital display-unit(s) (4h) and all has walls to prevent from the light beam leakage out so light source (4u) insert into the and light beam emit from lower tube-with-base (4s) to all inner plate or holder (40 (4j) (4n) to the top tube-with-base (4d) all parts of tube-assembly has no light-beams leakage-out and this light-beam has image or-and patterns will emit out from the top housing-opening project-lens and spread out to wider areas. The conductive piece from the digital storage (not shown) to digital display-unit (4h) is not shown because it can be any available conductive piece.

A tubular assembly of FIG. 4 has each part including tube-with-base (4s), holder (4n), tray (4j), tube-with-base (40 and focus-adjust-unit (4c) each has wall (4i) to prevent from the light-beam leakage while traveling. The said tubular assembly emit light go through top the said digital display-unit (4h) includes, an upper tubular having an adjustable-focus unit (4c) installed on above the top of highest inner-housing tube (4d), which is formed in one piece with the top tube (4d)-with-plate (40 to allow the display-unit's (4h) data to be projected out to the desired area and also can adjustable the focus of image like FIG. 10 and FIG. 10A to 10C and FIG. 11 and FIG. 12 and FIG. 12A all has the focus-adjustable-kit (10-7k) (10A-7i) (11-8e) (11-8c'). The upper tube-with-base (4d) has top adjust-focus-kit's optics-lens within (not shown). The lower tubular has a tube (4s) and inner with a desired number of LEDs (4u) to let the LED light beams pass through and hit the digital display-units (4h). The whole tubular assembly, including the upper tubular-parts and lower tubular-parts, are fitted within a top and lower ball (4a) (4v) with two extensions (4w) (4w') to fit into the main housing groove (4-11') and cause the ball to rotate 360 degrees along the y-axis and tilt to the up-and-down or right-and-left to a certain degree to allow the image or light beam to be projected anywhere the user desires.

FIG. 4 shows a digital display-unit (4h) that serves as a digital time display with a weather station to show the time, date, temperature, and week through a front window or opening (4-4). The time-related parts and accessories (4-6) supply all the data for the digital display-unit (4h) and also offer data to a screen for window (4-4) so that both the digital display-unit and window have the same data at any time, the digital storage-unit of this embodiment and the time-related parts and accessories (4-6) using conductive parts to offer digital data to the digital display-unit (4h). The circuit board (4-7) connect with light source(s) serves as back light and night light for the window and upper ball so that this embodiment not only offers digital data projection but also has a lower portion window time display and night light for the ball, and a back light for the window message display, so the LED projection light of this embodiment has more than three functions. FIG. 4 shows an LED projection light having more than one function that is powered by a plug-in power source, but that also can be powered by batteries or rechargeable batteries or powered by another energy source as discussed above. The digital display-unit (4h) and window display (4-6) may have the same or different power sources as the second or third function kits, depending on market requirements.

FIGS. 5 and 5-1 show further FIG. 4 details of the third preferred embodiment that do not require further discussion here as they are all discussed in detail above.

From FIGS. 6, 7, 7-1, and 7-2 show a fourth preferred embodiment having an LED projection light to project light beams with focus adjustment and a second function kit for a night time use light powered by a battery or 120V power source, indoor power source, outdoor power source, capacitor, or other energy storage components with preferred conductive-piece to connect with power source. The LED projection light projects a super high brightness light beam while inside LED unit(s) incorporate a super high-power LED of from 1 watt to 100 watts available from the marketplace. The adjustable focus or add/remove/change projection functions can use features described in co-pending application Ser. Nos. 12/876,507, or 12/771,003, 12/711, 456, 12/646,621, 12/622,000, or 12/318,470.

Figure 6:
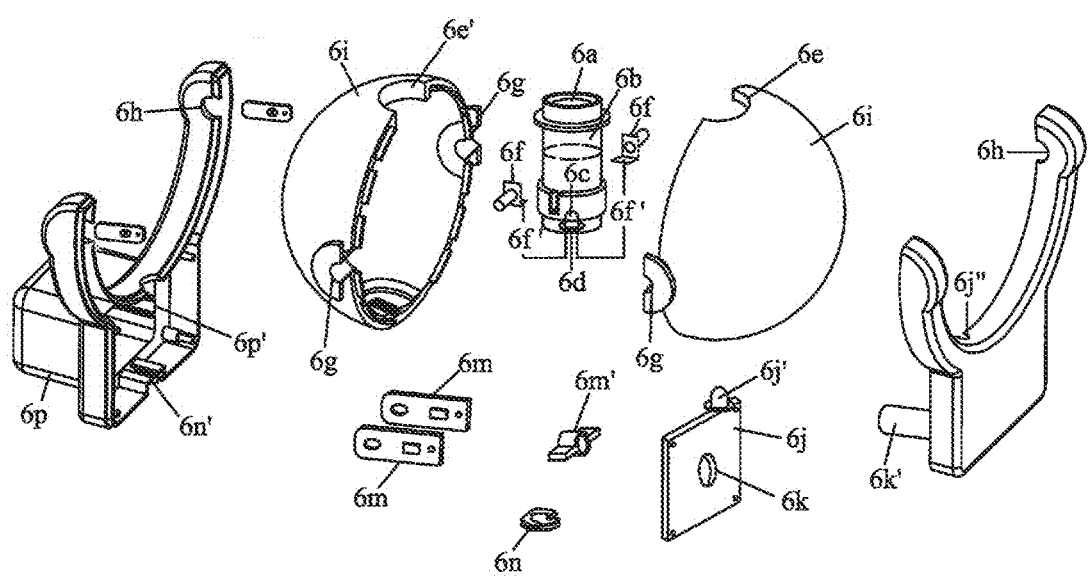
Figure 7:
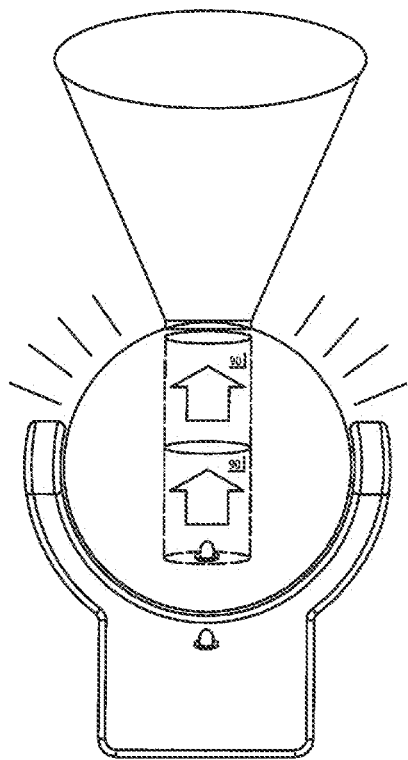
Figures 1, 7:
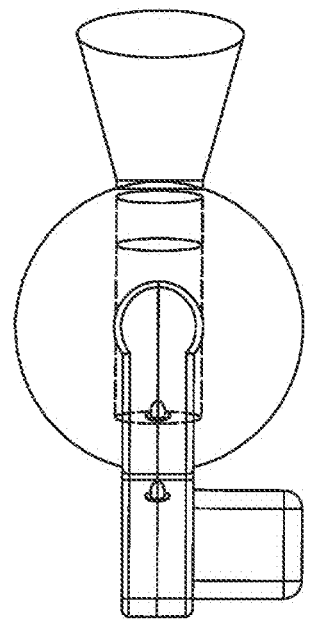
Figures 2, 7:
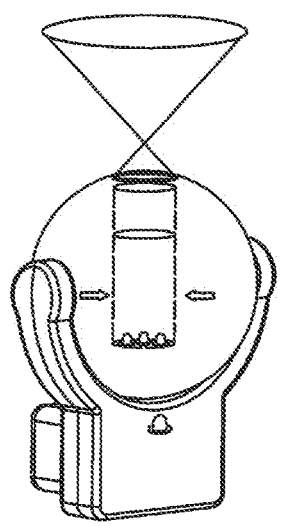

FIG. 6 shows an embodiment similar to the first preferred embodiment FIGS. 1 and 2. The difference is that the LED projection light of this embodiment has a night light powered by a plug-in power source as shown in FIGS. 6 7, 7-1, and 7-2. The other differences shown in these drawings are the inclusion of a focus-adjustment to enable the LED projection light to project the image or light beam similar with focus adjustable a flash light or torch light and/or with desired clarity, sharpness, size, brightness, and distance and the capability of rotating about any combination of the x-axis, y-axis, z-axis to cause the image or to projected to anywhere desired.

The co-inventor's prior arts and current invention's parent filed case date and other co-inventor parent case details as below listed: (#TT-2010) U.S. application Ser. No. 12/866, 832, Filed on Sep. 21, 2010, publication data US 20111-000-9496 date on Jan. 13, 2011.

This is Division filing for (#QQ-10) U.S. application Ser. No. 12/771,003, filed on Apr. 30, 2010, Publication data US 2010-027-7089 date on Nov. 4, 2010 Now is U.S. Pat. No. 8,408,736 issued date Apr. 2, 2013 VS. Current parent filed on Ser. No. 12/866, 832, Filed on Sep. 21, 2010

This is Division filing for (#00-10) U.S. application Ser. No. 1-711,456 filed on Feb. 24, 2010. Publication data US 2012/021-3849 dated on Aug. 26, 2010 Now is U.S. Pat. No. 8,083,376 Issued on Dec. 27, 2011 VS. Current parent filed on Ser. No. 12/866,832, Filed on Sep. 21, 2010 This is Division filing for (#11-2) U.S. application Ser. No. 13/540,689 filed on Jul. 3, 2012. Publication data US 2012/026-8668 dated on Oct. 25, 2012, Now is U.S. Pat. No. 8,511,877 issued date Aug. 20, 2013 VS. Current parent filed on Ser. No. 12/866,832, Filed on Sep. 21, 2010 This is continuous in part of (#II-1) U.S. application Ser. No. 13/534,611 filed on Jun. 27, 2012, publication data US 2012/026-8947 dated on Oct. 25, 2012, now is U.S. Pat. No. 8,714,799 issued date May 6, 2014 VS. Current parent filed on Ser. No. 12/866,832, Filed on Sep. 21, 2010

This is continuous in part of (#II-2009) U.S. application Ser. No. 12/624,621 filed on Nov. 24, 2009, publication data US2010/0214541 date Aug. 26, 2010, now is U.S. Pat. No. 8,303,150 Issued on Nov. 6, 2012 VS. Current parent filed on Ser. No. 12/866,832, Filed on Sep. 21, 2010

This is Division filing for (#HH-09) U. S. application Ser. No. 12/622,200 filed on Nov. 19, 2009, Publication data US 2010-102-8497 date on May 2027,2010 now is U.S. Pat. No. 8,434,927 issued date May 7, 2013 VS. Current parent filed on Ser. No. 12/866, 832, Filed on Sep. 21, 2010

This is Division filing for (#FF-4) U.S. application Ser. No. 14/968,862, Filed on Dec. 14, 2015 (Still Pending) which is Continue in Part of (#FF-3) U.S. application Ser. No. 14/539,267, Filed on Nov. 12, 2014 (Still Pending) which is Continue in Part of (#FF-2) U.S. application Ser. No. 14/275,184, Filed on May 12, 2014 (Still Pending) which is Continue in Part of (#FF-1) U.S. application Ser. No. 12/914,584, Filed on Oct. 28, 2010, Publication data 2011-008-532 3 public-date Apr. 14, 2011, Now is U.S. Pat. No. 8,721,160 issued date May 13, 2014 VS. Current parent filed on Ser. No. 12/866,832, Filed on Sep. 21, 2010 which is Continue in Part of (#FF-2008) US Application Ser. No. 12/318,470 filed on Dec. 30, 2008 now abandoned Even other co-inventor's prior-arts as below listed (10 cases) still is not been a prior-arts of the current invention.

Above listed are the same concept for LED light has project functions which at least has one of the LED light source preferred for white color light beam not close to Blue color, kelvin temperatures around 3,000 not 6,000K so the sufficient brightness white light beam to pass though the display-unit(s) and lighted the said display-unit(s) and go through the said convex lens to create a relative image basing on the focus theory. To adjust the said display-unit related to the optics-lens (Any desire assembly) for position, location, orientation, distance will created different image for different of color, size, position, orientation and image, Hereof, the display-unit(s) preferred is a colorful film, slide, character's art, geometric art, motion picture display, digital data display, LCD screen, TFT screen, L-cos display means, screen which contain data, colors, number, signals, message, logo, sign, design, art work so can project the bigger-size image and magnify by the said Optics Lens shown on the areas or surface which has at least 1 feet to desired distance which is far away from the said LED light device.

This is different with US prior arts Mr. Black for (1) The image present to the surface where are parallel with the LED light beam traveling-out direction. The current invention all the Object/slide/film/screen/display-unit all arrange is perpendicular or vertical to LED light beam traveling direction so the Image also present is close perpendicular or vertical to LED light beam. Furthermore, (2) The Major Different with Mr. Black disclosure for small size image like all market hand-held or toy device which the image-size is very small almost less than inch that is same as the optic-lens to the wall distance. The current invention the bigger-size image (around 3 feet diameter) is tens to hundred or thousand times bigger than the tiny-image (around ¼ to ½ inch diameter) on the object/slide/film/screen/display and big-image show on the surface where the distance from the optics-lens to surface between the 6-30 feet. And (3) The Mr. Black use the optics-theory is reflective to make the straight light beam to change direction. The current invention does not use any reflective lens or kits to make the straight LED light beam to change direction. So, the different optics-theory applied to Mr. Black and current invention (4) The Mr. Black need to use reflective device, lens, kits to make light beam change direction so need a bigger tube combination to install the TILT reflective-lens so all the other parts and accessories to fit within the Bigger tube also need bigger. The current invention the tube inner diameter preferred as small as possible so can allow all narrow viewing angle LED light beam to hit into.

(5) The smaller tube so the inner object/display-unit/slide/film/screen/display also can become smaller, so cost dropped (6) while smaller tube use the refractive optics-lens to magnify the tiny-image also can use smaller for this very expensive magnify optics-lens, so this is the big improvement of current invention than Mr. Black or other market out-of-date incandescent bulb for projection light which means the image or light is not been seen from light device, the image or light to be seen from the remote away distance which at least has 1 feet away distance.→This is for basic definition for so called Project Light device).

The current invention has tube-like assembly can well install the said object/display-unit(s) and optics-lens/optics-lens assembly, the said tube-like assembly between the Image output-end and LED. The LED may also install within the tube-like assembly lower-end and the other image output-end has optics-lens to magnify or refraction the small display-unit image become bigger viewing-size or wide-size to be seen on top ceiling, opposite wall, surrounding walls. The current invention bigger-size image do not show on the outlet-wall because to project the bigger-size image on outlet-wall need very complicated lens assembly and very expensive lens cost to overcome the image been deforming or torched or strange-image from top to toe for ratio problem.

The brief application basing on above definition of "project" meaning to compare the market other LED light which has number of the said opening(s), hole(s), cutout(s) to allow inner LED or LEDs light source or incandescent bulb or halogen bulb to "Emit" light from the light source though the opening, holes, cutout to form the shaped-image or colorful image which belong to optics-theory's "PIN-HOLE" image which as co-inventor's other co-pending filing. These devices use different concept, construction, parts, design, and without the current invention major parts including:

L1. Lack of Tube-like assembly to prevent light leakage out to reduce the light brightness into the display-unit(s)

L2. lake of the said Tube-like assembly to offer a space to accurate install the said may including LED, Display-units, optics lens to fix on right focus position to create clear and sharp image L3. lack of so called optics-lens install on housing highest opening or above top of inner-housing highest tube or holders and the optics-lens which may including at least one of the said optics refractive lens, convex lens or Optics-lens assembly to make the lighted display-units' image to be magnified or refraction by the said optics-lens and show to at least 1 feet far away from the said LED light device.

L4. Lack of adjust-kits to adjust the image's location, direction, orientation, angle, distance, colorful, size, brightness, timer or other features, functions, performance related to the image.

Figure 58:
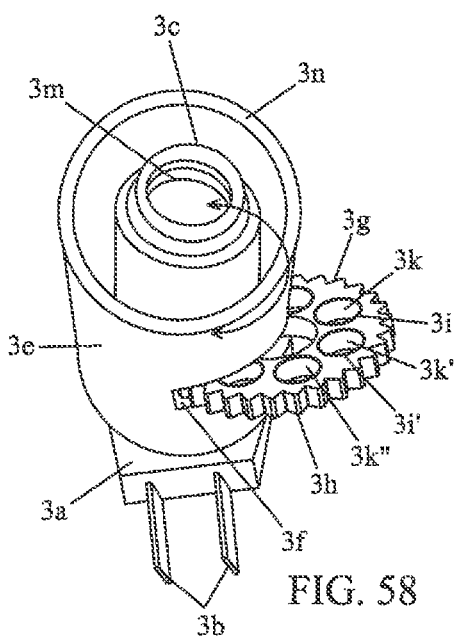

L5. Lack of the broad application as current invention has (5a) basic 1 image projection to (5b) more than 1 image projection as FIGS. 8,9, 43,45, 56, 58, 60 and FIG. 24, FIGS. 27 to 38, or-and (5c) Moving image projection as FIG. 24 and FIG. 58, or-and (5d) Motion picture image projection as FIG. 24 and FIG. 58, or-and (5e) Digital data image projection as FIG. 24 and FIG. 58, or-and (5f) Wireless signal image projection as FIG. 24 and FIG. 58, or-and (5g) Internet, Wife connected digital data image projection as FIG. 24 and FIG. 58, or-and (5h) More than 1 functions plus image projection as FIG. 1, 2, 3.4, or-and (5i) More than one switch, sensor, Blue tooth, remote control, wireless signal transmitting device to control the said image function, effects, performance as FIG. 1, 2, 3.4, or-and (5j) timer or other Integral circuit (IC) to make update features as FIG. 1, 2, 3. 4, or-and (5k) moveable, replaceable, changeable of the said display-unit(s), digital data storage, build-in digital data wireless connection to get continue update changeable digital data or signals, or-and (5l) movable, change position, replaceable of the said project-kits to any location of the said substrate such as FIGS. 16, 17, 18,19 shown ball shape housing with plurality of the project-kits install compartments to load and has pre-circuit arranged to make the quickly electric connection and delivery electric signal including power or function, control signal to make the movable, changeable, replaceable project kits on different location and can change at once for multiple areas illumination by light beam or show images on many locations from one of the LED device;

→All these details description as below listed.

So, the current invention for many applications to use (A-I) LED light as light source which has no high heat to damage the said display-unit so LED light can close to display-unit(s) and right under the display-unit(s) and will not lose the sufficient amount of light brightness to other area and make the dim or dark or not clear image projection effects.

(A-II) Tube-assembly which in any geometric shape which mainly to offer space to well install under accurate calculation for where to put the display-unit (as object) related to its optics-lens so can make desired size image basing on the physics image and refraction theory (A-III) Optics lens or lens assembly to make the LED light beam change from narrow arc emit-out angle to become all light-beam in parallel to hit the display-unit(s) and make it for good lighted object(s) to incorporate with optics-lens to make the lighted object's image present on the image output-end and further though the preferred optic-lens or lens-assembly to refraction or magnify to form desired wider size, wider image, colorful image, moving image, update digital data changeable image, time, or other art, design, characters, cartoons, sign, picture, photos, geometric design on the areas may at least shown on one or more than one of ceiling, walls, floor, ground or screen as required.

Figure 8:
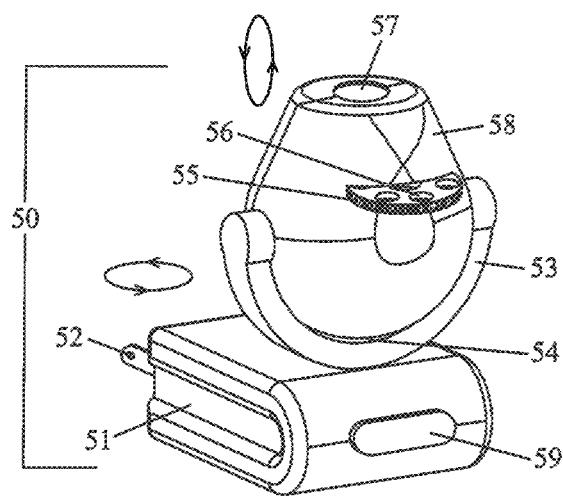
Figure 9:
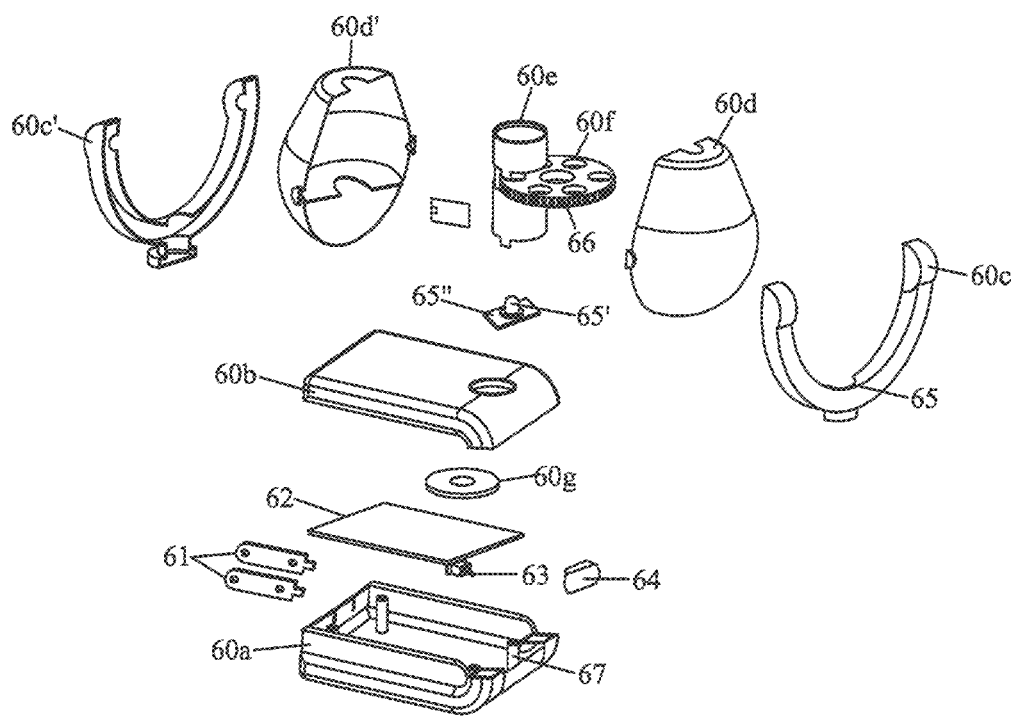

From FIG. 8 to FIG. 68 for co-pending or co-inventor prior arts shown as features of the above discussed (a) to (l) features:

From FIG. 8 and FIG. 9 show the AC powered project LED light

Adjustable and replaceable Plurality display-units or-and optics-lens From FIG. 8 and FIG. 9 show the one of LED light (8-50) has projection function which has base (8-51) has control switch or sensor (8-59) to control the inside LED (9-65') to turn on and turn off as desired functions which may by Blue-tooth, remote control, motion sensor, manual switch (8-59), Photo sensor, Infra-Red remote or other control means available from market place. The said LED (9-65') preferred to install on small PCB (9-65") and assembly with the tube-assembly and emit the light into the tube-assembly to prevent light beam leakage out.

The tube-assembly FIG. 9 has cutout (8-56) to install the object/display-unit(s)/slide/films disc/roller/holder (8-55)(8-56) which has plurality of objects/display-unit(s)/slide/film (here as film or slide 9-60*f* of FIG. 9) to let LED (9-65' of FIG. 9) strong white color light beam to emit into the said colorful characters or cartoons or geometric-art design film or slide to lighten the said display-unit(s) tiny-image to become a bigger-size image which basing on the said optics theory claimed "Object" which incorporate with the said optics-lens can form the desired size of the image as co-pending filing of U.S. Pat. No. 8,721,160 or 14-275,184 or 14-539,267 details optics-theory of Physics. The said lighted tiny-size display-unit(s) image as lighted object which pass though the optics-lens (9-60 of FIG. 9) on above and top of the tube-assembly or on the housing highest opening can created clear and sharp and bigger-size image by the physics refraction and magnify theory which is different the PIN-HOLE image that the light beams passing through holes, opening(s), cutout(s), film(s) without the optics-lens to act as refraction functions, the pin-holes image which do not have clear and sharp image so it look very terrible not like current invention image shown, the bigger-size image quality is close to see Super Big TV such as 100 inch or 200 inch TV screen so clear and sharp colorful images and the bigger-size image is not able to shown on outlet's location wall surface for direct Plug-In Outlet or outdoor for night time use light, It preferred to project to top ceiling or the opposite or adjacent walls and not on the wall where the wall night light direct Plug-in.

From FIG. 8 the LED light (8-50) top frame (8-53) is rotatable for unlimited degree on the horizon axis or related to base (8-51), and has $2^{nd}$ LED (8-54) to emit the light to upper also rotatable on vertical axis oval-shape housing (8-58) to make the top oval shape-housing (8-58) to be illuminated while the circuit (9-62) deliver electric signal to the said LED (9-65') The LED light (8-50) has prong (8-52) (9-61) to supply AC power source of 120 Volt 60 Hz get into Circuit (9-62) and incorporate related electric parts & accessories (Not shown) to make the said AC 120 Volt 60 Hz input current to have LED light source operation-current form and the said Circuit has all kind of IC, sensor, control, remote control, Blue-tooth, wireless control, switch, timer to make all kind of LED light functions or power saving effects as required or same as co-inventor's other US prior arts for power saving, More than one LED light source, or more than one optics-element which all should be consider within the current patent filing for other features listed on the above Related US Application data.

Also, the FIG. 8 and FIG. 9 shown the Direct Plug-In LED Image projection light and Built-in Night Light (Simple nigh tight) for more than one functions, But while make the Direct current powered unit, Just move out the inner 120V 60 AC-to-DC circuit and prong to add the battery related parts or accessories, then, This preferred embodiment become DC power unit so still fall within the current invention scope and claims without any argument. Or, the unit just use DC power source and no need circuit to transfer the 120 Volt 60 hz to DC power source for Just DC power source Project light which has built-in all kind of light function for lower cost version.

However, Some US prior art which use the Incandescent bulb or halogen bulb to try to make image projection device but all had problem for heat issues come out from 4 Watt or 7 Watt super High temperature so all prior art have to put hot incandescent bulb on top location or side locations and work with other reflective-mirror or lens to make the light back into project tube to make projection light function. And all these prior art because light source on top (Because heat flow will move to top basing physic law), so All of the bulb application which will no way to see image on top ceiling and surround walls or adjacent walls because heat always come to up or top, so slide have to be under the light source which only application for image show on the ground or floor of lower position surface which is not good for people to see image while they take a rest or sleep or stay for kids while they lie-down or on bad for sleepy. The others page will show the brief DC power image projection light and built-in for nighttime use light.

From FIG. 8 and FIG. 9, the LED light (8-50) has display-unit disc (8-55) (9-60) which can be moveable, changeable, replaceable and it can be use manual to make it change film or slide (8-55) (9-60*f*), It also can incorporate with motor, spin, clock movement, rotating to make it for automatically changing slide or film (8-55) (9-600 as co-pending and prior arts. The further the tube-like assembly may have screw thread so can make it extend or reduce length to change the relation of (optics-lens) VS. (display unit) to get different sharpness image which we called the adjustable focus.

So, the current invention's projection LED light (8-50) major has features:

F-1: White LED light beam emit to display-unit(s) to create the image or patterns been lighted and pass though the Optics-lens to magnify (refraction) to large-size colorful image to areas away from LED light.

F-2: Has moveable, changeable, replaceable plurality of display-units (may in film or slide or digital data or other display-units discussed on above)

F-3: Has horizon and vertical or any combination of axis for adjusting image projection directions or areas for 3 dimensional space and has any desired size, focus, angle, orientation, position of image while incorporate right optics-lens or lens assembly.

F-4: Has tube-like assembly or other device(s) to well install the said LED, Display-Unit, Optics-lens on accurate position to create nice, clear, sharp focus (adjustable focus) image to be seen.

F-5: Has tube-assembly has more than one of the tube or holders or frame and each has wall surround to prevent from light beam leakage-out from the LED to display-unit to top project-lens.

Figure 10:
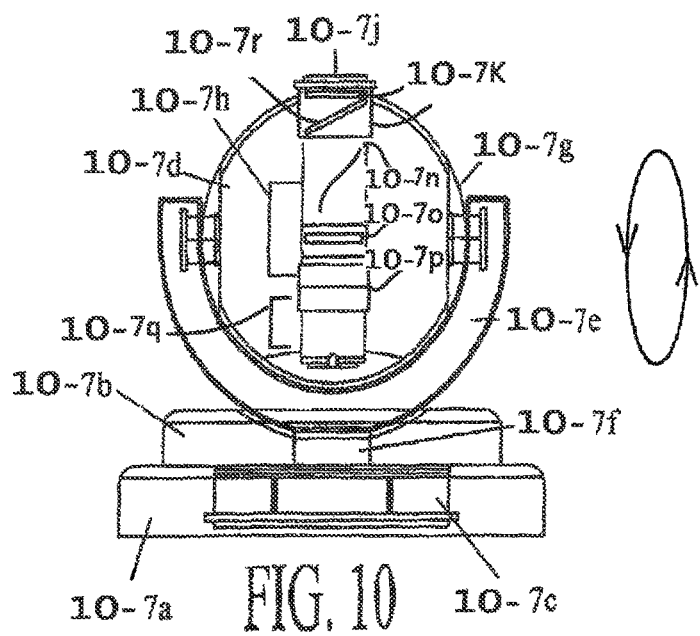

From FIGS. 10, 10-A, 10B, 10C show the Direct current powered image projection has adjust focus, angles, rotate, extendable, interchangeable power-source between AC and DC power source.

From FIGS. 10, 10-A, 10B, 10C show DC or-and AC powered project light for wall, surface, ceiling installation with focus adjustable features and functions.

From FIGS. 10, 10A, 10B, 10C: Disclosure the LED Projection light has Direct current power source or power compartment or circuitry (hereafter as DC power) (10-7c) inside the base housing (10-7a) and has rotating frame (10-7e) has neck (10-70 to connect with the Base Housing (10-7a) to make the frame (10-7e) can rotating on horizon for unlimited or design degree and neck (10-70 and frame (10-7e) has center hollow space to allow the non-twisted electric wires to install to connect with the two elastic electric connectors (10-7g) so make the ball housing (1-7d) can also rotating on the vertical axis for unlimited degree or circles and can fix on the certain degree to project the image on certain position without loosen. The inner space of ball housing has a project-assembly consist of at least one 1. Tube-like assembly to prevent light beam leakage out and offer space to install the said 3 basic-part of projection-assembly including LED, display-unit(s), optic-lens so can keep the Optics-element(s) on precisely and accurate locations to make the tiny display-unit(s) image to magnify to super bigger-size color image to project out from the top-end of tube-like after passing though the above of top-end of tube-assembly's optics-lens (10-7j). The tube-like assembly has screw thread construction for short-type (10-7r) or long-type (10-7n) to make the tube-like assembly can change distance relation of object/display-unit/slide/film with the Optics-lens (10-7j) so can make the image focus and present on desired location with nice image and it can be adjustable at any time. The current invention preferred the LED has super brightness and white Light beam which is cool white so can make the tiny-image color of the said object/display-unit/slide/film do not have deviation or become strange color.

From FIGS. 10, 10A, 10B, 10C and FIGS. 11, 12, and FIGS. 26-43, 45 and FIGS. 47, 48, 55, and FIGS. 58, 60, 61, The current invention teach other important improvement which relate to the said tube-assembly can be one elongate piece or multiple sections or piece to from one tube-assembly (10-7h) for other consideration to install the display-unit(s), Optics Lens, LED 3 basic-parts for project-assembly or-and other optics-element(s) on right position and quickly assembly to save labor time. Some time, the One piece Tube-like assembly which is too difficult to well install the too small or too tiny slide or film which less than 3-10 mm diameter and soft so the more than one piece of the said of tube-like assembly is adapted for some consideration as above discussed.

Figure 10A:
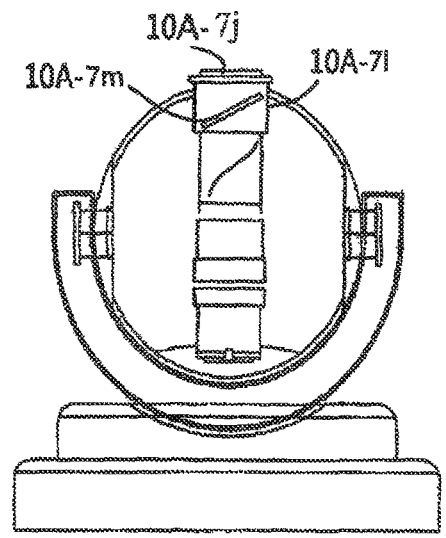
Figure 10B:
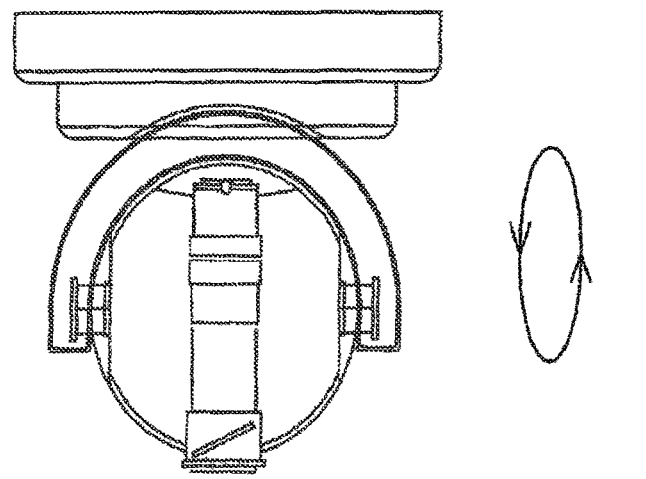
Figure 10C:
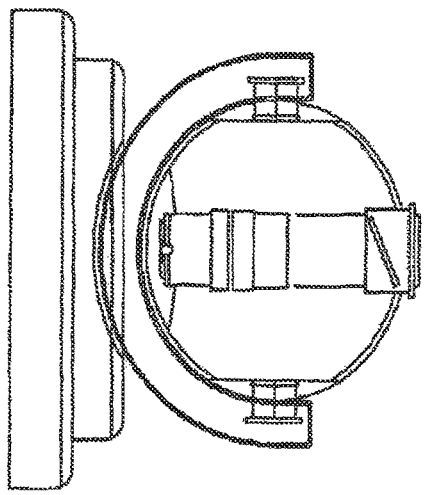

From FIGS. 10, 10A, 10B, 10C also teach the different application for DC or-and AC power LED Projection light which may powered by any kind of Direct or-and Alternative power from the said Batteries, Solar Power, Wind power, chemical power, generator, transformer, adaptor, Energy storage means, USB power, USB wired power, and it can be design to work with hook, phone holes, hanging, glue, compound, screw or other market available installation-skill so can install on desk top or surface as FIG. 10A, Ceiling or under cabinet as FIG. 10B or Walls/vertical surface as FIG. 10C not only on top of the surface as FIG. 10A.

From FIGS. 10, 10A, 10B, 10C the each of the project LED light has built-in night time use light which the said Frame (10-7e) and ball housing (10-7d) may no need to rotating because the unit is not big so can also be move the unit to make bigger-image present to other location. It can be made by housing has some tilt-surface which can let unit be put on surface and the projection direction has certain degree angle to the said desk top, wall, floor, basement surface so it can changed the projection direction by moving the unit same as preferred embodiment disclosure on FIGS. 3, 3-1, 3-2 which the project direction is not movable, changeable, rotatable.

Figure 11:
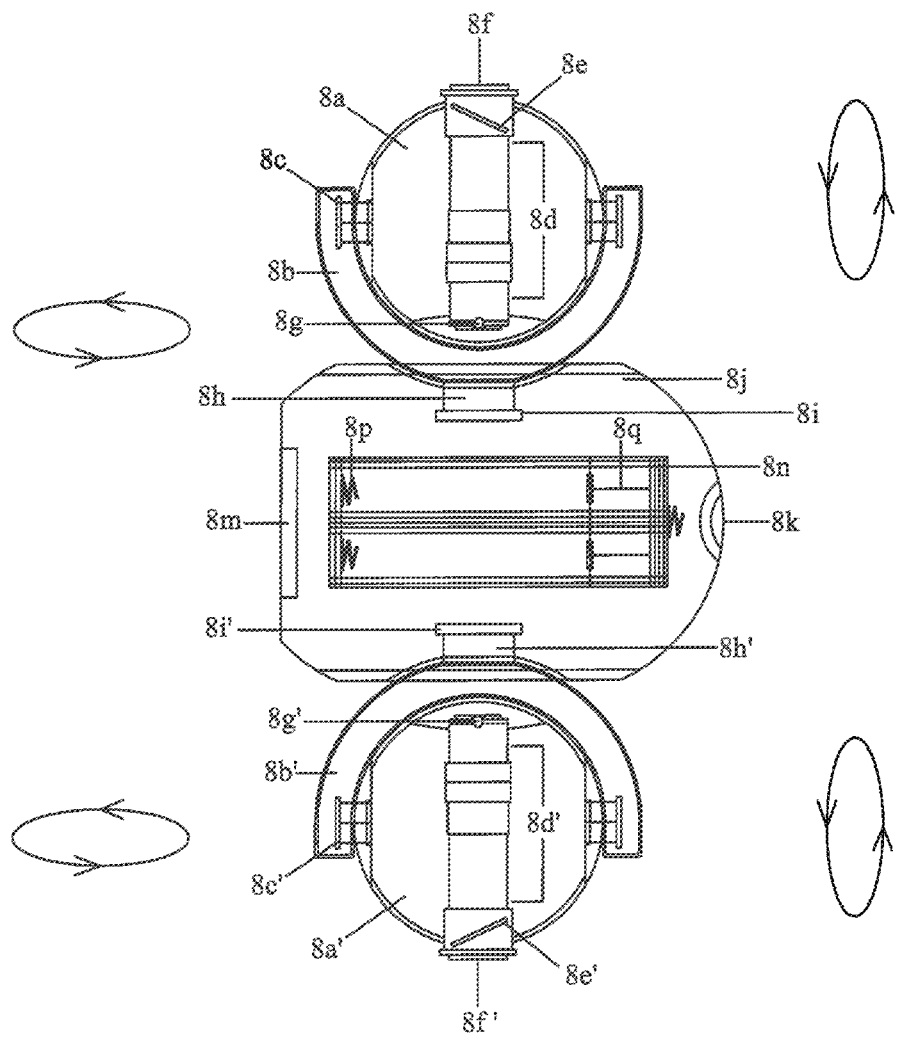

From FIG. 11 show 1. More than one function, or-and 2. More than one type of display-unit, or-and 3. More than one bigger-size image, or-and 4. More than one electric control system From FIG. 11 show 4 Show the LED or-and Laser project light has Plug-In conductive-metal piece without or with wires to connected and powered by AC current or DC powered LED or-and Laser projection Light. More than One of the project-assembly in one unit has preferred one power source (11-8n) which may in a battery compartment (11-8n) or the Direct Plug-in conductive-metal piece with or without wire or AC sealed-unit (Not shown prong or plug-wire but it same as FIG. 64 which co-inventor CO-PENING CASE had (#HH-09) U.S. Pat. No. 8,434,927 issued date May 7, 2013 VS. Current parent filed on Ser. No. 12/866,832, Filed on Sep. 21, 2010. It is appreciated that the U.S. Pat. No. 8,434,927 is belong to CO-PENING CASE (#HH-09) U.S. Pat. No. 8,434,927 issued date May 7, 2013 VS. Current parent filed on Ser. No. 12/866,832, Filed on Sep. 21, 2010 all concept, construction, application, functions still fall within the current filing scope and claims for interchangeable power source between (1) DC power and (2) AC power. The interchangeable power source (11-8n) supply the electric power to the said top and lower symmetrically and identically two project-assembly (11-8a) (11-8a') is other feature of the current invention. It is appreciated that this FIG. 11 has each one parts from the top and lower project assembly has same Number with or without (') on following discussion;

From FIG. 11 show the LED (11-8g) (11-8g') to emit sufficient brightness into the tube(s) (11-8d) (11-8d') and short tubes, and lighted the inner object/display-unit/slide/film tiny image and passing through above top of tube-assembly optics-lens and emit out from the highest house opening to any direction for bigger size and shape of the image or-and patterns. Or-and the top one piece (11-8e) of tube-assembly below the project-lens (11-8f) has screw-thread construction to change the Optics-lens (11-8f) (11-8f) distance relation with inner display-unit (as optics-theory object) so can make focus changeable for certain range to allow user to get best image to be seen.

From FIG. 11, The one end of the tube-assembly (11-8d) (11-8d') has LED light source (11-8g) (11-8g') to emit the narrow viewing angle LED light beam into tube-assembly and lighten the inner display-unit(s) tiny-image which maybe a or any combination selected from (1) colorful film or (2) slide or (3) transparency screen or display or L-cos reflective screen has changeable or update digital data (4) any cartoon (5) Disney or other Characters (6) Steady image (7) Moving image (8) Movie (9) changeable update wireless connection digital data
(10) Geometric arts or any other object/display-unit(s)/slide/film;

Which want to see its bigger-size, colorful image on top ceiling, adjacent walls of ceiling, opposite walls or outdoor surface those are feet away of the said LED light.

The said LED light beam passing though display-unit(s) and optics-lens to get the best colorful bigger-size image which is from 10 to ten of thousand times bigger than original display-unit's tiny-image is current invention features and not like the Epson use very expensive Glass optics-lens super high heat light source and fixed on top location or hanging on the wall with a lot of ugly wires to connect by wired-plug to get power from the outlets. The current invention use very low watt of LED from Nichia Japan which has super lower power consumer and get the brightest and bright LED Kelvin temperature to make all kind of the display-units tiny-image become super bright, and the current invention only use simple and limited piece of Lens to make nice and sharp focus bigger-size image. The current invention use Directly Plug-In by conductive-metal piece without or with wire or DC powered for such lowest power consumption LED light can get same effects or better than EPSON use wired-plug with lot of glass-optics lens which is no way to pass the US required safety standard including (a) Drop test (b) Impact test (c) Hanging (d) Load weight (e) Housing heat raising . . . testament or other safety standard which all points need to be passed with its safety certification for LED light which not only offer the Image but also offer the illumination for super-power saving device.

The FIG. 11 also show the ball (11-8a) (11-8a') can unlimited rotating on vertical axis and frame (11-8b) (11-8b') also can rotating unlimited circles as wished basing on the two elastic-electric-contactor (11-8c) (11-8c') and neck (11-8h) (11-8h') this also the current inventions features and patentable construction which never had any other application or device for LED or-and Laser projection Light for indoor or outdoor applications to use such simple and unlimited rotating functions.

From FIG. 11 and FIGS. 16,17,18,19 and FIGS. 24, 27, 28, 29, and FIGS. 30 to 38, The current invention teach a one LED light has more than one bigger-size image(s) project from 1 or 2 ball-shape housing device by more than one project-assemblies FIG. 11 which is not same as the other co-inventor's FIGS. 16,17,18,19 shown that has only one ball-shape housing as plurality real and fake project-kits to has more than one of bigger-size image(s) which inside co-inventor's (#SS-10) U.S. Pat. No. 8,083,377 U.S. Ser. No. 12/876,507 (SS-2010) now U.S. Pat. No. 8,083,377 issue date Dec. 27, 2011 has all details description, construction, features. It is appreciate all the technical, concepts, acknowledgement, design, embodiment, examples, skill of the said co-inventor (#SS-10) U.S. Pat. No. 8,083,377 or its parts of skill, technical, application still fall within the current invention from the basic model only has (1) tube-assembly to install the projection-assembly 3 basic parts including (2) LED (3) object/display-unit/slide/film (4) Magnify project-lens to any other added (a) Functions, or-and (b) Features, or-and (c) More than one bigger image, or-and (d) More than one of light function, or-and (e) More than one other electric functions, or-and (f) . . . etc. should be still fall within the current invention's scope, claims without any argument.

The LED projection light of FIG. 11, also can optional incorporate with $2^{nd}$ functions device to has more features such as can add such as has more than one of Bigger-size image(s) can get from the preferred embodiment of FIG. 11 or like the co-inventor's other issued or co-pending filing:

1. (#FF-1) U.S. Pat. No. 7,832,917 which has more than one functions,
2. (#AAA-10) U.S. Ser. No. 12/984,583 has project light and nighttime use light in variety lighting features,
3. (#TT-10) Ser. No. 12/866,832 has all kind of the changeable digital data display-units from; those has at least one of desired combination from following functions or features
   (1) Fix or-and moving for same or different size of image or images or patterns
   (2) Multiple of fixed or-and movable image has different size or timing to show out
   (3) IC or SD or video tape, memory card pre-storage fixed or changeable image
   (4) LCD, TFT, L-cos displayer, screen, reflective-lens assembly for changeable, digital data
   (5) wireless, internet, website, electric signals transmitting or receiving, changeable and update digital data displayer, screen, display-unit(s)

The said FIG. 11 unit could become different LED or-and Laser light while incorporate with different electric parts & accessories as below examples, but not limited for these embodiments, including
   (1) Motion Sensor become motion sensor project light which can apply to the public building to save lighting power wastage. While people approach certain distance the two projects light beam lighted the upward or downward stair and after a predetermined time the LED turn off, so this is very good application for public building such as Parking lot, Evacuation stairs.
   (2) Power fail while this unit has screw base and built-in battery for power fail timing, This will become power failure emergency light and it work as normal motion sensor projection light beam night time use light (No image projection as co-inventor COPENDING CASE (#QQ-10) U.S. application Ser. No. 12/771,003, filed on Apr. 30, 2010, Publication data US 2010-027-7089 date on Nov. 4, 2010 Now is U.S. Pat. No. 8,408,736 issued date Apr. 2, 2013 VS. Current parent filed on Ser. No. 12/866,832, Filed on Sep. 21, 2010 which show on FIGS. 27 to 38 for all details, concept, construction, features still should be fall within the current inventions as the US related application data listed.
   (3) Blue tooth sensor to trigger the light turn on which also good for each house owner so can turn on the front door or drive way Project Light beam (Not image or even has image) while people back to home at night time without to use any remote controller because Blue tooth can automatically detected the cell phone within the range and turn on the current invention more than one project-means to project more than one areas at the same time.
   (4) The co-inventor also has (#SS-10) U.S. Pat. No. 8,083,377 same as FIGS. 11, 12, 12A, 13, 14, 15, 16, 17, 18, 19 to has the multiple of project-assembly to project plurality of the light beam or image to plurality of areas with desired same or different size(s) and locations (More than 2 and up to hundred areas been lighted by the said Plurality project-assembly to lighted plurality of areas.) Not only this features but also at least one or each project-assembly can be moved, changed, replaced by user or mechanical design because housing has a pre-arranged circuit inside of housing so the light-beam or optic-element or display unit can moved in or move out or removed from one hole/position can insert into another hole/position and can turn on and turn off as design or market requirement.

(5) Other 2$^{nd}$ functions can add (a) Built-in night time use light so not only has projection Image or light beam to other areas but also the LED unit also is turn on and let people has illumination from light device and illuminated the near-by area of the said LED light, and One of preferred night time use light can be the twinkle stars night light which can use pin-holes image for built-in project light which offer a plurality of the said moon, stars, planet image on top ceiling and all adjacent walls for 3 dimension for room and let people see night time sky full of stars, planets, moon so make people enjoy or fall asleep or not feel alone as co-inventor's (#CC-09) U.S. Pat. No. 7,832,917, (#CC-1) U.S. Pat. No. 8,128,274, (#DD-08) U.S. Pat. No. 7,871,192, (#GG-08) U.S. Pat. No. 8,002,456, (#GG-1) U.S. Pat. No. 8,231,260, (#FF-1) U.S. Pat. No. 8,721,160 and co-pending (#FF-II) Ser. No. 14/275,184, (#FF-III) Ser. No. 14/539,267; all these prior or co-pending cases disclosure the said Pin-Hole image night time use light which is one of the preferred to become 2$^{nd}$ Light of the 2$^{nd}$ function for add up to above discussed the BASIC-Model of the said current invention for the said LED project light.

(6) Other 2$^{nd}$ functions can add any electric or mechanical other functions device (7) Other 2$^{nd}$ functions can add which may add charging device such as USB charger related device to use USB wire and Plug to charging the other electric or electric device which use for computer, communication, consumer electric device (8) Other 2$^{nd}$ function can add power source such as add the outlets to supply power source to other electric or electronic device for computer, communication, consumer electric device while the said LED light is a plug-In conductive-metal piece without or with wire into outlet type, so it can offer at least one of outlet receiving ports to connect with LED light prong so can offer AC 120V 60 Hz electric power source though Outlet receiving ports to other device's prong or wired-prong.

Figure 12:
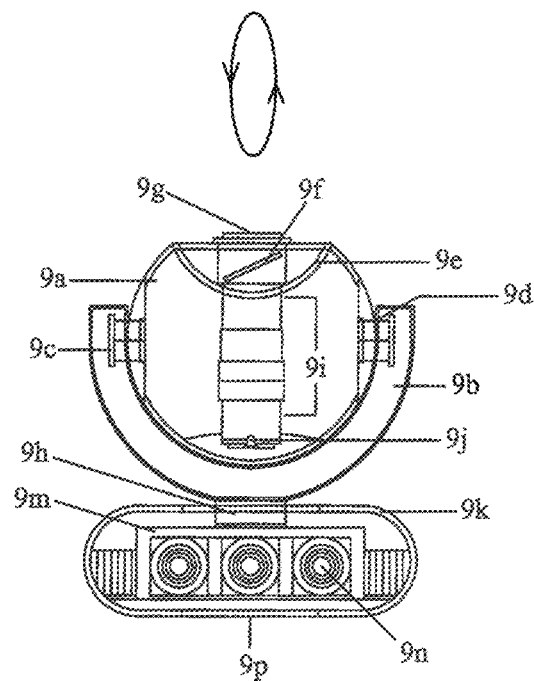
Figure 12A:
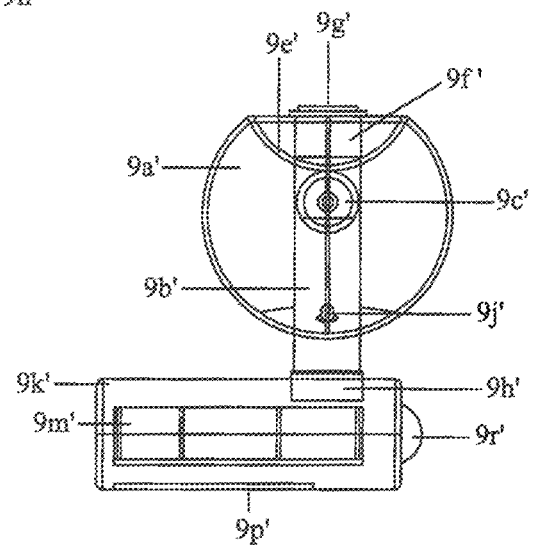

From FIGS. 12, 12A=>LED or-and laser Project light has DC or AC powered with x-y-z axis direction change functions.

FIGS. 12, 12A show Top housing (12-9a) has Tube-like assembly (12-9i) has focus adjust (12-9o to adjustable optics lens (12-9g) to change the distance and relation of the said display-unit(s) (not shown) which inside the number 2 or number 3 piece of Tube-like assembly (12-9i) which may on one section/location of the short-elongate tube-like tube or holder or frame or base so easily to assembly and still can assembly into whole-elongate tube-like by multiple short-tube pieces and each short-tube may install one parts and each of the short-tube can be press-tight or physic-tighten to prevent light-beam leakage out and also save a lot of installation for the parts & accessories such as Optics-Lens, display-unit which need very accurate position if has any mm distance different will cause bigger-size image is mess and not sharp image or even could not readable for what image or data.

The said top oval-shape housing (12-9a) can rotating unlimited circles to vertical axis and the Frame (12-9b) also can rotating on horizon axis for unlimited circles by elastic-conductive contactor (12-9d) or the Neck (12-9h) so can make the LED image projection to anywhere of 3 dimensional space with adjust angle, position, orientation, size, sharpness and adjustable focus.

The FIG. 12A is show the side view for The FIG. 12 and both have preferred embodiment is powered by DC power source in all kind of type available from marketplace and has details listed some type on above discussion.

Figure 13:
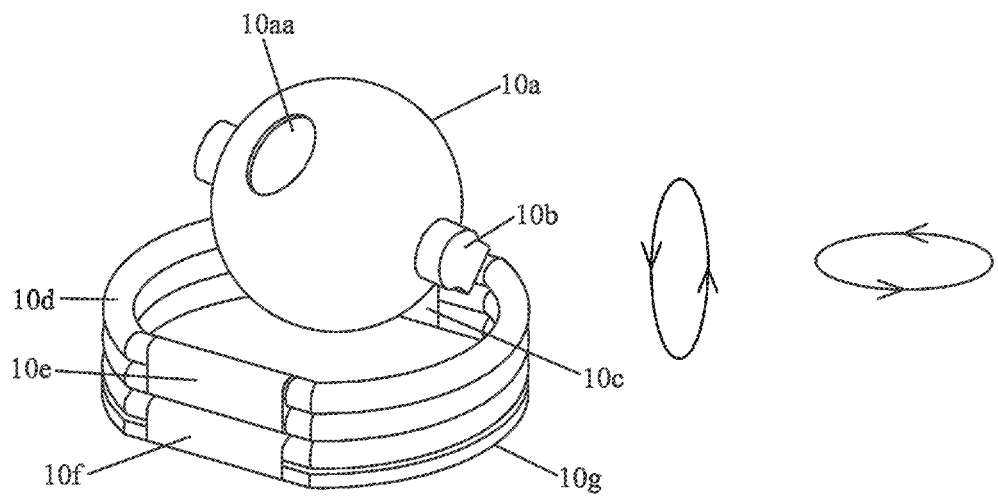
Figure 14:
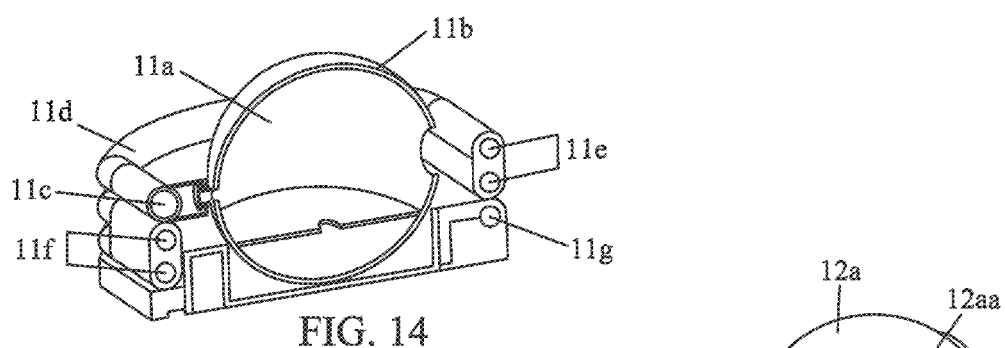
Figure 15:
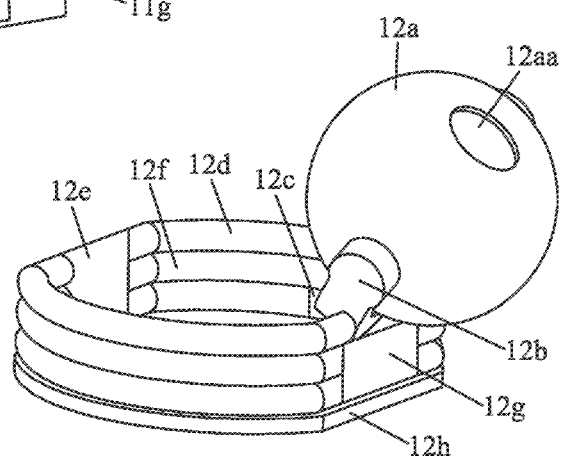

From FIGS. 13, 14, 15=>show the LED or-and Laser project light has joints, arms, bars, pins, rings to have transforming function(s) to change shape for indoor or outdoor light application.

From FIGS. 13, 14, 15 show other construction for the LED or-and Laser Image projection light which has transforming features of the shape so can allow people to use for many different works. From FIG. 13 show the LED light has a base (13-10g) which has all electric parts, power source (Direct Plug-in AC or DC power source), circuit, IC, switch, sensor, control within the base and The base (13-10g) also has certain weight or enough parts has enough weight so can let the each Ring to extend separated to linear shape or fold back to original shape for different work needed.

The ball housing (13-10a) has 2 elastic-conductive contactor (13-10b) to allow the ball can rotating on vertical axis for unlimited circles and deliver the electric signal to inner LED (not shown) and make the LED turn on as above details description to project a big size, colorful image to be seen.

The FIG. 14 shown the each ring (14-11d) has the empty or hollow tunnel (14-11c) and allow the conductive wires (14-11e) (14-11f) can passing through the tunnel (14-11c) from base to the top Ball housing (14-11b) and get into inner space (14-11a) to connect with LED (not shown).

Figure 56:
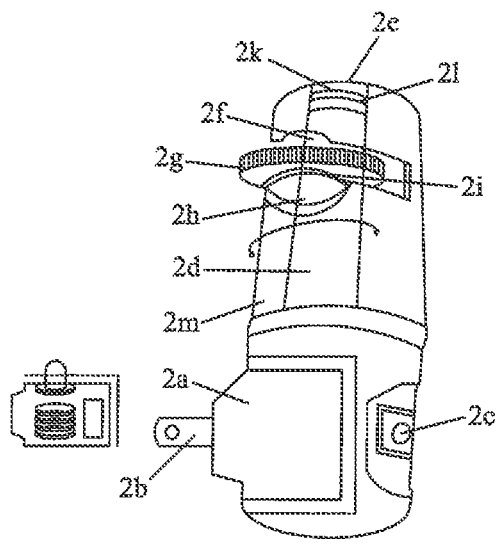
Figure 57:
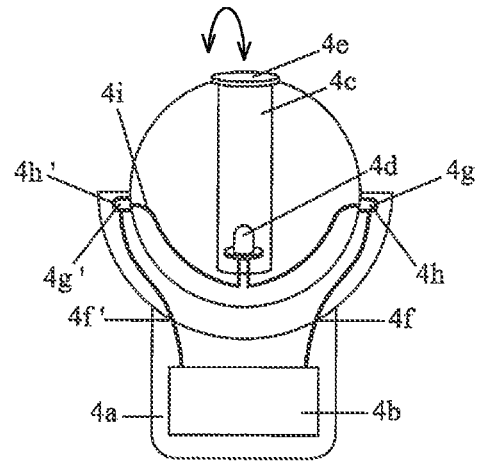
Figure 59:
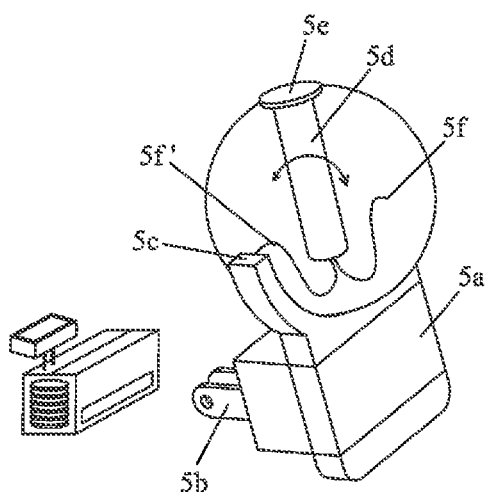
Figure 60:
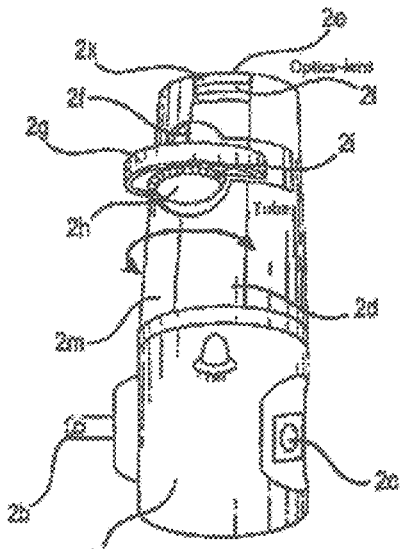
Figure 61:
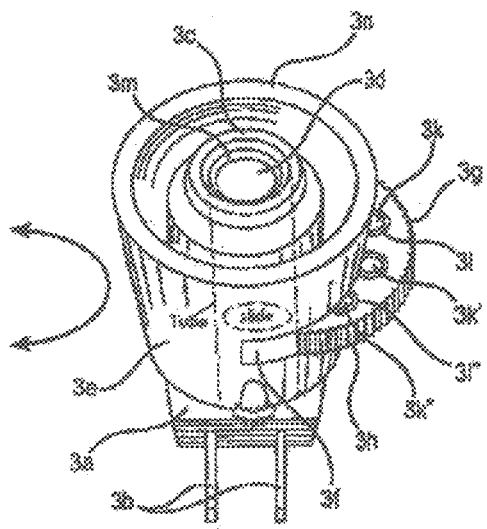
Figure 62:
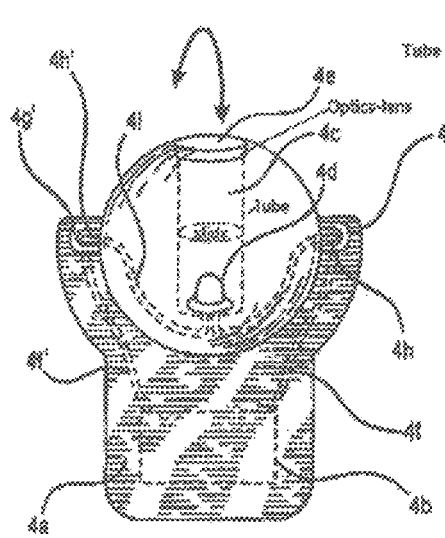
Figure 63:
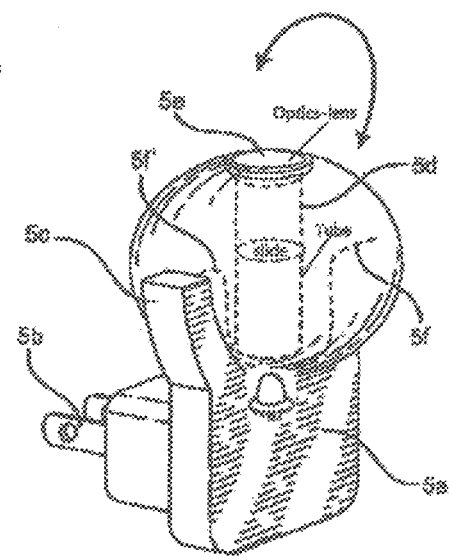
Figure 64:
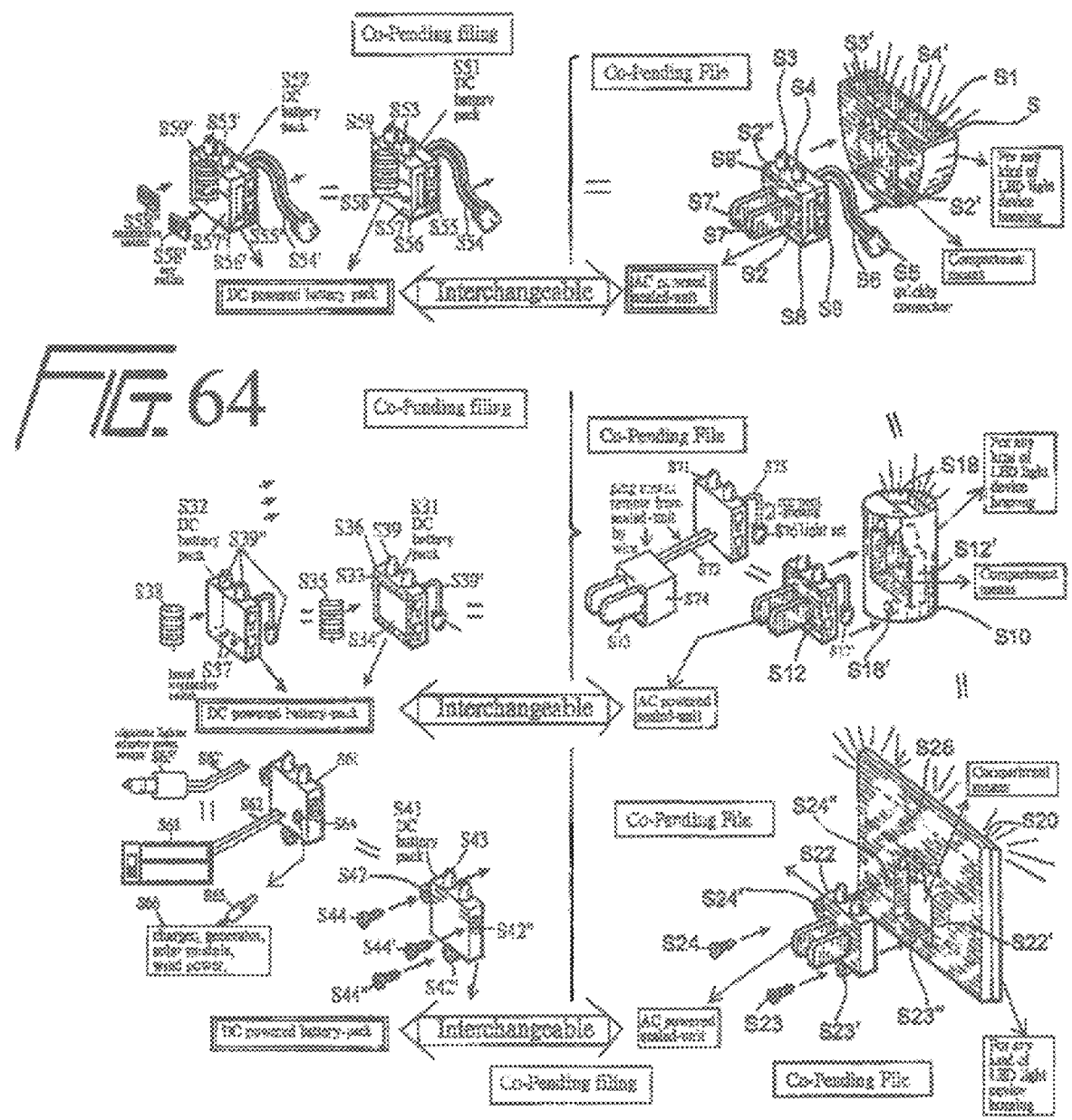

The each ring (13-10d) (14-11d) (15-12d) (15-12f) has joint-piece (15-12g) (15-12e) (14-11c) to join to different rings together and can change the angle from parallel or overlap position up to 180 degree so it can make 2 rings relation change from top-n-low to change to side-by-side, so the said indoor or outdoor application of LED or-and Laser project light has transformer features for reading light or torch light or hand held for indoor or outdoor use for different power source may be for (a) Direct plug-in FIGS. 39, 45, 4, 6 or-and
(b) DC powered as FIGS. 1, 2, 3, 11,12, or-and
(c) Interchangeable power source as FIGS. 56, 59, 64, or-and
(d) Wired light as FIGS. 39, 43, 45, 49, 50, 51, 53;

may selected from all the different power source which disclosure by current invention drawing, Figure, content, text, words, vocabulary, sentence, meanings. It is appreciated that all the concept, drawing, design, features, function, text, disclosure of above discussed all still fall within the current invention's claims and coverage.

From FIGS. 16, 17, 18, 19 show the LED light has plurality of moveable, replaceable, changeable project-assembly or kits to fit into housing pre-arranged circuit-holes From FIGS. 16, 17, 18, 19 disclosure preferred embodiment which has a ball housing (16a) has plurality of the pre-arranged circuit holes (16b), (16b"), (16b'''), (10') which can load the project-assemblies has functional kits hereof called real (17b') or same shape project-assembly but has no function kits hereof called fake (17b) into said holes to make the desire (a) Number of real project-means and Fake project-means (b) where need the project light beam or image from one housing LED or-and Laser project light (c).This is not same as the FIG. 8 which is one LED light has more than one housing and each housing has one projection light FIG. 8.

FIG. 17 show the real (17b') and Fake (17b) project-assembly which has its own LED, or/and display-unit (depend on want image or only light beam), and optics lens to make the said image or light beam project out from said Real or fake project assembly to a distance away from the LED light. The real and fake each project-assembly has certain assorted combination for color, brightness, image and each one can be movable, replaceable, changeable to others to fit into anyone of the said arranged circuit-holes which already has the electric contactors (17*e*) arranged and can allow LED's electric contactor (17*c*) to be connection and delivery the electric signal to said each real project-means to work as requirement.

Figure 18:
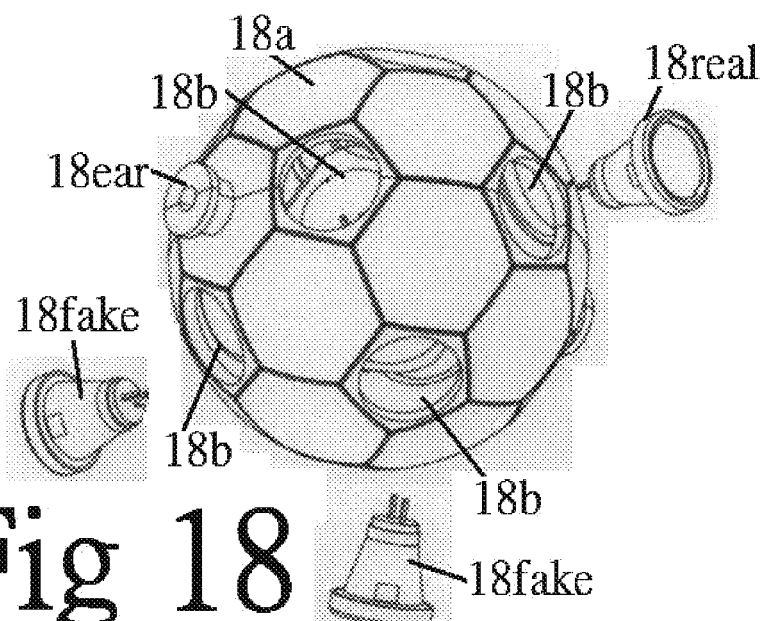

The FIG. 18 shown the pre-arranged circuit-holes (18*b*) can fit all same size, shape or universal real (18 real) or fake (18 fake) so can keep the good shape of the top ball housing, the preferred ball shape design is a soccer or football shape or any other shape which decide by market.

Figure 19:
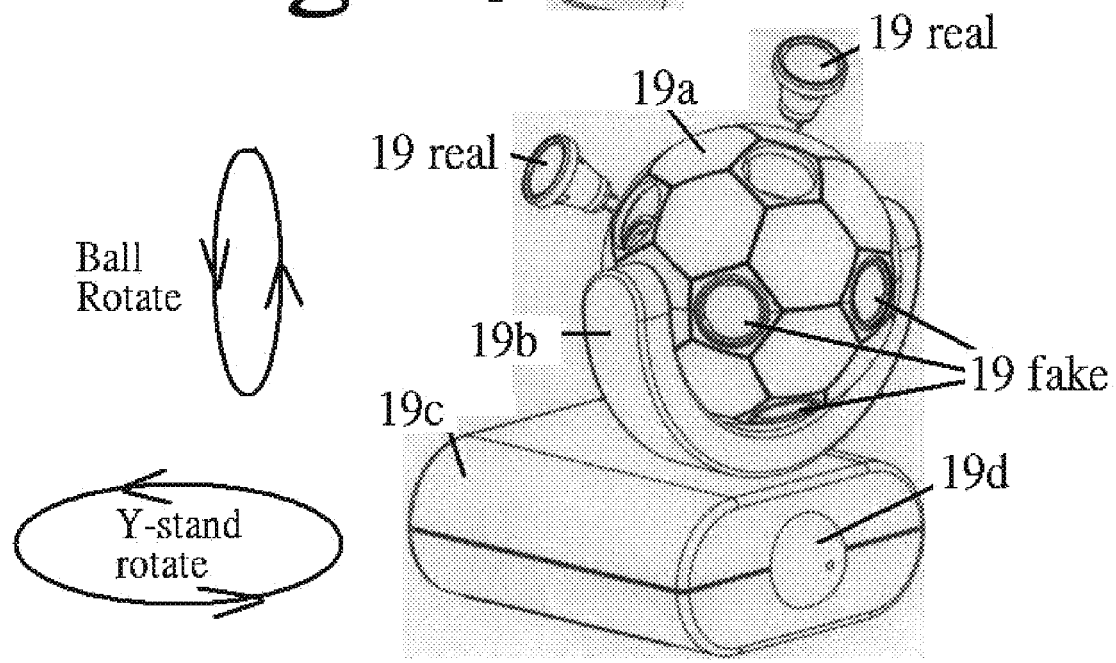

The FIG. 19 show the one of preferred for the (a) AC powered LED light has prong or plug-wire or (b) DC powered LED light has battery pack or USB wired or other energy storage-kits or (c) interchangeable power source for AC-sealed unit and DC-Power pack; for the preferred one LED light has movable, changeable, replaceable real and fake project-assemblies of the said LED image or light-beam or both of image & light-beams for different light performance of the said projection light.

From FIG. 20 LED or-and Laser projection light has plurality LEDs for more than one functions (1) projection (2) Build-in Night time use light, power fail light, emergency light, remote control light, blue tooth light or other function 2" light or more lights.

From FIG. 20 show the One LED light (20-50) has plurality of LEDs to has different functions for one LED light which has one LED to offer the project-light and bigger-image come out from the opening (20-5*d*), one LED of plurality of LEDs for night time use Light and the light beam or image or glow character come out from side-center-wall or center-section-housing (20-5*b*), other one LED located on base for power fail light (20-5*j*), other one LED located on base for remote control light (20-5J') (5*j'* of FIG. 5), other one LED located on base for Bluetooth light (20-5J") (5J" of FIG. 5) or any combination for $2^{nd}$, $3^{rd}$, $4^{th}$ different light function for different each LED and all build in one LED light, the preferred how many function needed depend on market requirement and the each different light functions has its relative circuit and control or sensor or switch means or IC means to make the functions same as predetermined.

From FIG. 20, the LED light (20-50) has the top portion (20-5*a*) for image or light-beam projection function and has project related 3 basic parts including LED and object/slide/film/display-unit and optics-lens and assembled within or fit with tube-assembly. The $2^{nd}$ LED as built-in Night Time use Light to illuminated the 360 degree of housing light's transmittable parts to viewer on location of middle part's wall (20-5*b*) which may only has light output or image glows or character lighted image which light beam are supplied by the said $2^{nd}$ LED of LED light (20-5*b*) and the control (20-5*e*) for variety selection from market available piece may on base housing (20-5*c*) and $2^{nd}$ control (20-50 can be also install on the base (20-5*c*) to connect with sensor means, power fail circuit, blue-tooth circuit, remote control circuit, infra-read circuit, wireless control circuit, timer circuit, Time delay circuit, IC in all kinds models, or other control circuit available from market place.

The base (20-5*c*) of the unit has the anti-skip pad (20-5*i*) and more LEDs (20-5*j*) (20-5j') (20-5*j"*) (20-5*j'''*) for base illumination has certain functions selected from any combination for night light, power fail light, motion sensor light, emergency light, Bluetooth light, remote control light, sound active light has such as color-changing, fade-in or fade-out, chasing, random, sequential, or other function from market available LED light functions.

Figure 21:
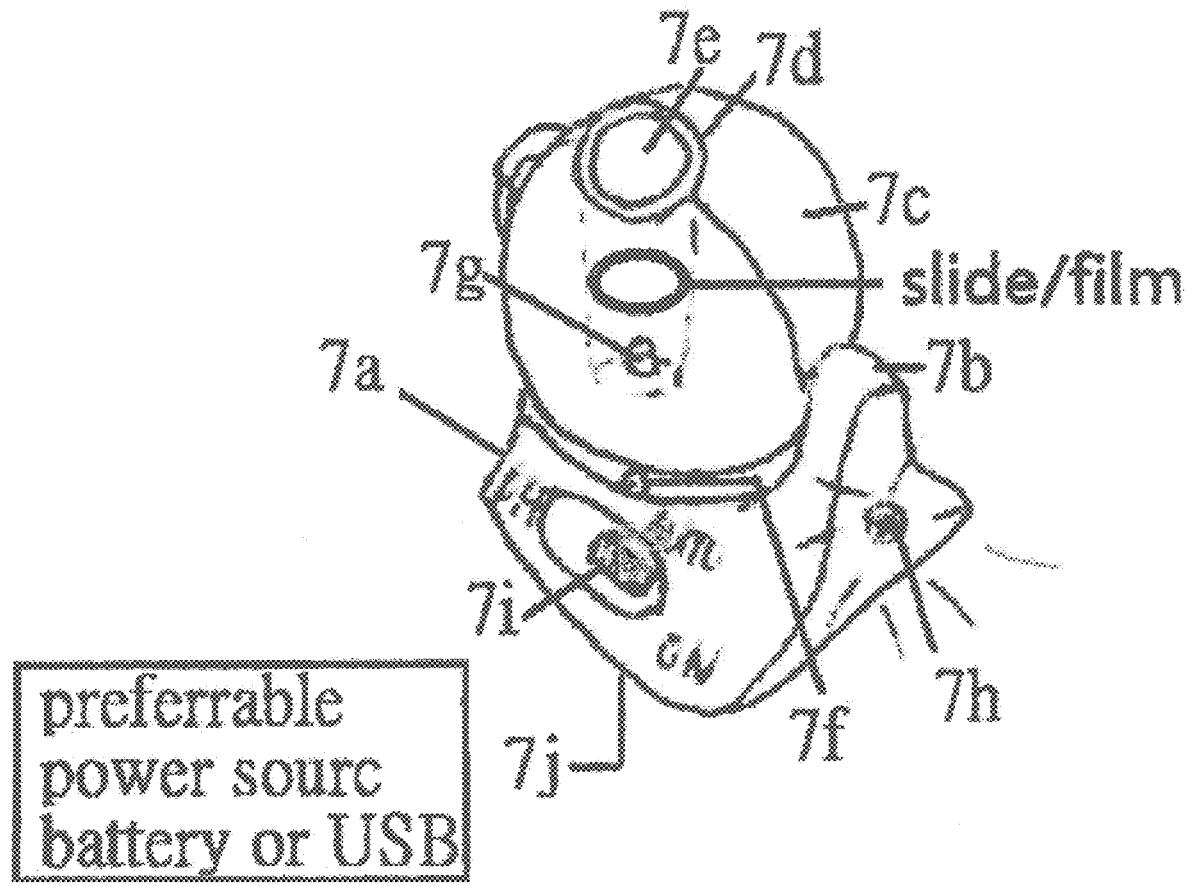

From FIG. 21, shown the similar function of the FIG. 20 preferred embodiment which has details for One of LED(s) (21-7*g*) as project light source on one end of the tube (21-7*d*) and top of the tube (21-7*d*) (7*d* of FIG. 7) has one optics-lens (21-7*e*) which offer the image magnify or refraction function to make the Tiny-Image of display-unit (not shown) to become super bigger-size image. The Housing (21-7*a*) has more LED (21-7*h*) (21-70 to offer other illumination for near-by area and not belong to the project-light because it only offer the near-by illumination which the light brightness of light beam is start from LED and spread out to nearby areas, not like project-light which are the light brightness or image is to be seen only on the far-away areas and not start from LED light source location.

The definition for current invention and meaning of (Emit light or Glow-Light) and (Project Light) as below:

1. (Emit Light or glow light)—Light been seen from light source location to nearby area and graduate darker and darker because light brightness is reverse radio of 2 times of distance. V.S.
2. project light that the light source emit light beam is not seem near the light source area, but it is passing though optics-lens and let people see image or light beam only ON far-away or remote-away distance so image or light beam be seen is not from Nearby areas.

Furthermore said (Emit or Glow or lighted) lack of the following than current invention including
(1) Light beam does not pass though Optics-lens such as Convex Lens or Concave lens or any combination of market optics-lens type
(2) Light do not get together to emit into anti-leakage tube or anti-leakage housing.
(3) Light beam majority is leakage out and even passing though some openings, holes, cutouts under PIN-HOLE IMAGING theory, the image is mess and not clear, bigger size of image will get more worse image presented.

So, the definition for (Emit or Glow or lighted) is totally different for (Project Light) on concept, physic theory, parts & Accessories, construction, image forming components, image quality . . . etc.

From FIG. 21 also show the control (21-7*i*) has multiple selections from OFF, Auto, ON different function basing on the inner circuit or other electric control-design, or IC to get each section with proper effects as pre-determined while designed.

From FIG. 21, the LED light (21-7*a*) has rotatable top ball housing while it rotated also make the said Optics-lens (21-7*e*) and tube-assembly (21-7*d*) rotated accordingly so can change image or light beam projection direction even the base (21-7*b*) (7*b* of FIG. 7) is not rotatable. However, the Earlier discussion how to make 3Dimensional space for image or light beam projection, so do not discuss again here. For light beam projection which means the light beam do not seen on the LED light unit. The lighted areas to be seen on the Remote-away or Distance-away areas only from the LED light unit. This definition is Projection which equivalent is (Throw-away) Image or (Throw-away) lighted-areas to distance-away areas, surface, locations, place same as co-inventor's (#QQ-10) U.S. Pat. No. 8,408,736 all details discussion, drawing, figure, embodiment, details description, text, skill, claims, construction should be still fall within the current invention scope and claims and not limited. The related of (#QQ-10) U.S. Pat. No. 8,408,736 drawing as below FIGS. 25 to 38 for variety single light-beam projection or multiple light beam projection with any type of electric functions which available from marketplace or/and functions are covered all above discussion.

Figure 22A:
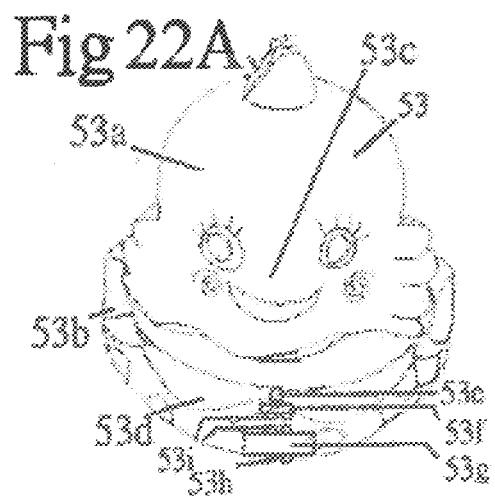
Figure 22B:
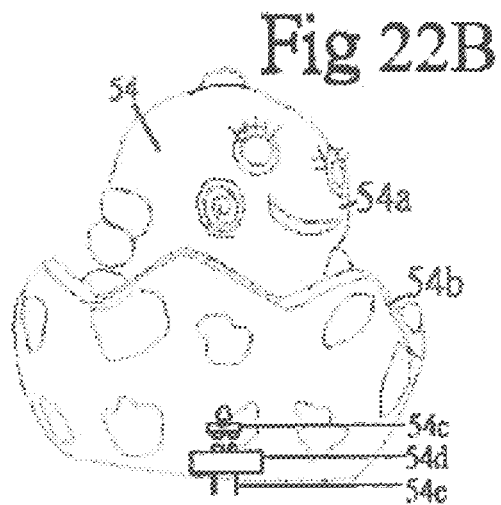
Figure 22C:
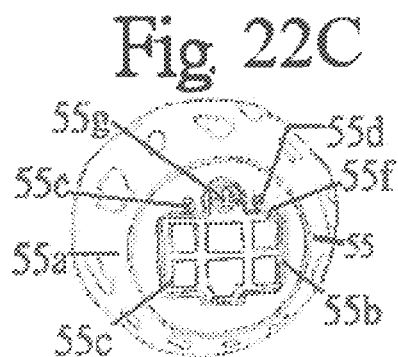
Figure 22D:
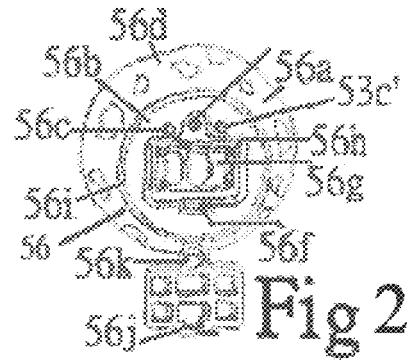
Figure 22E:
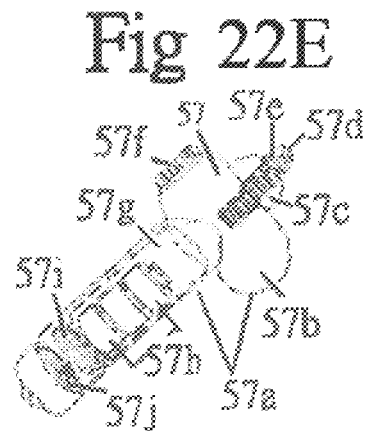
Figure 22F:
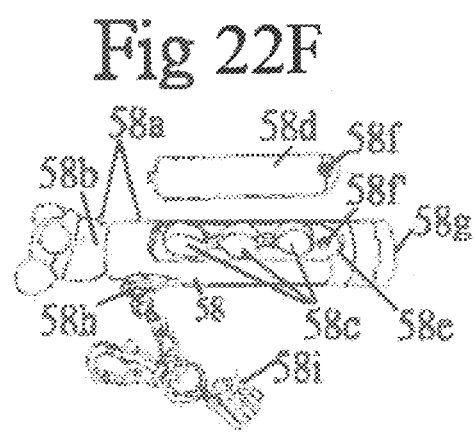

From FIGS. 22A, 22B. 22C, 22D, 22E, 22F show the desktop LED light has top toy or cartoon piece which is powered by compact battery pack or AC power pack with color changing functions controlled by IC as above discussion. From FIGS. 22A, 22B. 22C, 22D, 22E, 22F show the different DC powered FIG. 22A (22A-53g) or AC-powered FIG. 22B (22B-54e). The LED light FIG. 22A (22A-53e), FIG. 22B (22B-54c) has project function through top piece (not shown) or-and build-in 2nd light function for preferred toy top with soft construction for said variety indoor or outdoor lighting which may also has the co-inventor's interchangeable power source to change the power between the DC Battery Power pack FIG. 22A (22A-53g) and AC Sealed-unit with Prong mean FIG. 22B (22B-54e). The battery power pack FIG. 22C (23C-55b) design can make it very small FIG. 22D (22D-56h) with limited batteries power as FIG. 22D (22D-56g). The soft toy light incorporate with timer and/or IC circuit (not shown) for each trigger by sensor switch only on FIG. 22A (22A-53a) and FIG. 22B (22B-54a) so can make the whole preferred toy or other application such as outdoor lighting housing FIG. 22A (22A-53a) and FIG. 22B (22B-54a) be illuminated like FIG. 22A to FIG. 22D, the super compact battery pack FIG. 22A (22A-53g) used so the inner space been not occupied by bigger power pack so can use one LED FIG. 22A (22A-53e) and FIG. 22B (22B-54c) to make the whole housing FIG. 22A (22A-53a) and FIG. 22B (22B-54a) glow-up without see the some block-means' shadow inside and that areas become dark.

Figure 23:
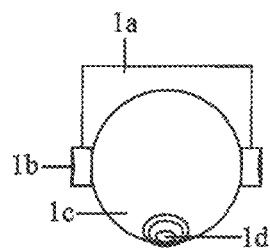
Figure 24:
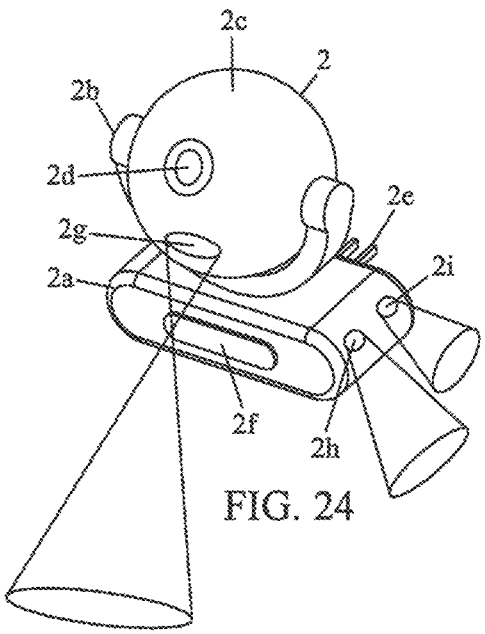

From FIGS. 23 to 38, The said LED or-and laser light housing has plurality of project-assembly to project plurality of image or-and light beams to plurality of areas. From FIGS. 23 to 38 and From FIGS. 23 to 26 show the details construction to
1. project the light beam or colorful image or both to far-away distance area(s) for illumination or project the said image or-and patterns, or;
2. offer regular light beam emit out from LED light location to near-by areas for illumination The FIG. 23 shown the preferred LED light top view, The FIG. 24 show the multiple LEDs and has its own function, purpose to make projection for far-away areas or emit light to nearby areas from one of LED light unit.

Figure 25:
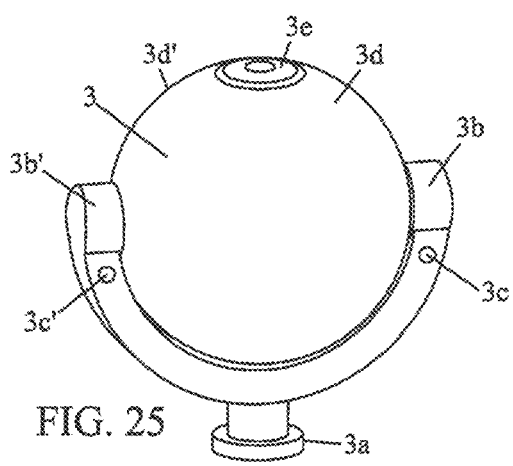

From FIG. 25 show how to make the top ball housing (25-3) to make rotating by two ears (25-3b) (25-3b') for top ball, and the frame (25-3c) (25-3c') rotating by neck (25-3a) so can make the image output-end of project-assembly also can rotate in 3 dimension to project image or light-beam to remote away distance.

The details construction of preferred projection function as above discussed so many times so not discuss again.

From FIG. 23 to FIG. 38 This is co-inventor prior art (#QQ-10) U.S. Pat. No. 8,408,736 which has all other details for this feature. From FIG. 26 can see the detail construction for the basic LED light has project function has the major parts including:
a. Tube-assembly which has LED-base or holder (26-43) with wall or edge surrounded to joint with top 2$^{nd}$ holder or tube or base for display-unit (26-40) and joint with top project refractive-lens (26-4n) which is above the top-tube-assembly or fit within the highest housing-opening (26-4i) (26-4i') with a refractive-lens cover to hold with the lower tube-assembly the highest tube or holder or base or tray.
b. LED(s) which install within the wall-surrounded tube-unit or tray or base or tray and other with other-units of tube-assembly or-and housing-parts to prevent light beam leakage out.
c. Object/Display-unit/Slide/Film or changeable digital data displayer or screen in all kind to fit into or install within the wall-surrounded tube-unit or tray or base or tray and other with other-units of tube-assembly or-and housing-parts to prevent light beam leakage out.
d. Magnify optic-lens which install on highest housing opening or above the top of the highest tube-unit of said tube-assembly, and has a lens-cover to hold or join with the said one tube-unit of tube-assembly or with the parts of housing with wall-surrounded to prevent light-beam leakage out.

With optional parts selected from

Option 1: housing opening for image output end

Option 2: Housing cutouts for change, replace, switch, install for object's disc, roller, holder Option 3: housing for any geometric-shape for all application for outdoor or indoors application LED or-and Laser light device.

Option 4: Circuit to drive LED to turn on and turn for DC powered LED light or AC powered LED light for indoor or outdoor applications with different conductive-metal-piece without or without wire.

Options 5: Control circuit such as remote control, infra-red, motion sensor, photo sensor, sensor circuit, power fail circuit, emergency light circuit, or switch.

Options 6: Other plastic, conductive, resilient conductive, electric parts & accessories.

Optiona 7: 2$^{nd}$ or 3$^{rd}$ or 4$^{th}$ functions circuit and kits.

Figure 27:
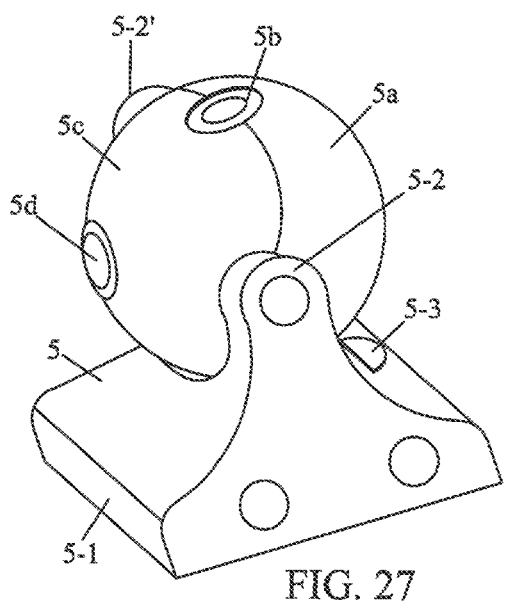
Figure 28:
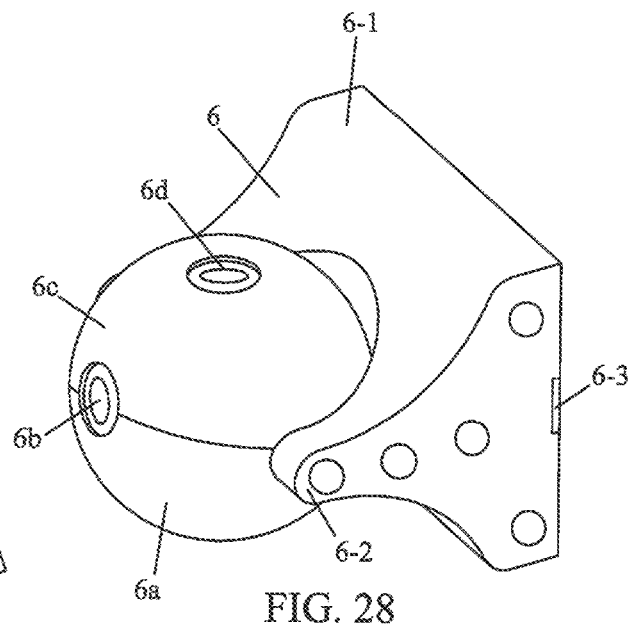
Figure 29:
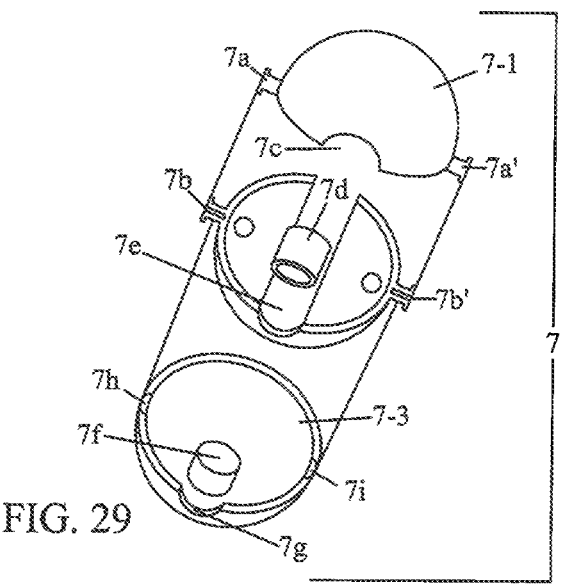

From FIGS. 27, 28, 29 disclosure the one DC or-and AC power LED or-and Laser light (27-5-1)(28-6-1) has at least one of the projection-assembly such as (27-5b) (27-5d) (28-6b) (28-6d) and one of the project-assembly (27-5b) (27-5d) (28-6b) (28-6d) can be moved to change relative position with the fixed project Light (27-5b) (27-5d) (28-6b) (28-6d) so the 2 of the projection light can has certain relative position or orientation for different application on different locations. The motion sensor LED light (27-5-1) (28-6-1) can have 1$^{st}$ one to act as fixed project-assembly (27-5b) (27-5d) (28-6b) (28-6d) aim to the front door entrance and set the 2$^{nd}$ one of project-assembly (27-5b) (27-5d) (28-6b) (28-6d) for the living room or dining room, so while people get into house on door-entry can see details of the door entry areas and it also can see details of the 2$^{nd}$ place including the living room or dining room or stair. So, this is very useful and practical for people have one light to make image or light-beam for more than one place for image or illumination.

Figure 26:
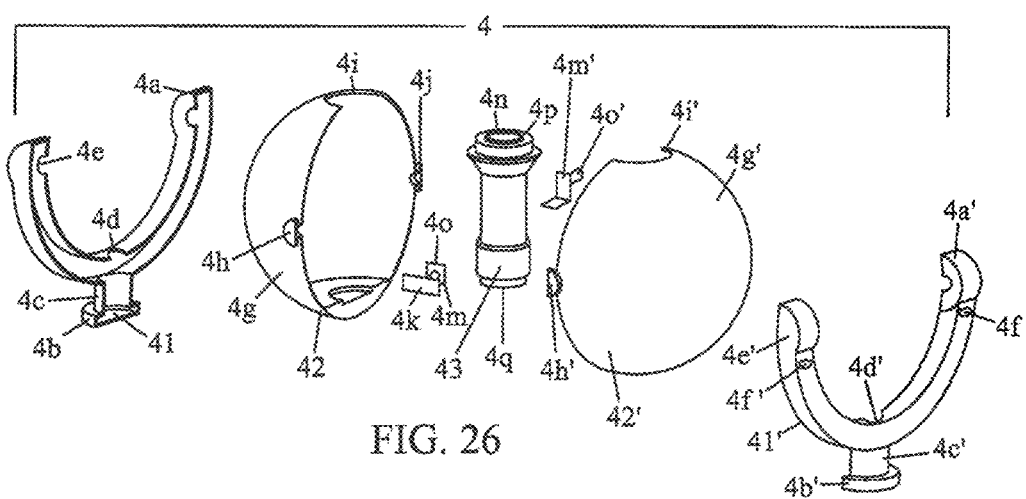

From FIGS. 25, 26 can see How to make the more than one of the project-assembly (27-5b+27-5d) (28-6b+28-6d) in one top-housing assembly (27-5)(28-6) and can change the each project-assembly (27-5b+27-5d) (28-6b+28-6d) relative position.

From FIGS. 27, 28 can see the plurality of LEDs on the base housing (27-5-1) (28-6-1) for all kind of light function as required including power fail, motion sensor, blue-tooth, infra-red, photo sensor, torch light, night light, twinkle star lighting . . . . As above discuss all kind more than one project-assembly in one LED or-and Laser project light, and more than one function.

From FIG. 29 the inner half-ball (29-7-2) has project-assembly (29-7d) well install and sealed by top half-ball (29-7-1) and rotatable by the 2 ears (29-7b) (29-7b'). The inner-half ball (29-7-2) has one arc-cutouts (29-7e) which allow the project-assembly (29-7d) to fit within and move forward or backward around 90 degree for each direction so can change the relative position of the said project-assembly (29-70 (7d) and (29-7d) (7f). The outside half-ball (29-7-3) (7-3) also assembled with the 2 ears (29-7b) (29-7b') so make a finished top-housing with 3 half-ball and 2 project-assembly.

From FIGS. 30, 30A, 30B, disclosure the LED light (30-8) has 3 project-assembly (30-8a) (30-8b) (30-8c) and only project-assembly (30-8a) is fixed on the housing (30-8-2) and the movable/changeable position project-assembly set (30-8b) (30-8c) has horizon moving arc around 90 degree for each directions so can have at least 3 positions, locations, areas been projected the images or light-beam. The LED light (30-8) also has plurality of other LEDs for make different light functions which may as above discussion all market available light functions with preferred control, sensor, switch device. The FIG. 30 shown the LED light (30-8) on the desktop and has image or light beam project to top and two horizon areas. The FIG. 30A shown the LED light hang, install, fix on the walls to has opposite wall and top ceiling and floor image or light-beam illumination. The FIG. 30B shown the LED light is fix, install on top ceiling or top of door to make image or light beam for Floor or walls illumination.

The FIG. 31 disclosure details construction how to make the 3 project-sets within one of top housing. The one project-assembly (31-9d) with preferred tube length so will not touch or blocked to other project sets (31-9b) (31-9c) and fit within the inner half-ball. The $2^{nd}$ and $3^{rd}$ project-set (31-9b) (31-9c) also fit within the inner half-ball and covered by the $2^{nd}$ and $3^{rd}$ half-ball (31-9-2) (31-9-2') where has the arc-cutouts (31-9-4) (31-9-4') to allow the project-set (31-9b) (31-9c) to change position while the move the inner-half ball. The 2 arc-cutout half-ball assembled with the frame (31-9-1) (31-9-1') by 2 ears (31-9-5) (31-9-5') (31-9-6) (31-9-6') with the base (31-9g) and the base has one more LED (9h) to emit light to the top ball housing for glow in the dark.

The said 3 project-set (31-9d) (31-9b) (31-9-2) (31-9c) can project image or light-beams for 3 locations so can make user to have one light for 3 areas illumination or image(s). Each project-set can have its own focus adjustment construction so can make the said image or light-beam projection has nice, clear, sharp, right size as requirement.

The unit can be powered by the DC or AC powered with desired control, switch, sensor kits to help to get desired functions.

From FIGS. 32 to 38 has very detail notes on each drawing to teach each feature, each control, switch, trigger device and preferred application, design.

Figure 32:
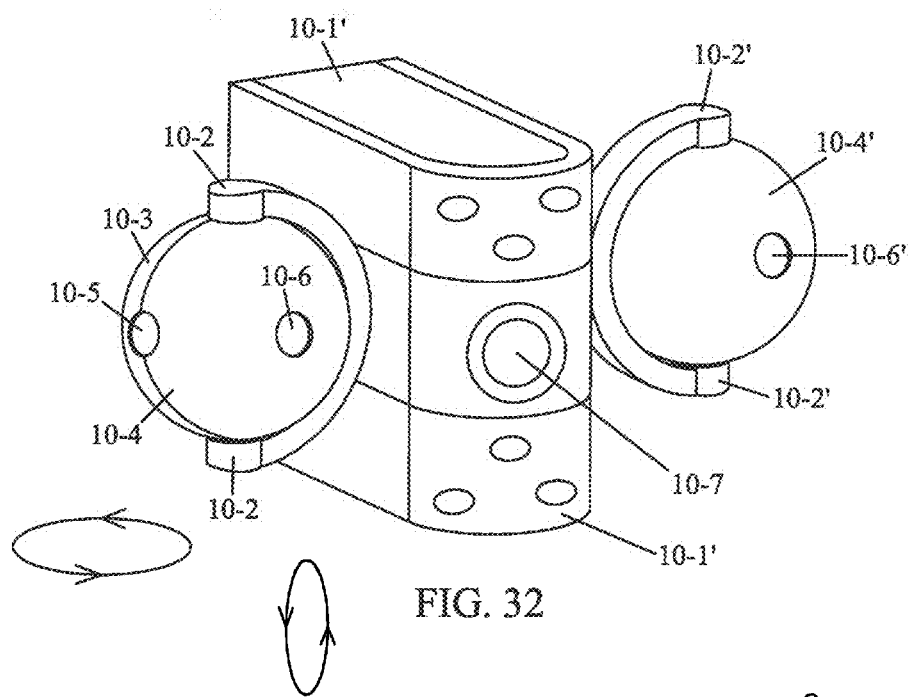

From FIG. 32 the power source can from any type available from marketplace. The sensor (32-10-7), control (32-10-7), switch (32-10-7), trigger means (32-10-7) can be any type available from market place to make the LEDs (On front of the surface which shown at least 6 LEDs) and each LED may has its own functions such as power fail, emergency light, night light, flashing light, infra-red light, blue-tooth light, Remote control light, motion sensor light. The project-set (32-10-5) (32-10-6) (32-10-5') (32-10-6') can also work for light source for Security light like Zenith company did while the LED inside the Project-sets use high power LED with super brightness.

Figure 33:
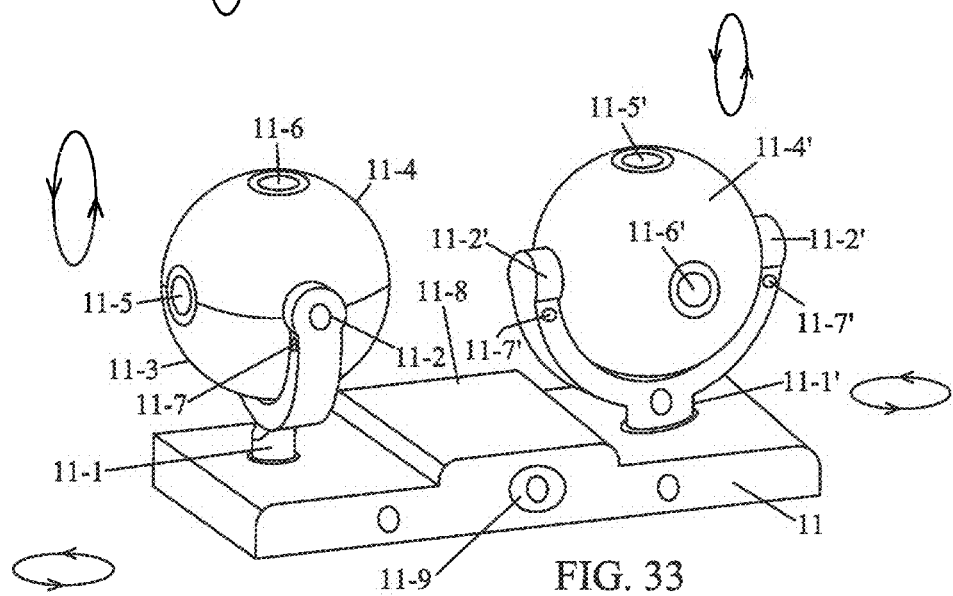
Figure 34A:
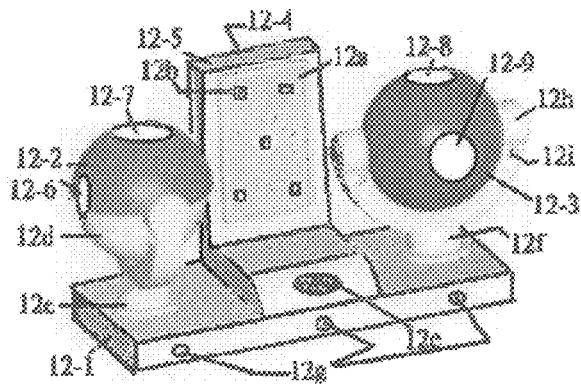
Figure 34B:
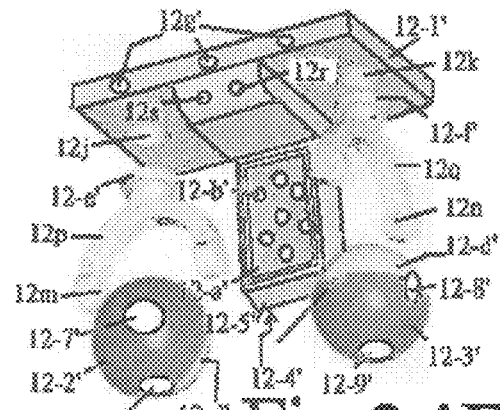
Figure 35:
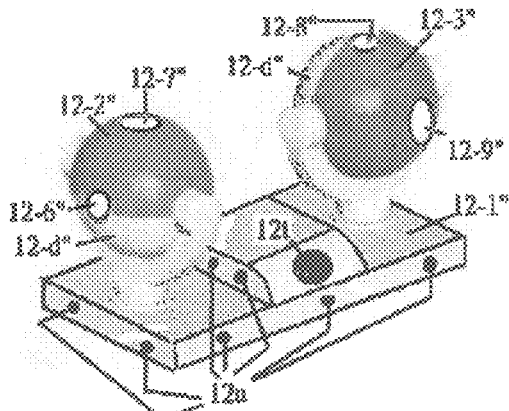

From FIG. 33 The same as FIG. 32

The difference for all these design and housing and installation location such as FIG. 32 design good for wall, fence, post, bar installation.

The FIG. 33 is good for surface top installation.

All other features same and offer people more than one project-assembly to make more than one (Actually this maybe more than 6 project light and 4 other LEDs for different functions lighting.

From FIG. 34A and FIG. 34B and FIG. 34C and FIG. 36 and FIG. 37 FIG. 38 all drawing teach the other design and housing construction for all possible or other functions as the brief notes on each drawing.

Figure 38:
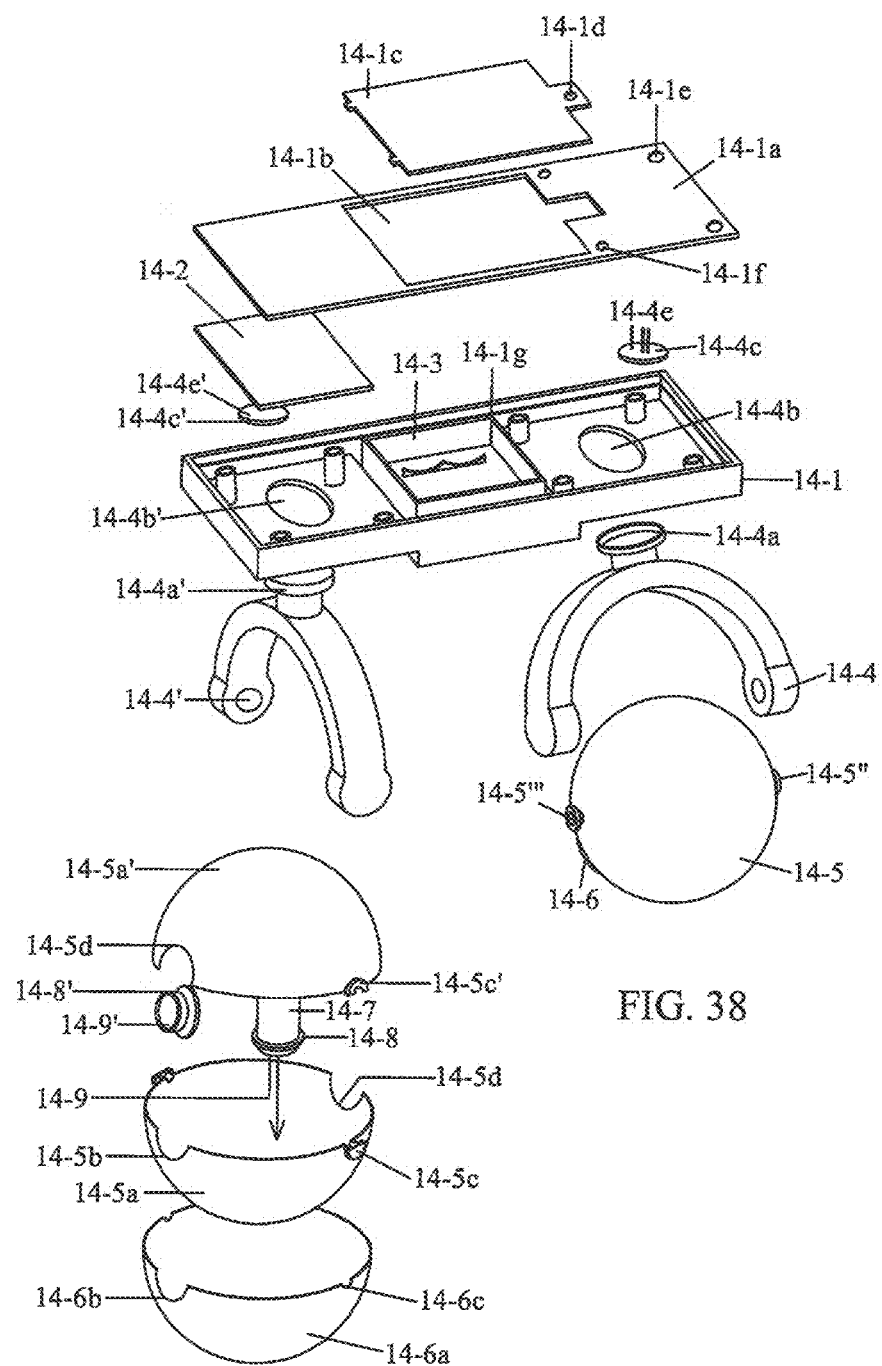

From FIG. 38 show the details construction for one of the DC or-and AC Power LED or-and Laser light has 2 ball housing (38-14-5a) (38-14-5a') and its own frame (38-14-4) (38-14-4') and neck (38-14-4a) (38-14-4a') and ball housing, frame, neck all can moveable or rotating. The Base (38-14-1) has all control, switch, sensor, remote control, wireless transmitter and receiving parts, blue-tooth, wifi connection to make the said LED or-and Laser light can has more than 4 project-assemblies and at any time has more than one (Actually is 4 project-assemblies) to make at least 4 locations has image or light-beams. This is more practically than the other any current light device. Not only more than one locations has image or light-beam but also has other LEDs or-and Laser for near-by areas for other functions or more than one functions LED or-and laser light for not only projection for indoor or outdoor application but also can work for other application for having more than one of light beam emit out from said light device on current invention unit.

From FIGS. 39 to 54 are the co-pending filing case (#II-Family) related including (#II-2) U.S. application Ser. No. 13/540,689 filed on Jul. 3, 2012. Publication data US 2012/026-8668 dated on Oct. 25, 2012, Now is U.S. Pat. No. 8,511,877 issued date Aug. 20, 2013 VS. Current invention U.S. application Ser. No. 12/866,832, Filed on Sep. 21, 2010, so the (#II-2) is still co-pending case, not prior-art; This is continuous in part of (#II-1) U.S. application Ser. No. 13/534,611 filed on Jun. 27, 2012, publication data US 2012/026-8947 dated on Oct. 25, 2012, now is U.S. Pat. No. 8,714,799 issued date May 6, 2014 VS. Current invention U.S. application Ser. No. 12/866,832, Filed on Sep. 21, 2010, so the (#II-1) is still co-pending case, not prior-art;

This is continuous in part of (#II-2009) U.S. application Ser. No. 12/624,621 filed on Nov. 24, 2009, publication data US2010/0214541 date Aug. 26, 2010, now is U.S. Pat. No. 8,303,150 Issued on Nov. 6, 2012 VS. Current invention U.S. application Ser. No. 12/866,832, Filed on Sep. 21, 2010, so the (#II-2009) is still co-pending case, not prior-art;

Same as above listed (#II-2009) (#II-1) (#II-2) issued date, here show these co-pending related drawing as above listed filed date, public-date, issued date VS. current invention to show LED or-and Laser project-assemblies or project-sets to use for outdoor projection lighting or-and seasonal projection light application including garden light, outdoor lighting, seasonal garden light, seasonal outdoor light, seasonal indoor light, Christmas lighting, light set for built-in or add-on construction.

From FIGS. 39 to 54 also show the different conductive metal-piece without wire or with wire to build the electric delivery from the power-source to LEE or-and Laser project light device as FIG. 39, FIG. 43, FIG. 45, FIG. 46, FIG. 48, FIGS. 49 to 54.

From FIG. 39 shown the Seasonal Light (I=10) has different power source (AC or-and DC power) and connectors (conductive-metal-piece with or without wire) for indoor or-and outdoor light application including (1) AC plug-wire (I-15) or-and Pig-tail wire-set (I=16) or-and USB wire-set (I-17) or other wires or other conductive-kits as FIGS. 49 to 54 show some of market available conductive-piece for all the said LED or-and laser light device for indoor or outdoor use or applications. Here preferred light is including a USB related-parts (I-17) or Pig-tail related parts, or AC Plug-wire for indoor or outdoor light applications for desired light shape or-and construction to connect with USB, or AC-or-and-DC, or AC power source such as from computer, USB wall power source, USB energy storage power unit, USB backup power unit or AC or-and DC wired power source to supply the electric power to said the one of preferred LED or-and Laser project light device here is a Tree top Lighting (I=10) which is belong to one of the seasonal lighting.

The other connect-kit or conductive metal piece without or with wire is a pigtail (I=16) mail-connector to connect with light-set's female pig-tail socket to get power from seasonal light set, or light string. Or other connector-kit or conductive-metal piece without or with wire such as wired-plug (I=15) to get power from outlets including wall outlets or the power strip's outlet or generator's outlets. The project-assemblies or project kits (I=11) (I=12) (I=13) is fit within all kind of indoor or outdoor the seasonal lighting (I=10) including tree-top lighting which has many different designs such as star (I=10), angel . . . etc. The power source can be selected from any type available at marketplace for AC or DC power source with proper connector to deliver power to the said project-assemblies or project kits (I=11) (I=12) (I=13).

From FIG. 40 shown the more than one project-assemblies or project kits (I=23) (I=25) (I=27) for one of the LED or-and Laser indoor or-and outdoor project light, here is a seasonal tree top (I=20) which has 3 different project bigger-size image to be seen as (I=24) (I=26) (I=28) which has different (1) greeting words or (2) art design or (3) seasonal drawing with full colorful or (4) changeable or moving or update digital data display to be magnified or refracted by optics-lens so let people enjoy the good bigger-size image shown on the top ceiling (I=24) or adjacent walls (I=26) (I=28) or opposite walls (not shown) or away from the tree location. Again, the power source for these projections treetop as the above discussed for many selections. The project-assemblies or project kits (I=23) (I=25) (I=27) (23) (25) (27) can be any number to add on the said seasonal lighting or seasonal items.

From FIG. 41 and FIG. 42 shown the different seasonal products has different construction has desired 3 or more bigger-size image been projected and shown on remote-away surface from one seasonal lighting (I=30) (I=40) which in a shape of Santa-clause which has the two arms (I=34) (I=35) has project-assemblies or project kits and top (I=32) has 3$^{rd}$ project-kits. The key for these FIG. 41 and FIG. 42 the current invention is not limited for the LED or-and Laser project indoor or-and outdoor light but also it has very industrial grade for outdoor environment or weather-protection products, It also can apply to all kind of Seasonal products, toy, decorative, common products which people use at certain time. The current invention just added the said project-kits or project-assembly for build-in or add-on into existing lighting or any products can upgrade the simple and traditional products into built-in bigger-image projection unit has good application and increase original product value.

From FIGS. 43, 44, 45, 46 show the different housing design or construction for outdoor or indoor LED or-and Laser project light for everyday applications including AC plug-wire garden light, or outdoor light to project one or more than one image or patterns on the said desired surfaces including ceiling or building or housing parts.

Figure 43:
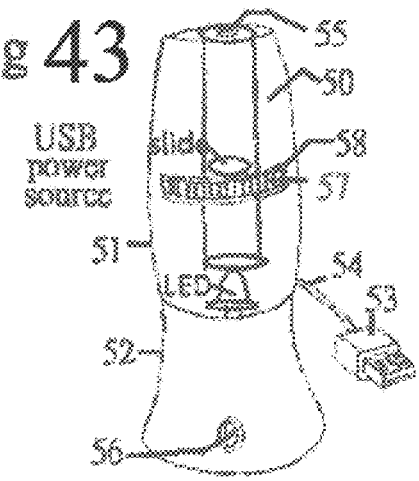

From FIG. 43 show the LED light (I=50) has changeable and replace the display-unit wheel (I=57) from the housing cutout (I=58) so can manual to change or replace the whole of the display-unit disc or change the said one of the display-unit (as object of the optics-theory) from plurality of the said display-unit of one the said disc. The display-unit disc which incorporate with top location's optics-lens to allow light-beam to pass through to form the bigger-size image. The LED light (I=50) has USB or AC-Plug-wire wired connector to get power from all kind of USB or AC-outlet device as above discussed. Also, The said LED light (I=50) has bigger-size image output-end (I=55) on top of LED light so the bigger-size image can at least project to the top ceiling or front of outdoor or indoor surface which is never can do by out-of-date Incandescent bulb (very hot heat flow to top and damage the top plastic film, slide, object, display-unit and no any possible can get while color light beam from filaments inside incandescent bulb).

if use current invention simple only one LED direct under of the said one tiny display-unit (Preferred is film or slide which made by Plastic) and pass though only one optics-lens has refractive property with properly tube-assemblies because heat always flow to top so current invention is never can use for out-of-date incandescent bulb at least has 4 Watt or 7 Watt bulb which the heat will melt the film or slid instantly or cause FIRED.

Figure 44:
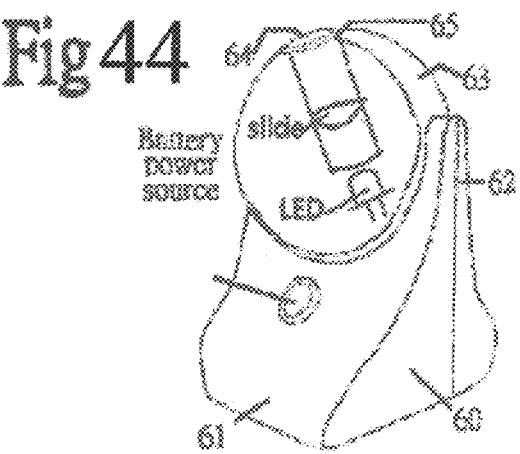

From FIG. 44 show the other preferred embodiment has battery powered, or outside transformer powered which has female-receiving port to let outside transformer's male plug and wire to insert to build the electric delivery.

Figure 45:
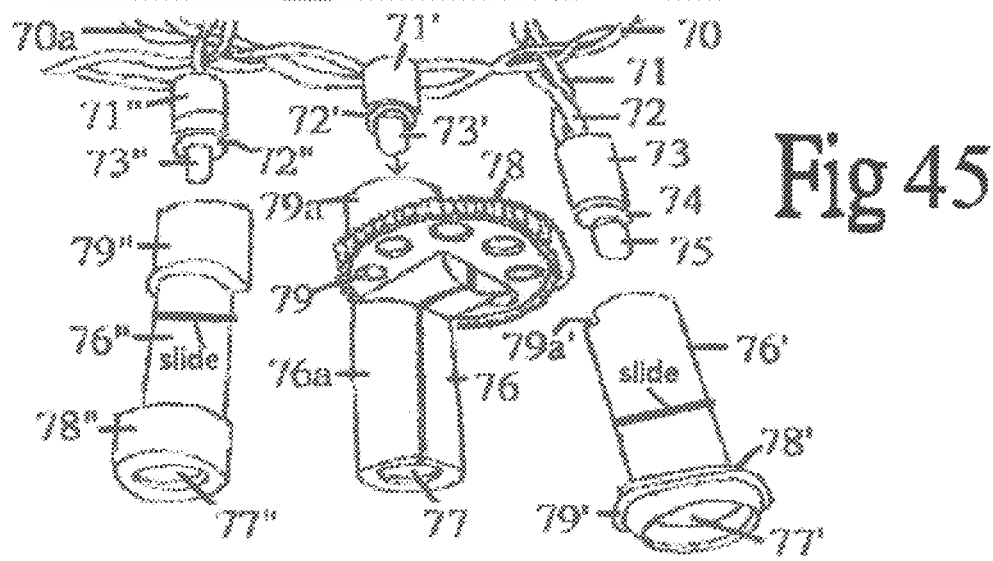
Figure 46:
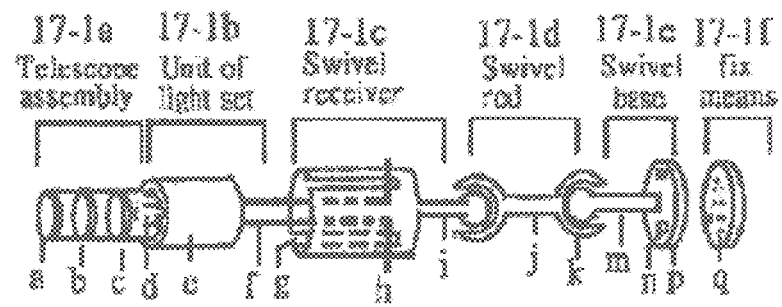

From FIG. 45 shown very clear for the project-assemblies construction is different with the said project-kits (I=76) (I=76') (I=76"), the project-kits has no built-in light-source as project-assembly has 3-basic-parts LED and display-unit and top refractive-lens. Hereafter, show all preferred project-kits for all kind of different construction or-and features to incorporate with all existing seasonal light device already has light-source(s), such as (1) Simple construction of project-kits (I=76') which may has no LED inside as light source and use the seasonal or other existing light-set's LED as light source so can make the light set (I=70) has number of bigger-size image or light beam to be projected and shown on the remote away area(s), location(s) from the existing seasonal lighting or other any market available light sets (I=70). This is typical for project-kits which do not has its own light source. The said project-assembly has 3 basic-parts including its own light source such as LED or-and Laser light source and display-unit(s) and top project-lens incorporate with wall surrounding tube-assembly or trays or holders to prevent from light-source(s) light-beam leakage out from tube-assembly or trays or holders. or (2) the upgrade project-kits (I=76) which has changeable display-unit(s) (I=78) and can change image while moved the wheel (I=78) so the display-unit (I=78) been changed and image can changed from time to time and the said tube-assembly is assembled from more than one parts (I=76*a*) (I=79*a*) to allow light source (I=72') insert-into and fit the front refractive-lens (now shown) tighly on toppest-location (I=77) of project-kits. or (3) more optics-element(s) of the project-kits (I=76") where inside the more than one piece of the said tube-like assemblies (I=78") (I=76") (I=79") has more than one optics-element(s) to make the better light beam spread from narrow emitting-angle white or multiple colors LED light-beam become all parallel light beams into the display-unit(s) and go through the top refractive-lens to create a big image come out on every points is same brightness with visible see darker or dim or brighter difference while compare the brightness from center to edge, or (4) The angle or further focus adjustable project-kits from FIG. 46 (I=17-1*a*) show the swivel arm (I=17-1*c*) (I=17-1*d*) (I=17-1*e*) (I=17-1*f*) to connect with light kits set and the fix-kit(s) for added on type of project-means.

From FIG. 45 show these preferred embodiment of the application for existing all kind of LED light set (I=70) or light string (I=70)) already has light-source(s) can has either (A) permanent fixed which built-in by manufacture or (B) Do-it yourself which is add-on by consumer; so the non-image or non-patterned existing seasonal light string or light-set or patio-light can add the image or patterns for non-art's light beam projection features on these seasonal light-set (I=70) or light string (I=70) or any lighting device from market place which has its own light-source functions and the current invention add the project-kits without the light-source (I=76*a*) (I=76*a*') (I=76*a*") so make the original or existing products become more value and increase bigger-size image projection features. However, The project-assembly has all 3 basic-parts including light-source and display-unit and refractive-lens can fit into any preferred housing for all indoor or outdoor seasonal lighting, seasonal garden light, outdoor lighting, outdoor garden light, outdoor patio-light, café-light, light-string which all has the project-assembly as above discussed all FIGS. (before FIG. 45) and those are not the same as FIG. 45 disclosure for project-kits.

Figure 47:
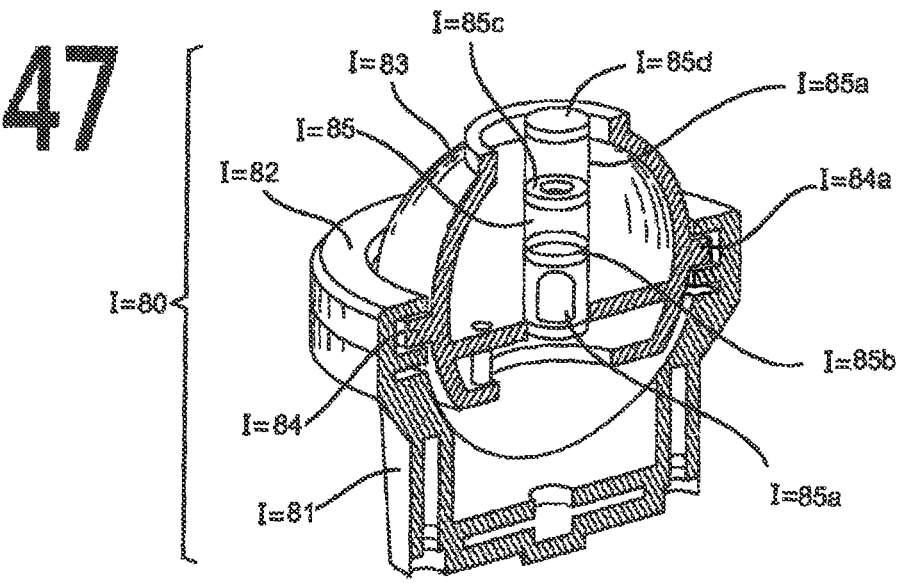
Figure 48:
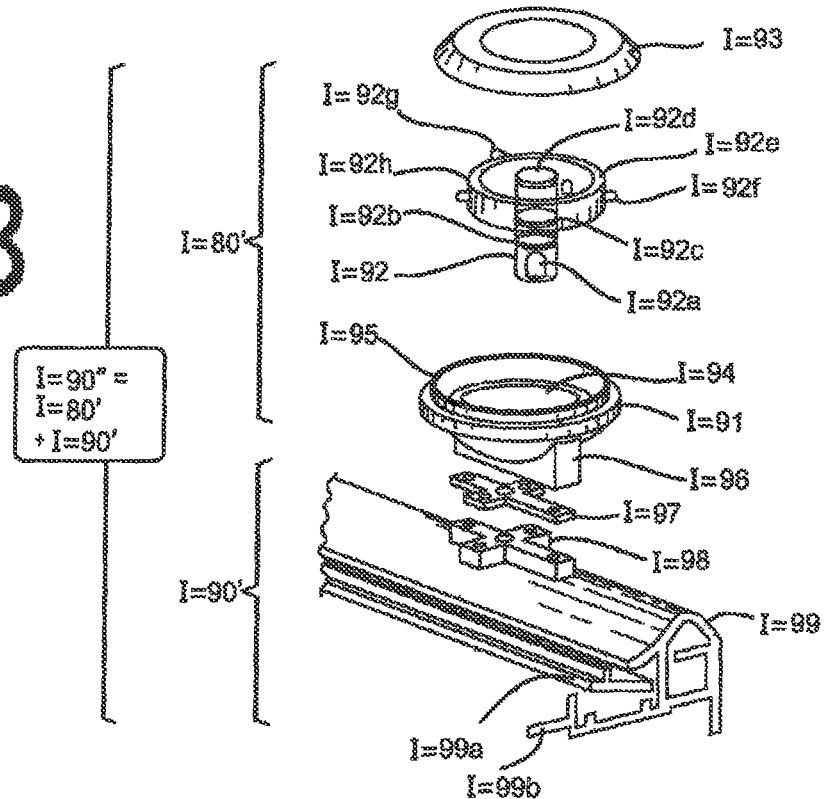

From FIG. 47 and FIG. 48 show basic project light construction and further application for other LED light device such as track-lighting application and all has the basic project-assembly which has 3 basic-parts light source and display-unit and refractive-lens not like FIG. 45 for project-kits.

From FIG. 47 shown the another preferred embodiment has 3 basic parts of project-assembly for LED image projection light (I=80) in different construction has a base (I=81) and base has one groove (I=84*a*) or ditch (I=84*a*) or tunnel (I=84*a*) to allow two arms (I=84) to freely rotating and tilt angle because the top housing (I=83) is round so can tilt along the two arms (I=84) for certain degree. The top housing (I=83) are install on the base housing (I=81) and all circuit and control-kits and electric parts & accessories fit within the space between the top and base. The project-assembly has LED (I=85*a*) install into lower-end of tube-like assemblies (I=85*a*) and light beam passing though the optional $1^{st}$ optics-lens (I=85*b*) to make the narrow emitting-angle or spot LED light beam to spread out to all parallel light beam to hit the display-unit (I-85*c*) and lighted the colorful tiny-image on the display-unit (I=85*c*) and tiny lighted image of display-unit passing though the top optics-lens (I=85*d*) which has refraction optics-properties and has details, precisely, accurate distance relation with the said display-unit(s) so can project the clear, sharp focus, enough bigger-size image to shown a certain distance such as 3 to 18 feet top ceiling or building or housing to be seen with nice and clear and bright and enough big image to viewer.

This is the typical upgrade model than basic project kits because add one more $1^{st}$ optics-lens between the display-unit and LED light source. In order to save the cost, the $1^{st}$ optics-lens is no need to add for some applications discussed on above. However, (1) The number of optics-lens used for current invention or
(2) what type of optics-lens assembly or
(3) What kind of LED
(4) What kind of Display-unit
(5) What kind of tube-assemblies These 5 "what" specification for 3 basic-parts of the project-assembly need to use or need to apply to the current invention, that is depend on what requirement from market-place.

(A) For example, some requirement need super brightness so can see the image under daytime indoor, that will need use super brightness or high-power LED or LEDs.
(B) For example, the requirement needs super fine image so need use Kodak film or good TFT screen or excellent L-cos reflective lens assembly to make the high quality of the display-unit so can project good quality image.
(C) For some requirement need super compact size so need to use shorter tube-like assemblies for more than one tube, tray, holder with wall surrounded, and redesign lens and display-unit distance to get shorter tube-means but still project nice image. So, any requirement will make the little change for add or reduce or change some parts & accessories, Whenever project light had the LED, Display-unit, Optics lens, and the tube-like assemblies, these (3) basic parts and the tube-like assembly to assembled into desired geometric housing to project bigger-size image should fall within the current invention. And more parts such as (a) adjust device so can change project image or
(b) more than one of light-beam or other more than one function, or
(c) more than one LEDs or-and laser light source(s), or
(d) more than one bigger-size image projected out with different or same size(s), or
(e) one product has more than one housing, or
(f) has more than one control circuit, and
all above discussed embodiment and co-inventor issued or pending filing features, still should be all fall within the current invention scope for Plug-In AC outlet or DC power unit.

From FIG. 48, this is other alternative application for LED track-light device (this is similar with co-inventor's prior art U.S. Pat. Nos. 7,726,839, 7,722,230, 7,726,841, 7,726,869, 8,393,755 for LED track light device) which the said movable LED unit(s) (I=91) (91 of FIG. 9) has the project-kits (I=92*a* to I=92*h*) well install on the movable LED-unit housing (I=91) and has its circuit (I=97) and the electric conductive (I=98) for build electric delivery for LED-unit (I=91) to track-unit (I=99) electrodes (I=99*a* and I=99*b*). The project-assembly has LED (I=92*a*) connect with the circuit (I=97) to turn on the LED (I=92*a*) and LED light beam emit to the $1^{st}$ optics-lens (I=92*b*) and display-unit (I=92*c*),then magnified and refracted by top optics lens (I=92*g*) which is on top end of the tube-like means (I=92) low-end has LED (I=92*a*) and top end has Optics lens (I=92*g*) so can project the enlarge, clear, sharp focus, colorful image. The said the LED-unit (I=91) could movable along the whole length of the track means (I=90). This is typical other application to add the Project-means or kits into existing standard LED track light LED-unit so increase LED Track light for home, office, show, shop, chain stores has image or words shown on the floor, ceiling, walls, sign, screen, cinema to increase value of the said LED Track light. This is other evidence the current invention for Project-kits can add-on or built-in for any market existing lighting device so can make the said original or existing lighting device upgrade to keep (1) original function+(2) upgrade to has add-on or built-in bigger-image projection light which is made by the compact-size projection-kits as this embodiment and FIG. 39 to FIG. 46 show same drawing of co-pending parents filed case which has same as (#II-2009) (#II-1) (#II-2) text and claims for indoor or outdoor light, seasonal garden light, everyday outdoor light, seasonal light or light sets and this LED track light applications all has the project-assembly with special arrange for LEDs, display-unit, and located on top of housing opening refractive-lens.

From FIG. 49 to FIG. 54 show different power source such as FIG. 49 is a battery power pack with quickly connector (I=10-2) to export the electric current.

The FIG. 50 show the bottom cells (I-11-2) batteries compartments with the pig-tail connector (I=11-4) to supply the power out.

The FIG. 51 show the outlets of the power strips (I=13-3).

The FIG. 53 shown the AC-Plug-wire which connect with the seasonal lighting for indoor or outdoor variety light including garden light or outdoor light applications or seasonal light-sets to any kind of outlets to delivery power to the said indoor or outdoor light device. The AC-plug wire can be traditional AC-Plug-wire with or without the linkable-receiving-ports (I=14-4) (I=14-4') for linking other male-plugs same as Plug (I-14-6) to next AC-plug wire system. It also can be the AC-to-DC transformer with wire (not shown) which change the AC current into DC current and deliver the power to said indoor or outdoor lighting.

The FIG. 54 show the pig-tale mail connector (I=15-4) and female socket (I=15-1) to make electric connection by the 2 metal conductive piece (I=15-6) so can supply the power from light sets to the male connector loaded products or project-assembly or project-kits for illumination.

From FIG. 55 shown LED or-and laser project indoor or outdoor light project the image has changeable, moving, motion, movie, video functions from the update digital data screen or display of LCD, TFT, Screen of Digital data displayer, wireless transmitting device and its displayer.

From FIG. 55 shown the details construction to project the bigger-size image such as changeable time-images which is always changeable, moving, motion at any time. The said time image mainly has 2 types (1) one is analog dial face or (2) digital number such as (88:88) both need to project from the screen, or displayer for these seconds changing digital data. The digital data may come from different source such as (1) Camera
(2) Video Camera
(3) Communication equipment such as smart phones camera
(4) Internet or wireless transmitting to get image
(5) IC has digital data
(6) Wireless download
(7) Computer related equipment
(8) Communication equipment
(9) Consumer electric equipment;
which may have below arrangement;
(A) directly connect with display/screen system, or
(B) storage into digital data storage device(s), or
(C) input from Memory storage unit(s) incorporate with optic-lens assembly to show the display/screen unit(s) which including
(I) LCD display
(II) TFT displayer
(III) L-cos display
depend on the detail pixel/particles density, cost, image quality, color finesse to make proper combination.

From FIG. 55 show the project-assembly which has 3 basic-parts including its own light source and display-unit and refractive-lens not like the project-kits which do not has own light source, and incorporate with tube-assemblies has the multiple section of the tube-like assemblies (I=19-1) including lower-tubes (I=19-2) p-tube (I=19-15) or-and center display-unit holder (I=19-7) or-and holders (I=19-12) or tray (I=19-4) which lower-tube (I=19-2) has lower-end for light-source insert-into so the LED or-and Laser light beam to emit into, the top end is a substrate or base (I=19-3) has walls or fence (I=19-4 to hold and allow well install the displayer or screen (I=19-7) within the walls (I=19-4) so no deviation, or movement happened for the said displayer or screen of the said digital-data will present within. The said wall or fence (I=19-4) which also for join-function tightly with the top tray (I=19-7) so the light-beam will not leakage from light-source to the top display-unit. The said Digital-data displayer or screen may variety choice for colorful, finesse, pixel, particle density. However, the current invention preferred to use the simple and low-cost LCD display has time displayer for application. The time shown on LCD displayer or screen (I=19-$a$) has plurality of the signal wires (I=19-13) to deliver the digital-data into displayer (I=19$a$) so can show the changeable, moving, update changeable digital-data including second, minutes, hours, date, weather, temperature, humility or other combination as market required. The changeable, moving, update changeable digital-data shown on the screen or displayer (I=19$a$) and then, the lower white LED light beam hit the digital-data displayer or screen (I=19$a$), so the changeable digital-data image will be lighted and go through the top section of tube-like top-tube (I=19-15) and pass tough the above the top of the top-tube (I=19-16) optics-lens (I=19-17) and magnify or refracted to become bigger-size image to project out from image output-end where is located on above the top tube-like top-tube (I=19-16).

The key points for Lower tube-like lower-tube (I=19-2) its square base (I=19-3) and top tube-like top-tube (I=19-15) its square substrate or base (I=19-14) both has to be very tightly get together to prevent from any LED light beam be leakage. Also, the image of the said displayer or Screen (I=19-7) has to on right position (I=19$a$) so all the LED light beam will hit very accurate and precisely to show all image of displayer or screen (I=19-7). Even, the tube-like has 3 sections (I=19-A) (I=19-B) (I=19-C) but all the light beam traveling to passing the display-unit (screen or displayer), optic-lens, the light beam always is perpendicular or vertical with the LED light beam so can get best bigger-image with low-cost, no deviation for image ratio which happen always for the image parallel to the LED light beam.

Furthermore, the said the LED (not shown) may need have some optics-lens or lens assembly between the (LED and displayer) so make the all LED light beam is very evenly emit on the anywhere of the area of the said displayer or screen so digital-data can clear and no any darker or brighter area show out.

Also, the LED light beam need to match the screen or displayer properties so the image shown out will not be strange color, brightness.

While use the high-power LED which up from 1 Watt to N-Watt which also need consider the heat issues with preferred heat-sink or ventilation.

From FIG. 56 to FIG. 59 show LED project light has slide changeable, adjust image position, angle, orientation, plurality of slide disc for Plug-In AC outlet or DC power or interchangeable power source.

From FIGS. 56 to 59 and FIGS. 60 to 64 show all features discussed on above for

LED or-and laser project light has slide or grating-piece or film changeable, adjust image position, angle, orientation, plurality of slide or garting-piece or optics-lens fit-into disc for (1) Plug-In (AC powered) or (2) DC power or (3) interchangeable power source, More details can see co-inventor's (#FF-4) U.S. application Ser. No. 14/968,862, Filed on Dec. 14, 2015 which is Continue in Part of
(#FF-3) U.S. application Ser. No. 14/539,267, Filed on Nov. 12, 2014 which is Continue in Part of
(#FF-2) U.S. application Ser. No. 14/275,184, Filed on May 12, 2014 which is CIP for filing of
(#FF-1) U.S. Application Ser. No. 12/914,584 filed on Oct. 28, 2010 now is U.S. Pat. No. 8,721,160 which is CIP for filing of
(#FF-2008) US Application Ser. No. 12/318,470 filed on Dec. 30, 2008 now abandoned, which is Division for filing of which is Division for filing of
(#Q-2007) U.S. Application Ser. No. 11-806,284 Filed on Dec. 15, 2007 now is U.S. Pat. No. 7,630,004.

From FIG. 64=all features discussed on above for LED project light has (1) Plug-In by prong, or by AC-plug-wire, or by AC-connector-wire, or other; or-and (2) DC power; or-and (3) interchangeable power source.

Figure 65:
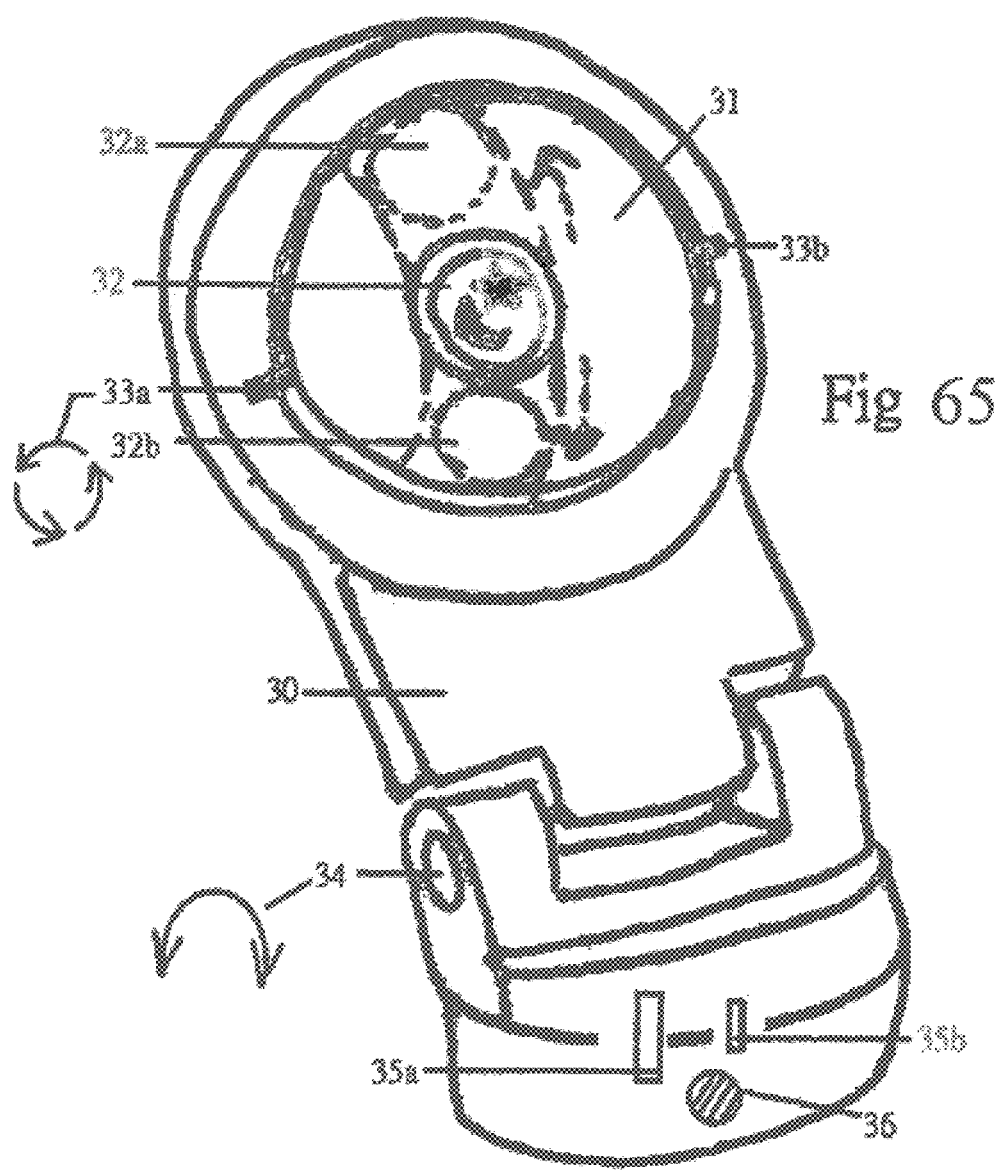

From FIG. 65 show disclosure the plug-in AC outlet night time use light by prong or AC-plug-wire LED light (C=30) has movable project-assembly from location (C=32) can move to top location (C=32a) or lower position (C=32b), This is similar with the other co-inventor's patent filed case as above listed. The difference is the LED light, total has three major parts (C=33a) (C=34) can make the movable, rotate, bend to change the bigger-image (not shown) location, position, orientation so can make the bigger-image shown to anywhere as requirement. The three major parts including (a) project-kits (C=32) which has tiny-image within the tube can movable along arc-cutout.
(b) Ball Housing (C=31) can rotate by 2 ears pole (33a) (33b).
(c) Ball holder (C=30) can bend by rivet (34).

It is appreciated all kind of skill, method, construction, combination to make the housing parts, project-kits to make move, rotate, bend, twist, transforming to make the Bigger-image or light beam to present to far-away distanced locations, positions, orientations still fall within the current invention scope for LED light has projection features.

Figure 66:
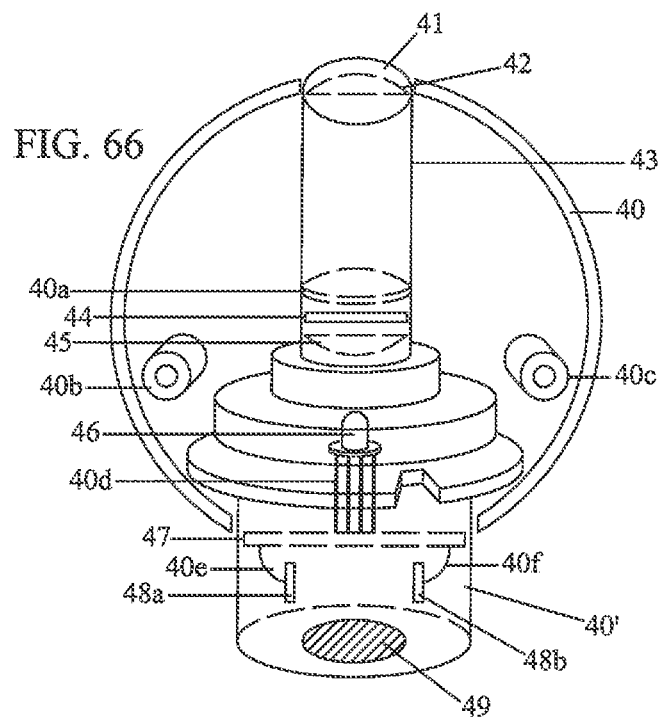

From FIG. 66 show the other embodiment which also belong to basic model LED light has prong or alternative AC-plug-wire (C=48a) (C=48a') to allow directly plug-in AC outlets including wall outlets or power strip's outlets or any other outlets which delivery the AC current should be fall within the current definition for outlets. The prong (C=48a)(C=48a') connect with AC power source and connect with the LED light circuit (C=47) by conductive wire (C=40e) (C=40f) to deliver the power to circuit (C=47) and circuit (C=47) has its electric parts & accessories to make pre-determined control, sensor, motion sensor, blue-tooth, wi-fi, wireless functions as market required. The circuit also connect with one LED (C=46) which is insert-into the one end of the lower-tube assemblies (C=40a) and LED light beam emit into the lower-tube (C=40a) to make the inner display-unit (C=44) tiny-image been lighted and the lighted tiny-image been passing though the top optics-lens (C=41) which located above top-of-the top-tube for the opening-of-housing to make the tiny-image be magnify or refracted to bigger-size image or light beam (While the Slide or Film has no tiny-image on it, It will be just a light beam to passing though and become a bigger-Light beam instead of Bigger-size image).

The said optional choice of the said $2^{nd}$ Optics-lens (C=45) which fit into the lower-tube main purpose is work to make the narrow emit-angle and spot-light (Light center is super bright and area is darker) to become the same brightness and parallel emitting forwarder/surface light beam. This means the $2^{nd}$ optics-lens can make the narrow spotlight beam to become a lot of light beam each are parallel to each other, and, also from narrow viewing angle to wider Area or wider surface light source).

The LED has other parts can incorporate including (1) Ball Housing to load the project-kits and related parts (2) Base to has conductive-metal-piece without wire include prong or AC-plug-wire (3) Ball housing in a 2 half-ball or sphere-balls construction so can easily install all parts as FIG. 66. Then, use screw or other fasten or holder mean to make a full ball.

Figure 67:
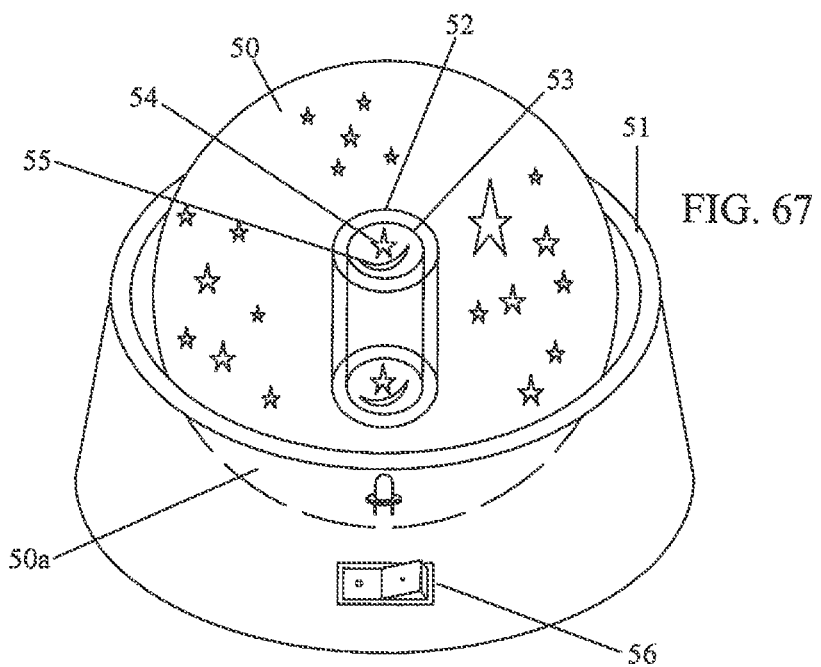

From FIG. 67 show the similar of FIG. 66 show the project-assembly (C=52) is install on the center of a sphere (C=50) or ball (C=50) or half-ball (C=50) substrate or cover to project bigger-size image to be seen. Not only the LED has the Bigger-image projection features (C=52) but also has the $2^{nd}$ light function on sphere cover or ball cover or half-ball cover which may selected by night time use light, tap light, pin-holes imaging tap light, Pin-Hole images light which has built-in other LED (located on center of base) to make the said Sphere, ball, half-ball (1) to lighted front piece has pin-holes, cartoon, arts and Glow them, or (2) the inner LED light beams passing through piece having a lot of pin-holes, opening, shaped holes, arts, design to emit the shaped bigger-image to the all surround walls+ceiling. The device is preferred to install on the desk beside the kid bed. The more than one function LED light (project light or-and night time use light or pin-hole, art night time use light) made by non-textile or wooden or garments and not for people to hold it to prevent kids allergy for the textile, garment, wooden, weaving material which too easily to accumulate the dust, ash, bugs. So, the current invention for more than one function LED punk or night light is very practically and has manual switch to allow people (1) Directly to turn on and turn off (directly means=People touched the switch directly),
(2) In directly to push or touch the top sphere or ball or half-ball cover to turn on and turn off (The indirectly means=People do really to touch the switch (C=56) but touch/push other housing parts to make the switch to activated),
(3) Remote control or wireless control or wifi or blue-tooth or remote control or motion sensor,
(4) Incorporate with Integrated IC and timer or time-delay to make the light can turn on and turn off and automatically countdown a period time to turn off.

All switch (C=56) and control means can be any market available types, and these are common so do not discuss here for more details.

From FIGS. 68, 68A, 68B show all features discussed on above for LED or-and laser project light has slide changeable, plurality of slide or film or grating-piece or optics-lens fit-into disc for AC-plug-In or DC power or interchangeable power source. It teaches the detail alternative basic tube-like assembly has accurate position to install the said display-units/Slide/Film. And $1^{st}$ optics lens between the LED light source and display-unit for better image quality, and $2^{nd}$ optics lens on other end of the tube-like assembly to magnify by refraction theory so can created the good size image shown on far-away surface or areas. The LED (not shown) but is located right under the display-units but it will not any harm because LED has not enough heat to damage the said display-unit. For more detail discussion, please refer to co-inventor's
(#FF-4) U.S. application Ser. No. 14/968,862, Filed on Dec. 14, 2015 (Still Pending) which is Continue in Part of
(#FF-3) U.S. application Ser. No. 14/539,267, Filed on Nov. 12, 2014 (Still Pending) which is Continue in Part of
(#FF-2) U.S. application Ser. No. 14/275,184, Filed on May 12, 2014 (Still Pending) which is Continue in Part of
(#FF-1) U.S. application Ser. No. 12/914,584, Filed on Oct. 28, 2010, Publication data 2011-008-532 3 public-date Apr. 14, 2011, Now is U.S. Pat. No. 8,721,160 issued date May 13, 2014 VS. Current parent filed on Ser. No. 12/866,832, Filed on Sep. 21, 2010 which is Continue in Part of
(#FF-2008) US Application Ser. No. 12/318,470 filed on Dec. 30, 2008 now abandoned Numerous additional modifications of the invention may occur to those skilled in the art, including modifications that utilize concept disclosed in the above-cited applications and patents of the inventor. All such modifications are intended to fall within the scope of the present invention.

From above 36 pages drawings show the major parts and brief features in order to check each current invention claim coverage with clear FIGS show below with brief explanation for features without missing from above description as below:

(1) Non-leakage light-beam assembly: show on FIGS. 3, 4, 6, 7, 7-2, 10, 10A, 10C, 11, 12, 26, 47, 48, 55, 66 especially FIG. 55 has tray, holder, and other FIGS. Tube, tubes, housing parts those all has wall to prevent light-beam leakage out while traveling.

(2) AC plug wire: Show on FIGS. 39, 53, FIG. 64 to connect with outlet of extension cord for indoor or outdoor LED project light application.

(3) DC Plug wire: Show on FIGS. 39, 43,49,50,51,54 connect with DC power source.

(4) Project Lens install on "Opening of LED light highest housing part" or "Above the inner (non-leakage light-beam assembly) TOP": Show on FIGS. 3, 26, 57,59,62,63 show very clear (3c)(25-3e)(26-4h) (F4e) (F5e)(II4e)(II-5e) is on top opening or Above Top of Inner assembly.

(5) Battery Powered: Show on FIGS. 3, 11, 12,22c, 22D, 22E, 22F, 44, (6) Interchangeable Power source: Show on FIGS. 56, 59, (7) Rotating disc or holder for plurality of Slide, display-unit, project-lens: Show on FIGS. 3, 8, 9, 56, 58, 60, 61, 68, 68B to change or rotating to make image changed or moving effects.

(8) wireless or changeable or LDC Digital data: Shown on FIG. 4, 55 to project wireless or changeable time, movie, internet, You-Tube movie or show or films.

(9) Adjustable Focus: Show on FIGS. 10,10A, 10B, 10C, 10D, 11, 12 to make focus adjustable along the quickly trace or track which similar enlarge thread-groove.

(10) Replaceable Project-set or non-leakage light-beam assembly: Shown on FIGS. 16, 17, 18, 19 movable or detachable assembly from one location to others.

(11) Sensor, motions sensor, wireless controller, switch: Shown on FIGS. 3-2, 20, 21, 27-38 to make change, adjust, select, operate LED light source or other electric-parts for the functions, brightness, color, focus for desired performance.

(12) $2^{nd}$ LEDs or Other light source: Shown on FIGS. 2, 2-1, 2-2, 2-3, 3,3-1, 3-2, 5, 5-1, 7,7-1, 7-2, 20, 21, 27-38 to offer not only projection light but also other functions including night time use light, nightlight, power fail light, motion sensor light, accent light, color change light or any LED functions other light effects.

(13) More than One projection light: Shown on FIGS. 16-19, 24, 27 to 38 to show the projection or-and just tourch light for more than one location or areas.

(14) Application for Seasonal, holiday indoor or outdoor or garden light by AC Plug wire plug-in Extension cord outlet or other connector-sets; show on FIGS. 39, 40, 41, 42, 45, 46, 49, 50, 51, 52, 53, 54

(15) Project LED light install on the Track: Shown on FIG. 48 to easily fit into all kind of track-light device without purchase other track and its system.

(16) Angle adjustable: Shown on FIGS. 2, 2-2, 4, 5-1, 6, 8, 10-15, 21, 24, 25, 23-38 to make desired areas, location. Position has presented the projection or-and torch light for image viewing or-and illuminations.

The invention claimed is:

1. An LED projection light, comprising:
   at least one LED; and
   a projection light housing having at least one added-on or built-in tubular piece,
   where the added-on or built-in tubular piece has an inner space configured to fit just one said LED,
   wherein LED light is emitted into the at least one added-on or built-in tubular piece and through an inner space of a fixed or rotating display unit containing at least one image or pattern, without emitting light to another inner housing or inner area that is insider the projection light housing and outside the at least one added-on or built-in tubular piece, the light exiting the display unit being emitted to a projection lens to project the at least one image or at least one pattern, or light beams, to a desired area or surface at least feet away from the projection light,
   wherein the projection lens is fixed or arranged on a top area of (1) the LED projection light or (2) the at least one added-on or built-in tubular piece,
   wherein the fixed or rotating display unit is made of a thin plastic piece that would melt if placed on top of a high temperature incandescent bulb,
   wherein the fixed or replaceable display unit is at least one of a:
   (i) film,
   (ii) slide,
   (iv) piece with photos, cartoons, or characters,
   to create said image or lighted pattern,
   wherein said added-on or built-in tubular piece is for preventing light leakage;
   wherein a power source for said LED projection light includes at least one of:
   (a) an AC power cord with a plug for connection to an AC power source for outdoor application,
   (b) an external transformer or built-in AC-to-DC circuit for connection to an AC power source for outdoor application, and
   (c) a DC power source that includes at least one battery, an external DC power source and separate USB wire, or an AC to DC conversion circuit for indoor application.

2. An LED projection light as claimed in claim 1, wherein the LED projection light is one of a nighttime or seasonal, garden, or accent light.

3. An LED projection light as claimed in claim 1, wherein the LED projection light has at least one of a motion sensor, photosensor, wired or wireless controller, and manual switch for operating the projection light.

4. An LED projection light as claimed in claim 1, wherein the LED projection light has at least one built-in additional LED for at least one of night light, accent light, or background light illumination.

5. An LED projection light as claimed in claim 1, wherein the LED projection light further has at least one movable part for changing at least one of an optics lens, a holder or disc, and a lens assembly.

6. An LED projection light as claimed in claim 1, wherein said LED projection light is further incorporated with at least one of the following:
   (1) a construction for changing a position of the projected image or pattern along x, y, and/or z coordinate axes;
   (2) a mounting bracket, base, or sloped surface for changing or aiming the projected image or pattern at desired locations;
   (3) additional kits for changing a position of an optics lens;
   (4) a construction for rotating at least one housing part of the projection light;
   (5) a construction for tilting the projection light;
   (6) a construction for adjusting a focus of the projected image or pattern;
   (7) a construction for changing, moving, or rotating the display unit;
   (8) a construction for moving or changing or programming a digital image on an LCD or TFT of the projection light;
   (9) a digital memory or data storage construction for storing a plurality of images;
   (10) a construction including multiple projection assemblies for projecting a combination of steady, moving, and/or changeable multiple images or patterns from a single said LED projection light;
   (11) a housing construction for housing at least one of an optical element, a lens assembly, a convex lens, a concave lens, display units, a slide, a film, an LCD display, a TFT display, an image presentation unit, and a transparent plastic piece that allows light to pass through and that includes a laser film or piece, a translucent piece, and an opaque plastic piece;
   (12) a housing for housing a holder or disc for an forming element;
   (13) a laser projection light integrated with at least one hologram or grating film or piece and including a safety component for shutting down the laser when a person is in proximity to the laser projection light;
   (14) a wireless data display unit for displaying data received over a wireless data connection;
   (15) a small size TFT having a size of 1, 1.5, 1.8, or 2.4 inches and a high resolution to provide a clear image when magnified by projection; and
   (16) an OEL or OLED display screen.

7. An LED projection light as claimed in claim 1, wherein the housing of the LED projection light has at least one slot for receiving a desired digital memory card, digital memory stick, or memory storage unit.

8. An LED projection light as claimed in claim 1, wherein the LED projection light includes at least one of a digital memory storage kit, an integrated circuit (IC); a memory card; or a memory stick, for storing digital data or images to be projected by the LED projection light.

9. An LED projection light as claimed in claim 8, wherein the display unit includes one of an LCD, TFT, and display construction, for displaying the digital data.

10. An LED projection light as claimed in claim 8, wherein the LED projection light includes an adjustable focus kit to cause the projected image or pattern to have a desired size, density, clearance, sharpness, brightness, color, and distance.

11. An LED projection light as claimed in claim 8, wherein said digital data is provided by one of a digital camera, video camera, computer equipment, communications equipment, an consumer electric device, and a cellular phone.

12. An LED desktop dome shaped projection light, comprising:
   at least one LED positioned on a center area of a round base;
   at least one flat, coiled, or rolled first optics element arranged to shape or form at least one of a steady, moving, rotating, or changeable image or pattern to be shown on a surrounding wall, a ceiling, or at least one area away from the LED projection light; and
   at least one second optical element arranged as a movable cover to project the at least one of a steady, moving, rotating, or changeable image or pattern shaped or formed by the first optical element and shown on the cover,
   wherein said at least one LED is connected to a power source,
   wherein said at least one of a steady, moving, rotating, or changeable projected image or pattern includes at least one of a message, lighted patterns, lighted shaped patterns, time, geometric art, nature scene, galaxy, milky way, sky, cloud, stars, moon, water waves, aurora light, animal, character, cartoon, sign, logo, advertisement, and commercial,
   wherein said projection light has (A) an external transformer or built-in AC-to-DC circuit to connect with the AC power source, or (B) a battery, and
   wherein said projection light further has a switch to operate at least one LED function.

13. An LED desktop dome shaped projection light as claimed in claim 12, wherein the at least one first optics element includes at least one of a light-transmitting area, pinholes, a printed piece having at least one light transmitting area, a slide, a film, a display forming device, and optics elements having blocking properties with openings, a window, a cutout, or a stencil.

14. An LED desktop dome shaped projection light as claimed in claim 12, wherein the at least one first optics element surrounds the at least one LED and has a predetermined texture, shape, variety or plurality of different-thicknesses.

15. An LED desktop dome shaped projection light as claimed in claim 12, wherein the at least one first optics element is a moving optical element driven by at least one of a motor, spin set, rotating set, magnet and magnetic coil set, and movement set.

16. An LED desktop dome shaped projection light as claimed in claim 12, wherein the LED is operated by DC power and has at least one of a switch, integrated circuit, moving device, countdown timer, and motor/gear set without a sensor.

17. An LED desktop dome shaped projection light as claimed in claim 12, wherein the movable cover is an opaque piece.

18. An LED desktop dome shaped projection light as claimed in claim 12, wherein said at least one first optics element and/or said at least one second optical element is selected from at least one of the following types of optical elements:

(1) lenses;
(2) optical elements having light blocking properties and having shaped holes, openings, cutouts, windows, or a stencil;
(3) moving optical elements that incorporate a crank assembly, motor, spin assembly, rotating assembly, movement assembly, magnet and coil assembly;
(4) optical elements included in an outer cover having a wide opening to increase a viewing angle.

19. An LED desktop dome shaped projection light as claimed in claim 12, wherein said LED projection light includes a film, slide, printed piece having at least one of a cartoon, a character, and seasonal art for indoor or outdoor applications.

20. An LED desktop dome shaped projection light as claimed in claim 12, wherein said LED projection light is adapted to project at least one of single color image, multiple color image, multiple color lighted spots, multiple color lighted patterns through at least one of the at least one first image forming optics element.

* * * * *